US012625565B2

(12) United States Patent
Cho

(10) Patent No.: US 12,625,565 B2
(45) Date of Patent: May 12, 2026

(54) ELECTRONIC DEVICE HAVING COMPLEX HUMAN INTERFACE AND OPERATION METHOD THEREOF

(71) Applicant: MOKIBO, INC., Seongnam-si (KR)

(72) Inventor: Eunhyung Cho, Yongin-si (KR)

(73) Assignee: MOKIBO, INC., Seongnam-si (KR)

( * ) Notice: Subject to any disclaimer, the term of this patent is extended or adjusted under 35 U.S.C. 154(b) by 0 days.

(21) Appl. No.: 18/814,228

(22) Filed: Aug. 23, 2024

(65) Prior Publication Data

US 2024/0419257 A1 Dec. 19, 2024

Related U.S. Application Data

(63) Continuation of application No. PCT/KR2023/002634, filed on Feb. 24, 2023.

(30) Foreign Application Priority Data

Feb. 25, 2022 (KR) ........................ 10-2022-0025050
May 19, 2022 (KR) ........................ 10-2022-0061381

(51) Int. Cl.
*G06F 3/02* (2006.01)
*G06F 3/023* (2006.01)
*G06F 3/044* (2006.01)

(52) U.S. Cl.
CPC .............. *G06F 3/021* (2013.01); *G06F 3/023* (2013.01); *G06F 3/0445* (2019.05); *G06F 3/0446* (2019.05); *G06F 3/0447* (2019.05); *G06F 3/0448* (2019.05)

(58) Field of Classification Search
CPC ..................... G06F 3/021; G06F 3/023; G06F 3/0445–0448
See application file for complete search history.

(56) References Cited

U.S. PATENT DOCUMENTS

| | | | | |
|---|---|---|---|---|
| 10,289,210 B1 * | 5/2019 | Wang | ..................... | G06F 3/0445 |
| 11,177,093 B1 * | 11/2021 | Jain | ........................ | G06F 3/0202 |
| 11,526,213 B2 | 12/2022 | Cho | | |
| 2013/0335364 A1 | 12/2013 | Tseng | | |
| 2014/0224633 A1 | 8/2014 | Peterson et al. | | |

(Continued)

FOREIGN PATENT DOCUMENTS

| | | |
|---|---|---|
| CN | 103513838 B | 3/2017 |
| EP | 3 477 438 A1 | 5/2019 |

(Continued)

OTHER PUBLICATIONS

Internation Search Report and Written Opinion dated May 26, 2023 as received in application No. PCT/KR2023/002634.

(Continued)

*Primary Examiner* — Liliana Cerullo
(74) *Attorney, Agent, or Firm* — Maschoff Brennan

(57) ABSTRACT

Proposed is an electronic device having a multi-function human interface, the electronic device including a plurality of key caps, wherein the plurality of key caps include a first key cap, a plurality of elastic units, wherein the plurality of elastic units include a first elastic unit, a plurality of conductive materials, wherein the plurality of conductive materials include a first conductive material, and an electrode layer configured to generate key input signals and touch input signals.

15 Claims, 34 Drawing Sheets

1300

(56)            References Cited

U.S. PATENT DOCUMENTS

| | | | | |
|---|---|---|---|---|
| 2015/0091842 A1* | 4/2015 | Shepelev | .............. | G06F 3/0412 |
| | | | | 345/174 |
| 2016/0118982 A1* | 4/2016 | Lee | ........................ | H03K 17/98 |
| | | | | 307/115 |
| 2017/0322663 A1 | 11/2017 | Lee et al. | | |
| 2020/0192490 A1 | 6/2020 | Elias | | |
| 2020/0233531 A1* | 7/2020 | Weinerth | .............. | G06F 3/0442 |
| 2021/0072837 A1 | 3/2021 | Lee | | |
| 2021/0098210 A1 | 4/2021 | Wu | | |
| 2021/0294430 A1* | 9/2021 | Smith | ..................... | G06F 3/021 |
| 2022/0147156 A1 | 5/2022 | Hyun et al. | | |

FOREIGN PATENT DOCUMENTS

| | | |
|---|---|---|
| JP | 2010-108243 A | 5/2010 |
| JP | 2021-047872 A | 3/2021 |
| KR | 10-2019-0025472 A | 3/2019 |
| KR | 10-2020-0040623 A | 4/2020 |
| KR | 10-2020-0136589 A | 12/2020 |
| KR | 10-2021-0037528 A | 4/2021 |
| KR | 10-2021-0038522 A | 4/2021 |
| KR | 10-2021-0088504 A | 7/2021 |
| KR | 10-2367253 B1 | 2/2022 |

OTHER PUBLICATIONS

KR Decision to Grant Dated Nov. 11, 2024 as received in Application No. 10-2023-0024683.

KR Office Action dated May 7, 2024 as received in Application No. 10-2022-0061381.

KR Notice of Allowance dated Aug. 16, 2024 as received in application No. 10-2022-0061381.

Japanese Office Action dated, Oct. 7, 2025, as received in application No. 2024-548724.

Extended European Search Report dated Dec. 4, 2025, as received in application No. 23760411.1.

* cited by examiner

FIG. 12
2000
2010
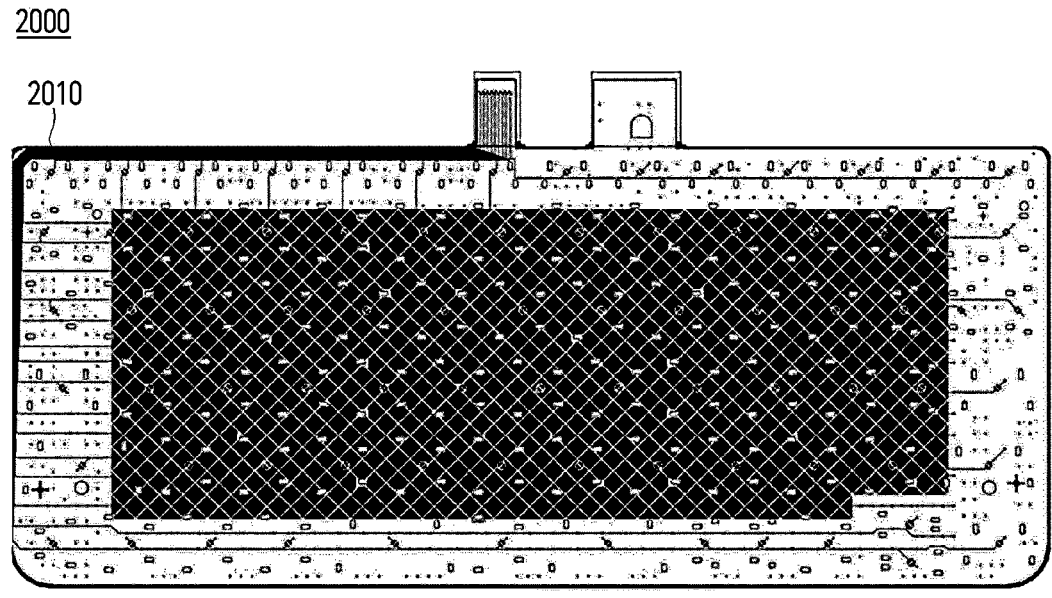
2020
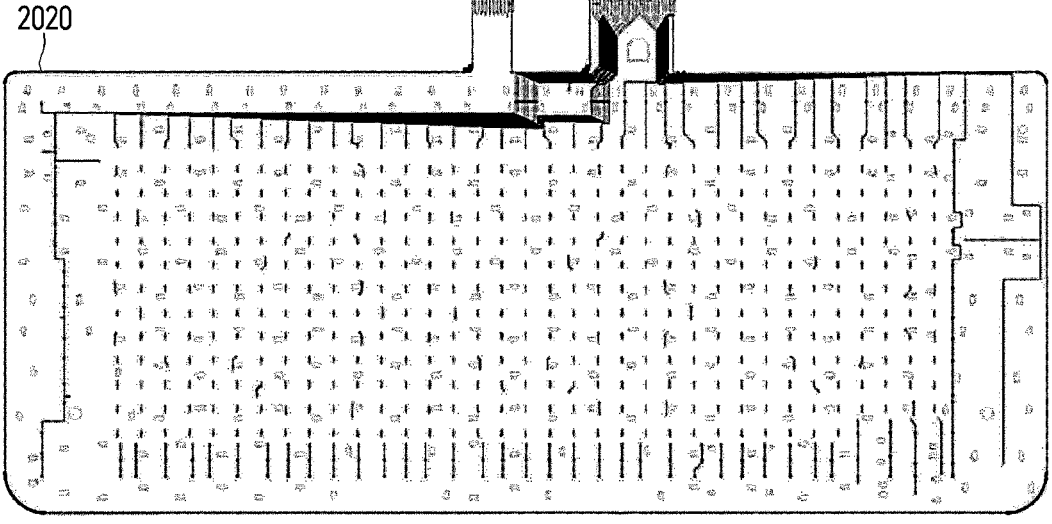

FIG. 19

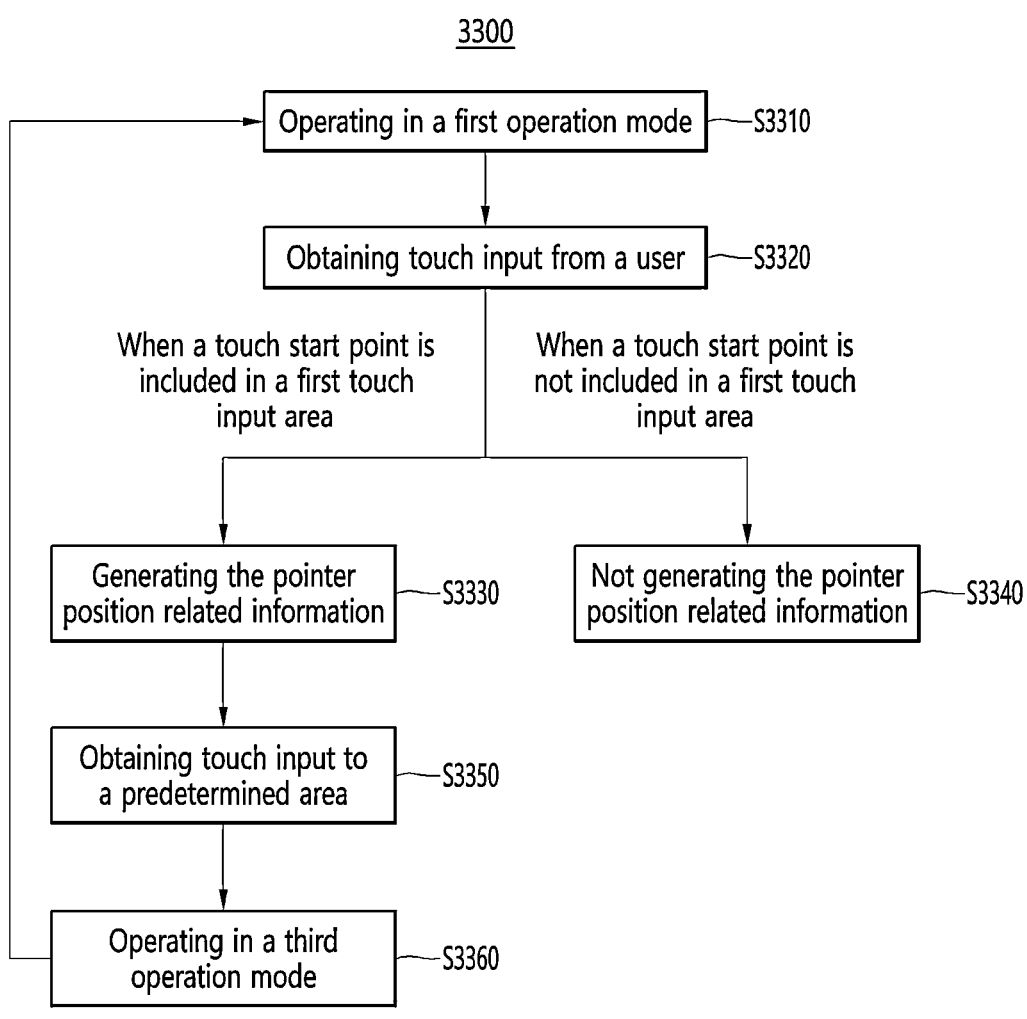

3300

Operating in a first operation mode —S3310

Obtaining touch input from a user —S3320

When a touch start point is included in a first touch input area

When a touch start point is not included in a first touch input area

Generating the pointer position related information —S3330

Not generating the pointer position related information —S3340

Obtaining touch input to a predetermined area —S3350

Operating in a third operation mode —S3360

FIG. 21

ELECTRONIC DEVICE HAVING COMPLEX HUMAN INTERFACE AND OPERATION METHOD THEREOF

TECHNICAL FIELD

The present disclosure relates to an electronic device having a multi-function human interface. More particularly, the present disclosure relates to an electronic device having an interface and an operation method thereof, the interface for connecting to an electronic device, such as a computer, a laptop computer, a tablet PC, a mobile phone, a TV, or a beam projector, and forwarding text information or pointer position related information to the electronic device, such as the computer.

BACKGROUND ART

An electronic device, such as a computer, a laptop computer, a tablet PC, a mobile phone, a TV, and a beam projector needs to be provided with at least one interface for operations, such as generating at least one piece of data, storing at least one piece of data, and executing at least one command.

In the case of a computer, a text input device such as a keyboard may be provided as an interface, or a pointing device such as a mouse may be provided as an interface. Text information may be obtained from the keyboard connected to the computer, or pointer position related information or a pointer execution command may be obtained from the mouse connected to the computer.

In addition, in the case of a tablet PC or a mobile phone, a touch sensor may be provided as an interface, and movement/change information on a displayed screen, at least one function execution command, or text information via a virtual keyboard may be obtained through the provided touch interface.

However, the interface for the electronic device, such as a computer, a laptop computer, a tablet PC, a mobile phone, a TV, and a beam projector, is not limited to the above-described examples, and various interfaces may be provided.

DISCLOSURE

Technical Problem

The present disclosure is directed to providing an electronic device having a multi-function human interface, wherein a key input sensor and a touch input sensor are integrated.

In addition, the present disclosure is directed to providing an electronic device having a multi-function human interface, wherein an electrode layer in which a key input sensor and a touch input sensor are integrated is included.

In addition, the present disclosure is directed to providing an electronic device having a multi-function human interface and reduced volume.

In addition, the present disclosure is directed to providing an operation method of an electronic device having a multi-function human interface for enhancing user convenience.

Technical problems to be solved by the present disclosure are not limited to the aforementioned technical problems and other technical problems which are not mentioned will be clearly understood by those skilled in the art from the present specification and the accompanying drawings.

Technical Solution

According to an embodiment of the present disclosure, there is provided an electronic device having a multi-function human interface, the electronic device including: a plurality of key caps, wherein the plurality of key caps include a first key cap; a plurality of elastic units, wherein the plurality of elastic units include a first elastic unit and the first elastic unit includes a first conductive material; and an electrode layer configured to generate key input signals and touch input signals, wherein the first elastic unit is placed corresponding to the first key cap, and the electrode layer includes a first-type electrode configured to generate touch input signals and a second-type electrode configured to generate at least key input signals, and a first electrode included in the first-type electrode and a second electrode included in the second-type electrode are placed to be at least partially overlapped by the first key cap, and the second electrode is placed to be at least partially overlapped by the first conductive material of the first elastic unit, and the first electrode is placed not to be overlapped by the first conductive material of the first elastic unit.

In addition, according to another embodiment of the present disclosure, there is provided an electronic device having a multi-function human interface, the electronic device including: a plurality of key caps, wherein the plurality of key caps include a first key cap; and an electrode layer configured to generate key input signals and touch input signals, wherein the electrode layer includes a first-type electrode configured to generate touch input signals and a second-type electrode configured to generate at least key input signals, wherein the electrode layer includes first to fourth holes related to the first key cap, and a first electrode included in the second-type electrode is positioned in a first area defined by the first to fourth holes.

In addition, according to still another embodiment of the present disclosure, there is provided an electronic device having a multi-function human interface, the electronic device including: a plurality of key caps, wherein the plurality of key caps include a first key cap, a second key cap adjacent to the first key cap in a width direction of a keyboard layout, and a third key cap adjacent to the first key cap in the width direction of the keyboard layout and spaced apart from the second key cap in the width direction of the keyboard layout; and an electrode layer configured to generate key input signals and touch input signals, wherein the electrode layer includes a first-type electrode configured to generate touch input signals and a second-type electrode configured to generate at least key input signals, wherein the electrode layer includes first-type lines consisting of electrodes electrically connected in a longitudinal direction of the keyboard layout and second-type lines consisting of electrodes electrically connected in the width direction of the keyboard layout, and in order to generate the key input signals and the touch input signals, the first-type lines function as either a transmitter or a receiver and the second-type lines function as the other of the transmitter or the receiver, and the second-type lines include a first line, a second line adjacent to the first line in the longitudinal direction of the keyboard layout, and a third line adjacent to the second line in the longitudinal direction of the keyboard layout, and a first electrode that is the second-type electrode included in the first line is placed to be overlapped by the second key cap, and a second electrode that is the first-type electrode included in the first line is placed to be overlapped by the first key cap, and a third electrode that is the second-type electrode included in the second line is placed to be overlapped by the first key cap, and a fourth electrode that is the first-type electrode included in the second line is placed to be overlapped by the second key cap, and a fifth electrode that is the first-type electrode included in the second line is placed to be overlapped by the third key cap, and a sixth electrode that is the second-type electrode included in the third line is placed to be overlapped by the third key cap, and a seventh electrode that is the first-type electrode included in the third line is placed to be overlapped by the first key cap.

In addition, according to still another embodiment of the present disclosure, there is provided an electronic device having a multi-function human interface, the electronic device including: a plurality of key caps; and an electrode layer configured to generate key input signals and touch input signals, wherein the electrode layer includes a first-type electrode configured to generate touch input signals and a second-type electrode configured to generate at least key input signals, wherein the electrode layer includes first-type lines consisting of electrodes electrically connected in a longitudinal direction of a keyboard layout and second-type lines consisting of electrodes electrically connected in the width direction of the keyboard layout, and in order to generate the key input signals and the touch input signals, the first-type lines function as either a transmitter or a receiver and the second-type lines function as the other of the transmitter or the receiver, and the second-type lines include a first line, a second line adjacent to the first line in the longitudinal direction of the keyboard layout, and a third line adjacent to the second line in the longitudinal direction of the keyboard layout, and the first-type lines include a fourth line, a fifth line adjacent to the fourth line in the width direction of the keyboard layout, and a sixth line adjacent to the fourth line in the width direction of the keyboard layout, and the first line, the second line, and the third line include at least one second-type electrode, the fourth line includes a plurality of the second-type electrodes, and the fifth line and the sixth line do not include the second-type electrode.

In addition, according to still another embodiment of the present disclosure, there is provided an electronic device having a multi-function human interface, the electronic device including: a plurality of key caps, wherein the plurality of key caps include a first key cap and a second key cap adjacent to the first key cap in a width direction of a keyboard layout; and an electrode layer configured to generate key input signals and touch input signals, wherein the electrode layer includes a first electrode configured to generate a first key input signal according to a user's key input on the first key cap, a second electrode configured to generate a first touch input signal according to the user's touch input on a portion of the first key cap, a third electrode configured to generate a second key input signal according to the user's key input on the second key cap, and a fourth electrode configured to generate a second touch input signal according to the user's touch input on a portion of the second key cap, and the first and second electrodes are placed to be overlapped by the first key cap, and the third and fourth electrodes are placed to be overlapped by the second key cap, and the first electrode is electrically connected to the fourth electrode, but is not electrically connected to the third electrode, and the third electrode is electrically connected to the second electrode, but is not electrically connected to the first electrode.

In addition, according to still another embodiment of the present disclosure, there is provided an electronic device having a multi-function human interface, the electronic device including: a plurality of key caps, wherein the plurality of key caps include a first key cap and a second key cap adjacent to the first key cap in a width direction of a keyboard layout; and an electrode layer configured to generate key input signals and touch input signals, wherein the electrode layer includes a first-type electrode configured to generate touch input signals, and a second-type electrode configured to generate at least key input signals, wherein the electrode layer includes a first electrode that is the first-type electrode overlapped by the first key cap, a second electrode that is the second-type electrode overlapped by the first key cap, a third electrode that is the first-type electrode overlapped by the second key cap, and a fourth electrode that is the second-type electrode overlapped by the second key cap, and the first electrode and the fourth electrode are electrically connected to each other, the second electrode and the third electrode are electrically connected to each other, and the second electrode and the fourth electrode are not electrically connected to each other.

In addition, according to still another embodiment of the present disclosure, there is provided an electronic device having a multi-function human interface, the electronic device including: a plurality of key caps, wherein the plurality of key caps include a first key cap, a second key cap, a third key cap, and a fourth key cap, and the first key cap and the second key cap are adjacent to each other in a width direction of a keyboard layout and the third key cap and the fourth key cap are adjacent to each other in a width direction of the keyboard layout; and an electrode layer configured to generate key input signals and touch input signals, wherein the electrode layer includes a first electrode configured to generate a first key input signal according to a user's input on the first key cap, a second electrode configured to generate a second key input signal according to the user's input on the second key cap, a third electrode configured to generate a third key input signal according to the user's input on the third key cap, and a fourth electrode configured to generate a fourth key input signal according to the user's input on the fourth key cap, wherein the electronic device having the multi-function human interface includes a key input area corresponding to a predetermined keyboard layout and configured to generate a key input signal, a touch input area corresponding to at least a portion of the predetermined keyboard layout and configured to generate a touch input signal, and a multi-functional area placed in an area in which the key input area and the touch input area overlap, and the first key cap and the second key cap are placed to be included in the multi-functional area, and the third key cap and the fourth key cap are placed not to be included in the multi-functional area, and the first electrode is not electrically connected to the second electrode, and the third electrode is electrically connected to the fourth electrode.

According to still another embodiment of the present disclosure, there is provided an operation method of an electronic device having a multi-function human interface and including an touch input area corresponding to at least a portion of a keyboard layout, the operation method including: operating the electronic device having the multi-function human interface in a first operation mode in which a first touch input area corresponding to a portion of a touch input area is active; and generating, when touch input to the touch input area is obtained from a user, pointer position related information on the basis of the obtained touch input, wherein when the touch input obtained from the user is included in the first touch input area, the pointer position related information is generated on the basis of the obtained touch input, or when the touch input obtained from the user is included is included in an external area, which is the external area is an area included in the touch input area, but not included in the first touch input area, the pointer position related information is not generated, and when a touch start point of the touch input obtained from the user is included in the first touch input area, the pointer position related information is generated on the basis of the touch input obtained from the user even if a touch end point of the touch input obtained from the user or at least a portion of a touch path is included in the external area.

However, the solving means of the problems of the present disclosure are not limited to the aforementioned solving means and other solving means which are not mentioned will be clearly understood by those skilled in the art from the present specification and the accompanying drawings.

Advantageous Effects

According to embodiments of the present disclosure, an electronic device having a multi-function human interface can be provided, wherein a key input sensor and a touch input sensor are integrated.

According to embodiments of the present disclosure, an electronic device having a multi-function human interface can be provided, wherein an electrode layer in which a key input sensor and a touch input sensor are integrated is included.

According to embodiments of the present disclosure, an electronic device having a multi-function human interface and reduced volume can be provided.

According to embodiments of the present disclosure, an operation method of an electronic device having a multi-function human interface with user convenience enhanced can be provided.

The effects of the present disclosure are not limited to the aforementioned effects and other effects which are not mentioned will be clearly understood by those skilled in the art from the present specification and the accompanying drawings.

DESCRIPTION OF DRAWINGS

FIG. 3 is a diagram illustrating layers of an electronic device having a multi-function human interface according to an embodiment.

FIG. 12 is a diagram illustrating an electrode layer included in an electronic device having a multi-function human interface according to an embodiment.

FIG. 19 is a flow chart illustrating an operation method of an electronic device having a multi-function human interface according to an embodiment.

FIG. 21 is a diagram illustrating a scenario of use of an electronic device having a multi-function human interface according to an embodiment.

BEST MODE

Figure 1:
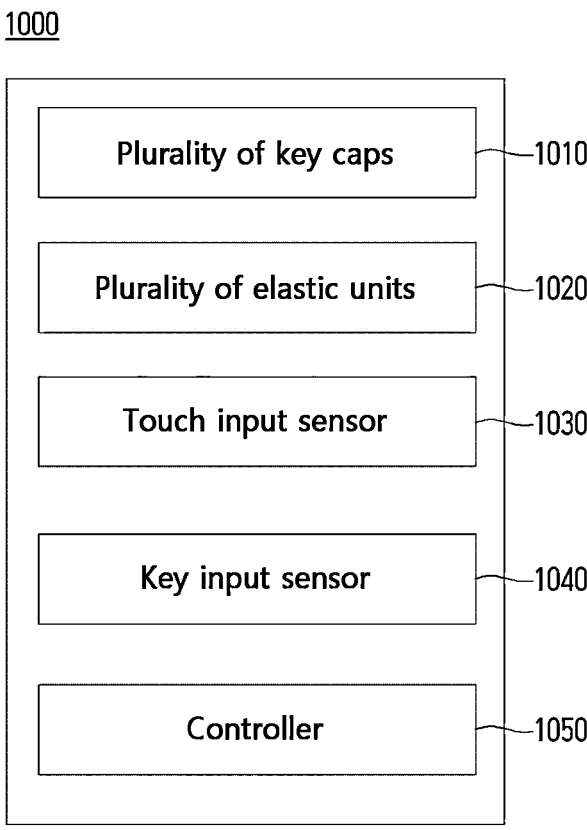
FIG. 1 is a block diagram illustrating an electronic device having a multi-function human interface according to an embodiment.

Embodiments described in the present specification are for clearly describing the idea of the present disclosure to those skilled in the art to which the present disclosure belongs, so the present disclosure is not limited to the embodiments described in the present specification and the scope of the present disclosure should be construed as including modifications or variations that are within the idea of the present disclosure.

As the terms used in the present specification, general terms currently widely used are used considering functions in the present disclosure. However, the terms may vary according to the intentions of those skilled in the art, precedents, or the emergence of new technology. However, unlike this, when a particular term is used defined as having an optional meaning, the meaning of the term will be described. Thus, the terms used in the present specification should be construed based on the actual meanings of the terms and details throughout the present specification rather than simply the names of the terms.

The drawings accompanying the present specification are for easily describing the present disclosure, and the shapes shown in the drawings may be exaggerated to help the understanding of the present disclosure, so the present disclosure is not limited by the drawings.

When an element or layer described in the present specification is referred to as being on another element or layer, it may be directly on the other element or layer or an intervening layer or element may be present.

Throughout the present specification, the same reference numerals denote the same elements in principle.

Numbers (for example, first, second, etc.) used in the description of the present specification may be understood as identifiers for distinguishing one element from another.

The terms "module" and "part" that are used in the description of the present specification are used considering only the ease with which the present specification is written. The terms are not intended as having different special meanings or functions and thus may be used individually or interchangeably.

In the present specification, if it is decided that a detailed description of known configuration or function related to the present disclosure makes the subject matter of the present disclosure unclear, the detailed description is omitted.

An electronic device having a multi-function human interface, the electronic device comprising: a plurality of key caps, wherein the plurality of key caps comprise a first key cap; a plurality of elastic units, wherein the plurality of elastic units comprise a first elastic unit; a plurality of conductive materials, wherein the plurality of conductive materials comprise a first conductive material; and an electrode layer configured to generate key input signals and touch input signals; wherein the electrode layer is comprising: a first type electrode configured to generate touch input signals; and a second type electrode configured to generate at least key input signals; wherein a first electrode included in the first type electrode and a second electrode included in the second type electrode are arranged to overlap with the first key cap at least partially, wherein the second electrode is arranged to overlap with the first conductive material at least partially, wherein the first electrode is arranged not to overlap with the first conductive material.

wherein the electrode layer comprises a first type lines consisting of electrodes electrically connected in a longitudinal direction of a keyboard layout and a second type lines consisting of electrodes electrically connected in a width direction of the keyboard layout, wherein the first type lines are configured to function as one of a transmitter or a receiver, and the second type lines are configured to function as the other of the transmitter or the receiver.

wherein the first electrode and the second electrode are included in the first type lines.

wherein the first electrode and the second electrode are included in the second type lines.

wherein the first electrode is included in either the first type lines or the second type lines, wherein the second electrode is included in the other of the first type lines or the second type lines.

wherein the electrode layer further includes a third electrode included in the first type electrode and a fourth electrode included in the second type electrode, wherein the third electrode and the fourth electrode are arranged to overlap with the first key cap at least partially, wherein the fourth electrode is arranged to overlap with the first conductive material at least partially, wherein the third electrode is arranged not to overlap with the first conductive material at least partially.

wherein the second electrode and the fourth electrode are arranged adjacent to each other.

wherein the second type electrode comprises a protrusion.

wherein the second type electrode comprises a protrusion, wherein a shape of a protrusion of the second electrode is the same as a shape of a protrusion of the fourth electrode.

wherein the second type electrode comprises a protrusion, wherein a shape of a protrusion of the second electrode is different from a shape of a protrusion of the fourth electrode.

wherein the second type electrode comprises a protrusion, wherein a protrusion of the second electrode and a protrusion of the fourth electrode are arranged to overlap with the first conductive material.

wherein a size of an area where the protrusion of the second electrode overlaps with the first conductive material is the same as a size of an area where the protrusion of the fourth electrode overlaps with the first conductive material.

wherein the first conductive material is arranged to move in accordance with a movement of the first key cap.

wherein the first conductive material is formed to be included in the first key cap.

wherein the first conductive material is formed to be included in the first key cap.

wherein the first conductive material is formed to be included in the first elastic unit.

In addition, according to another embodiment of the present disclosure, there is provided an electronic device having a multi-function human interface, the electronic device including: a plurality of key caps, wherein the plurality of key caps include a first key cap; and an electrode layer configured to generate key input signals and touch input signals, wherein the electrode layer includes a first-type electrode configured to generate touch input signals and a second-type electrode configured to generate at least key input signals, wherein the electrode layer includes first to fourth holes related to the first key cap, and a first electrode included in the second-type electrode is positioned in a first area defined by the first to fourth holes.

Herein, the second hole may be adjacent to the first hole in a longitudinal direction of a keyboard layout, the third hole may be adjacent to the first hole in a width direction of the keyboard layout, and the fourth hole may be adjacent to the third hole in the longitudinal direction of the keyboard layout and may be adjacent to the second hole in the width direction of the keyboard layout.

Herein, the electrode layer may further include a fifth hole adjacent to the second hole in the longitudinal direction of the keyboard layout and a sixth hole adjacent to the fourth hole in the longitudinal direction of the keyboard layout, and the second-type electrode may not be included in a second area defined by the second hole, the fourth hole, the fifth hole, and the sixth hole.

Herein, the plurality of key caps may further include a second key cap adjacent to the first key cap in the longitudinal direction of the keyboard layout, and the second area may be overlapped by a portion of the first key cap and a portion of the second key cap.

Herein, the electrode layer may further include a second electrode included in the second-type electrode, and the second electrode may be positioned in the first area defined by the first to fourth holes.

Herein, when the first electrode functions as a portion of a transmitter, the second electrode may function as a portion of a receiver.

Herein, the first electrode may include a first protrusion, the second electrode may include a second protrusion, and the first protrusion and the second protrusion may be placed adjacent to each other.

Herein, the electronic device having the multi-function human interface may further include a lower plate and a keyboard mechanism layer. The keyboard mechanism layer may include a first keyboard mechanism unit. The first keyboard mechanism unit may be placed corresponding to the first key cap. The lower plate may include first to fourth coupling members. The first to fourth coupling members may pass through the first to fourth holes and may be coupled to the first keyboard mechanism.

In addition, according to still another embodiment of the present disclosure, there is provided an electronic device having a multi-function human interface, the electronic device including: a plurality of key caps, wherein the plurality of key caps include a first key cap, a second key cap adjacent to the first key cap in a width direction of a keyboard layout, and a third key cap adjacent to the first key cap in the width direction of the keyboard layout and spaced apart from the second key cap in the width direction of the keyboard layout; and an electrode layer configured to generate key input signals and touch input signals, wherein the electrode layer includes a first-type electrode configured to generate touch input signals and a second-type electrode configured to generate at least key input signals, wherein the electrode layer includes first-type lines consisting of electrodes electrically connected in a longitudinal direction of the keyboard layout and second-type lines consisting of electrodes electrically connected in the width direction of the keyboard layout, and in order to generate the key input signals and the touch input signals, the first-type lines function as either a transmitter or a receiver and the second-type lines function as the other of the transmitter or the receiver, and the second-type lines include a first line, a second line adjacent to the first line in the longitudinal direction of the keyboard layout, and a third line adjacent to the second line in the longitudinal direction of the keyboard layout, and a first electrode that is the second-type electrode included in the first line is placed to be overlapped by the second key cap, and a second electrode that is the first-type electrode included in the first line is placed to be overlapped by the first key cap, and a third electrode that is the second-type electrode included in the second line is placed to be overlapped by the first key cap, and a fourth electrode that is the first-type electrode included in the second line is placed to be overlapped by the second key cap, and a fifth electrode that is the first-type electrode included in the second line is placed to be overlapped by the third key cap, and a sixth electrode that is the second-type electrode included in the third line is placed to be overlapped by the third key cap, and a seventh electrode that is the first electrode included in the third line is placed to be overlapped by the first key cap.

Herein, the first electrode and the fourth electrode may be placed adjacent to each other in the longitudinal direction of the keyboard layout, the second electrode and the third electrode may be placed adjacent to each other in the longitudinal direction of the keyboard layout, the third electrode and the seventh electrode may be placed adjacent to each other in the longitudinal direction of the keyboard layout, and the fifth electrode and the sixth electrode may be placed adjacent to each other in the longitudinal direction of the keyboard layout.

In addition, according to still another embodiment of the present disclosure, there is provided an electronic device having a multi-function human interface, the electronic device including: a plurality of key caps; and an electrode layer configured to generate key input signals and touch input signals, wherein the electrode layer includes a first-type electrode configured to generate touch input signals and a second-type electrode configured to generate at least key input signals, wherein the electrode layer includes first-type lines consisting of electrodes electrically connected in a longitudinal direction of a keyboard layout and second-type lines consisting of electrodes electrically connected in the width direction of the keyboard layout, and in order to generate the key input signals and the touch input signals, the first-type lines function as either a transmitter or a receiver and the second-type lines function as the other of the transmitter or the receiver, and the second-type lines include a first line, a second line adjacent to the first line in the longitudinal direction of the keyboard layout, and a third line adjacent to the second line in the longitudinal direction of the keyboard layout, and the first-type lines include a fourth line, a fifth line adjacent to the fourth line in the width direction of the keyboard layout, and a sixth line adjacent to the fourth line in the width direction of the keyboard layout, and the first line, the second line, and the third line include at least one second-type electrode, the fourth line includes a plurality of the second-type electrodes, and the fifth line and the sixth line do not include the second-type electrode.

In addition, according to still another embodiment of the present disclosure, there is provided an electronic device having a multi-function human interface, the electronic device including: a plurality of key caps, wherein the plurality of key caps includes a first key cap and a second key cap adjacent to the first key cap in a width direction of a keyboard layout; and an electrode layer configured to generate key input signals and touch input signals, wherein the electrode layer includes a first electrode configured to generate a first key input signal according to a user's key input on the first key cap, a second electrode configured to generate a first touch input signal according to the user's touch input on a portion of the first key cap, a third electrode configured to generate a second key input signal according to the user's key input on the second key cap, and a fourth electrode configured to generate a second touch input signal according to the user's touch input on a portion of the second key cap, and the first and second electrodes are placed to be overlapped by the first key cap, and the third and fourth electrodes are placed to be overlapped by the second key cap, and the first electrode is electrically connected to the fourth electrode, but is not electrically connected to the third electrode, and the third electrode is electrically connected to the second electrode, but is not electrically connected to the first electrode.

In addition, according to still another embodiment of the present disclosure, there is provided an electronic device having a multi-function human interface, the electronic device including: a plurality of key caps, wherein the plurality of key caps include a first key cap and a second key cap adjacent to the first key cap in a width direction of a keyboard layout; and an electrode layer configured to generate key input signals and touch input signals, wherein the electrode layer includes a first-type electrode configured to generate touch input signals, and a second-type electrode configured to generate at least key input signals, wherein the electrode layer includes a first electrode that is the first-type electrode overlapped by the first key cap, a second electrode that is the second-type electrode overlapped by the first key cap, a third electrode that is the first-type electrode overlapped by the second key cap, and a fourth electrode that is the second-type electrode overlapped by the second key cap, and the first electrode and the fourth electrode are electrically connected to each other, the second electrode and the third electrode are electrically connected to each other, and the second electrode and the fourth electrode are not electrically connected to each other.

In addition, according to still another embodiment of the present disclosure, there is provided an electronic device having a multi-function human interface, the electronic device including: a plurality of key caps, wherein the plurality of key caps include a first key cap, a second key cap, a third key cap, and a fourth key cap, and the first key cap and the second key cap are adjacent to each other in a width direction of a keyboard layout and the third key cap and the fourth key cap are adjacent to each other in a width direction of the keyboard layout; and an electrode layer configured to generate key input signals and touch input signals, wherein the electrode layer includes a first electrode configured to generate a first key input signal according to a user's input on the first key cap, a second electrode configured to generate a second key input signal according to the user's input on the second key cap, a third electrode configured to generate a third key input signal according to the user's input on the third key cap, and a fourth electrode configured to generate a fourth key input signal according to the user's input on the fourth key cap, wherein the electronic device having the multi-function human interface includes a key input area corresponding to a predetermined keyboard layout and configured to generate a key input signal, a touch input area corresponding to at least a portion of the predetermined keyboard layout and configured to generate a touch input signal, and a multi-functional area placed in an area in which the key input area and the touch input area overlap, and the first key cap and the second key cap are placed to be included in the multi-functional area, and the third key cap and the fourth key cap are placed not to be included in the multi-functional area, and the first electrode is not electrically connected to the second electrode, and the third electrode is electrically connected to the fourth electrode.

According to still another embodiment of the present disclosure, there is provided an operation method of an electronic device having a multi-function human interface and including an touch input area corresponding to at least a portion of a keyboard layout, the operation method including: operating the electronic device having the multi-function human interface in a first operation mode in which a first touch input area corresponding to a portion of a touch input area is active; and generating, when touch input to the touch input area is obtained from a user, pointer position related information on the basis of the obtained touch input, wherein when the touch input obtained from the user is included in the first touch input area, the pointer position related information is generated on the basis of the obtained touch input, or when the touch input obtained from the user is included is included in an external area, which is the external area is an area included in the touch input area, but not included in the first touch input area, the pointer position related information is not generated, and when a touch start point of the touch input obtained from the user is included in the first touch input area, the pointer position related information is generated on the basis of the touch input obtained from the user even if a touch end point of the touch input obtained from the user or at least a portion of a touch path is included in the external area.

Herein, the center of the first touch input area may be positioned to the left or right of the center of the touch input area.

Herein, the electronic device having the multi-function human interface may include a plurality of key caps, and the touch input obtained from the user may be touch input on the plurality of key caps.

Herein, the electronic device having the multi-function human interface may include an electrode layer for realizing the touch input area, and the touch input obtained from the user may be input for generating a touch input signal in at least a portion of the electrode layer.

Herein, the operation method may further include operating, when touch input to a predetermined area is obtained from a user, the electronic device having the multi-function human interface in a second operation mode in which a second touch input area different from the first touch input area is active.

Herein, at least a portion of the predetermined area may be included in the first touch input area.

Herein, the direction from the center of the first touch input area to the center of the predetermined area may be different from the direction from the center of the touch input area to the center of the first touch input area.

Herein, when the touch start point of the touch input to the predetermined area obtained from the user is included in the first touch input area, the electronic device having the multi-function human interface may operate in the second operation mode. When the touch start point of the touch input to the predetermined area obtained from the user is included in the external area, the operation mode of the electronic device having the multi-function human interface may remain in the first operation mode.

Herein, the electronic device having the multi-function human interface may include a plurality of key caps, and the predetermined area may at least partially overlap at least one key cap of the key cap corresponding to key G or the key cap corresponding to key H among the plurality of key caps.

Herein, the second touch input area may be the same as the touch input area.

Herein, the operation method may further include operating the electronic device having the multi-function human interface in a first operation mode when the electronic device having the multi-function human interface does not obtain touch input from a user for a particular period of time or longer while operating in the second operation mode.

Herein, even when the electronic device having the multi-function human interface obtains touch input of which a touch start point is included in the external area from a user while operating in the second operation mode, pointer position related information may be generated on the basis of the touch input obtained from the user.

Herein, the touch path may be the user's touch input path from the touch start point to the touch end point.

Herein, the operation method may further include operating, when touch input obtained from a user is included in the first touch input area, the electronic device having the multi-function human interface in a second operation mode in which a second touch input area different from the first touch input area is active.

Herein, in the operation method, when a touch start point of touch input obtained from a user is included in the external area, an operation mode of the electronic device having the multi-function human interface may not be changed although a touch end point of the touch input obtained from the user or at least a portion of a touch path is included in the predetermined area.

Herein, the operation method may further include changing an operation mode of the electronic device having the multi-function human interface from the second operation mode to the first operation mode when at least one cancellation condition is satisfied.

Herein, the at least one cancellation condition may include a condition related to time, and the operation mode of the electronic device having the multi-function human interface may be changed from the second operation mode to the first operation mode when the electronic device having the multi-function human interface does not obtain touch input from a user for a particular period of time or longer while operating in the second operation mode.

Herein, the electronic device having the multi-function human interface may include a plurality of key caps, the at least one cancellation condition may include a condition related to key input, and the second operation mode of the electronic device having the multi-function human interface may be deactivated when the electronic device having the multi-function human interface obtains a key input signal corresponding to a first key cap included in the plurality of key caps while operating in the second operation mode.

Herein, when the electronic device having the multi-function human interface obtains a key input signal corresponding to a second key cap included in the plurality of key caps while operating in the second operation mode, the operation mode of the electronic device having the multi-function human interface may remain in the second operation mode.

Herein, while operating in the second operation mode, when the electronic device having the multi-function human interface obtains a key input signal corresponding to a first key cap included in the plurality of key caps and the operation mode of the electronic device having the multi-function human interface is changed from the second operation mode to the key input operation mode and then touch input is obtained from a user, the operation mode of the electronic device having the multi-function human interface may be changed from the key input operation mode to the first operation mode.

Herein, the at least one cancellation condition may include a condition related to touch input, and the operation mode of the electronic device having the multi-function human interface may be changed from the second operation mode to the first operation mode when the electronic device having the multi-function human interface obtains touch input for a predetermined number of touch points from a user while operating in the second operation mode.

Herein, the touch input for the predetermined number of touch points may include touch input for four touch points.

Herein, the at least one cancellation condition may include a condition related to touch input, and the operation mode of the electronic device having the multi-function human interface may be changed from the second operation mode to the first operation mode when the electronic device having the multi-function human interface obtains touch input to a particular area from a user while operating in the second operation mode.

Herein, the operation mode of the electronic device having the multi-function human interface may be changed from the second operation mode to the first operation mode when the electronic device having the multi-function human interface obtains touch input for four touch points for the particular area from a user while operating in the second operation mode.

Herein, the at least one cancellation condition may include a condition related to a power mode, and the electronic device having the multi-function human interface may operate in the first operation mode when the electronic device having the multi-function human interface is powered off and then powered on again while operating in the second operation mode.

Herein, when touch input of which a touch start point is included in the first touch input area and a touch end point or at least a portion of a touch path is included in the external area is obtained from a user and then additional touch input of which a touch start point is included in the external area is obtained, pointer position related information may be generated on the basis of the additional touch input obtained from the user.

Herein, when touch input obtained from a user is included in the external area, the pointer position related information may not be generated, but at least one function related to touch may be performed.

Herein, when touch input obtained from a user is included in the external area and is touch input related to a predetermined gesture, a function related to the predetermined gesture may be performed.

Herein, the function related to the predetermined gesture may include at least one of the functions of scrolling, zooming, and screen swapping.

Herein, when a touch path of touch input obtained from a user after a touch start point of touch input obtained from the user is included in the first touch input area is included in the external area, a second touch input area different from the first touch input area may be active. When at least a portion of the touch path of touch input obtained from the user is included again in the first touch input area, the first touch input area may be active.

Herein, the electronic device having the multi-function human interface may include a second touch input area. When a touch start point of touch input obtained from a user is included in the second touch input area, information related to adjustment of an attribute value of an adjustment target attribute may be generated. When a touch start point of touch input obtained from a user is included in the first touch input area and a touch end point or at least a portion of a touch path is included in the second touch input area, pointer position related information is generated. When a touch start point of touch input obtained from a user is included in the external area and a touch end point or at least a portion of a touch path is included in the second touch input area, information related to adjustment of an attribute value of an adjustment target attribute may be generated.

A multi-function human interface according to the present disclosure may mean an interface for being connected to an electronic device, such as a computer, a laptop computer, a tablet PC, a mobile phone, a TV, or a beam projector, and forwarding text information or pointer position related information to the electronic device, such as the computer.

In particular, an electronic device having a multi-function human interface according to the present disclosure is an electronic device having a multi-function human interface, wherein the electronic device provides a physical configuration that enables keystrokes so that a user can enter key input more accurately and conveniently, and also enables touch input within an area in which the keystrokes are possible, thus enabling the user to switch between interfaces more conveniently and quickly.

FIG. 1 is a block diagram illustrating an electronic device having a multi-function human interface according to an embodiment.

Referring to FIG. 1, an electronic device 1000 having a multi-function human interface according to an embodiment may include a plurality of key caps 1010, a plurality of elastic units 1020, a touch input sensor 1030, a key input sensor 1040, and a controller 1050.

A plurality of key caps 1010 according to an embodiment may be understood as a plurality of key caps or key covers generally included in a keyboard.

Herein, a plurality of key caps 1010 according to an embodiment may be provided in the same shape as each other, but are not limited thereto. A plurality of key caps may be provided in different shapes, or some of the key caps may be provided in the same shape and some of the key caps may be provided in different shapes.

In addition, a plurality of key caps 1010 according to an embodiment may be provided to be physically distinguished from each other.

For example, a first key cap and a second key cap included in a plurality of key caps 1010 according to an embodiment may be provided to be physically distinguished from each other, but are not limited thereto.

In addition, a plurality of key caps 1010 according to an embodiment may be realized to move distinguishably according to a user's push input.

For example, a first key cap and a second key cap included in a plurality of key caps 1010 according to an embodiment may be realized to move distinguishably according to a user's push input, but are not limited thereto.

A plurality of elastic units 1020 according to an embodiment may be understood as elements for providing force of restitution to the plurality of key caps.

For example, a plurality of elastic units 1020 according to an embodiment may be elements for providing force of restitution for each of the plurality of key caps 1010 such that each of the plurality of key caps 1010 moves according to a user's push input and then is restored to its original position.

In addition, a plurality of elastic units 1020 according to an embodiment may be provided as a material or in a shape having elastic force.

For example, a plurality of elastic units 1020 according to an embodiment may be provided as a material or in a shape having elastic force, such as a rubber dome or a spring, but are not limited thereto.

In addition, a plurality of elastic units 1020 according to an embodiment may be placed corresponding to the plurality of key caps 1010, respectively.

For example, a first elastic unit included in a plurality of elastic units 1020 according to an embodiment may be placed corresponding to a first key cap included in a plurality of key caps 1010 according to an embodiment, and a second elastic unit included in a plurality of elastic units 1020 according to an embodiment may be placed corresponding to a second key cap included in a plurality of key caps 1010 according to an embodiment. However, no limitation thereto is imposed.

Herein, placing a plurality of elastic units 1020 according to an embodiment corresponding to the plurality of key caps 1010, respectively may mean placing the plurality of elastic units to provide force of restitution to the plurality of key caps 1010, respectively, and may mean placing the plurality of elastic units to be in at least partial direct/indirect contact with the plurality of key caps 1010, respectively.

A touch input sensor 1030 according to an embodiment may be an element for obtaining touch input from a user and generating touch input signals.

Herein, the touch input from the user may mean the user's contact with the plurality of key caps 1010, but is not limited thereto. The touch input from the user may be understood to include input based on proximity of a portion of the user's body to the plurality of key caps 1010.

In addition, the touch input signals may mean electrical signals that are generated according to the touch input from the user, but are not limited thereto.

In addition, a touch input sensor 1030 according to an embodiment may be realized as various touch interfaces, such as a resistive touch panel, a pressure sensitive touch panel, a capacitive touch panel, an optical touch panel, and an ultrasonic touch panel, but is not limited thereto.

In addition, a touch input sensor 1030 according to an embodiment may be placed to form a touch area in an area that overlaps the plurality of key caps 1010 at least partially.

For example, when a touch input sensor 1030 according to an embodiment includes an electrode layer for realizing a capacitive touch panel, the electrode layer may be placed corresponding to at least a portion of the plurality of key caps 1010 such that a touch area is formed in an area overlapping the plurality of key caps 1010 at least partially. However, no limitation thereto is imposed.

Herein, placing the electrode layer corresponding to at least a portion of the plurality of key caps 1010 may mean placing the electrode layer to be overlapped by at least a portion of the plurality of key caps 1010, but is not limited thereto.

A key input sensor 1040 according to an embodiment may be an element for obtaining key input from a user and generating key input signals.

Herein, the key input from the user may mean push input on the plurality of key caps 1010, but is not limited thereto. The key input may be understood to include various types of input for generating key input signals corresponding to pre-specified positions.

In addition, the key input signals may mean electrical signals that are generated according to the key input from the user, but are not limited thereto.

In addition, a key input sensor 1040 according to an embodiment may be realized using a switch method.

For example, a key input sensor 1040 according to an embodiment may include a plurality of switches, and may be realized to generate key input signals corresponding to respective phase shifts of the plurality of switches, but is not limited thereto.

Herein, the plurality of switches may be placed corresponding to the plurality of key caps 1010, respectively.

For example, a first switch included in the plurality of switches may be placed corresponding to a first key cap included in the plurality of key caps 1010, and a second switch included in the plurality of switches may be placed corresponding to a second key cap included in the plurality of key caps 1010. However, no limitation thereto is imposed.

Herein, placing the plurality of switches corresponding to the plurality of key caps 1010, respectively may mean placing the plurality of switches to be in direct/indirect contact with the plurality of key caps 1010, respectively at at least one point in time such that respective phases of the plurality of switches shift as the plurality of key caps 1010 move. However, no limitation thereto is imposed.

In addition, a key input sensor 1040 according to an embodiment may be realized using a capacitive method.

For example, a key input sensor 1040 according to an embodiment may include a plurality of electrodes, and may be realized to generate corresponding key input signals on the basis of electrical signals caused by changes in capacitance of the plurality of electrodes due to respective position movements of the plurality of key caps 1010. However, no limitation thereto is imposed.

Herein, in order to amplify the changes in capacitance of the plurality of electrodes due to respective position movements of the plurality of key caps 1010, the plurality of elastic units 1020 may include a conductive material, but are not limited thereto.

In addition, at least a portion of the plurality of electrodes may be placed corresponding to the plurality of key caps 1010, respectively.

For example, a first electrode and a second electrode included in the plurality of electrodes may be placed corresponding to a first key cap included in the plurality of key caps 1010, and a third electrode and a fourth electrode included in the plurality of electrodes may be placed corresponding to a second key cap included in the plurality of key caps 1010. However, no limitation thereto is imposed.

Herein, placing at least a portion of the plurality of electrodes corresponding to the plurality of key caps 1010, respectively may mean placing at least a portion of the plurality of electrodes to be overlapped by the plurality of key caps 1010, respectively such that the plurality of electrodes change in capacitance as the plurality of key caps 1010 move. However, no limitation thereto is imposed.

In addition, according to an embodiment, the touch input sensor 1030 and the key input sensor 1040 may be provided in an integrated layer. When the touch input sensor 1030 and the key input sensor 1040 are provided in an integrated layer, the electronic device 1000 having the multi-function human interface may have the overall volume reduced, improved durability, and reduced manufacturing cost.

This will be described in more detail below.

A controller 1050 according to an embodiment may generate pointer position related information on the basis of touch input signals obtained from the touch input sensor 1030.

For example, a controller 1050 according to an embodiment may generate at least one coordinate value on the basis of touch input signals obtained from the touch input sensor 1030, but is not limited thereto.

In addition, for example, a controller 1050 according to an embodiment may generate pointer movement information on the basis of coordinate values of touch input signals obtained from the touch input sensor 1030, but is not limited thereto.

In addition, a controller 1050 according to an embodiment may generate pointer execution command related information on the basis of touch input signals obtained from the touch input sensor 1030.

For example, a controller 1050 according to an embodiment may generate information corresponding to a mouse left click on the basis of touch input signals obtained from the touch input sensor 1030, but is not limited thereto.

In addition, for example, a controller 1050 according to an embodiment may generate information corresponding to a mouse right click on the basis of touch input signals obtained from the touch input sensor 1030, but is not limited thereto.

In addition, a controller 1050 according to an embodiment may generate at least one key value on the basis of key input signals obtained from the key input sensor 1040.

For example, a controller 1050 according to an embodiment may generate at least one key code value on the basis of key input signals obtained from the key input sensor 1040, but is not limited thereto.

Herein, the at least one key code value may be key code values corresponding to a general keyboard layout, but is not limited thereto.

In addition, a controller 1050 according to an embodiment may generate pointer execution command related information on the basis of key input signals obtained from the key input sensor 1040.

For example, a controller 1050 according to an embodiment may generate information corresponding to a mouse left click on the basis of key input signals obtained from the key input sensor 1040, but is not limited thereto.

For a more specific example, a controller 1050 according to an embodiment may generate information corresponding to a mouse left click on the basis of a key input signal obtained from a predetermined key input sensor among the key input sensors 1040, but is not limited thereto.

In addition, for example, a controller 1050 according to an embodiment may generate information corresponding to a mouse right click on the basis of key input signals obtained from the key input sensor 1040, but is not limited thereto.

For a more specific example, a controller 1050 according to an embodiment may generate information corresponding to a mouse right click on the basis of a key input signal obtained from a predetermined key input sensor among the key input sensors 1040, but is not limited thereto.

In addition, the controller 1050 may determine a power related mode of the electronic device 1000 having the multi-function human interface.

For example, the controller 1050 may determine that the mode of the electronic device 1000 having the multi-function human interface is a power off mode, a standby mode, or an active mode.

Herein, in the power off mode, a user's key input or a user's touch input may be ignored or may not be recognized, but no limitation thereto is imposed thereto.

In addition, in the standby mode, when a user's key input or a user's touch input is obtained, the mode of the electronic device 1000 having the multi-function human interface may be switched to the active mode, but no limitation thereto is imposed thereto.

In addition, in the active mode, at least one key value or pointer position related information may be generated according to a user's key input or a user's touch input, but no limitation thereto is imposed.

In addition, the controller 1050 may determine an operation related mode of the electronic device 1000 having the multi-function human interface.

For example, the controller 1050 may determine that an operation mode of the electronic device 1000 having the multi-function human interface is a key input mode or a touch input mode.

Herein, in the key input mode, at least one key value may be generated on the basis of key input signals generated according to a user's key input, but no limitation thereto is imposed.

In addition, in the touch input mode, pointer position related information may be generated on the basis of touch input signals generated according to a user's touch input, but no limitation thereto is imposed.

In addition, the controller 1050 may determine a mode related to a touch area of the electronic device 1000 having the multi-function human interface.

For example, the controller 1050 may determine that the mode of the electronic device 1000 having the multi-function human interface is a first mode in which a first area of a keyboard layout is a touch area or a second mode in which a second area of the keyboard layout is the touch area, but is not limited thereto.

Herein, the first mode may mean a right hand mode and the second mode may mean a left hand mode, but are not limited thereto.

In addition, when the first mode is set to the right hand mode and the second mode is set to the left hand mode, the first area of the keyboard layout may be positioned closer to the right side than the second area of the keyboard layout is close to the right side. However, no limitation thereto is imposed.

In addition, the controller 1050 may determine a mode related to connection of the electronic device 1000 having the multi-function human interface.

For example, the controller 1050 may determine that the mode of the electronic device 1000 having the multi-function human interface is a first connection mode of connection to a first electronic device, a second connection mode of connection to a second electronic device, or a third connection mode of connection to a third electronic device, but is not limited thereto.

In addition, the controller 1050 may load different setting values depending on the connection modes of the electronic device 1000 having the multi-function human interface.

For example, the controller 1050 may load a first setting value when the connection mode of the electronic device 1000 having the multi-function human interface is the first connection mode. The controller 1050 may load a second setting value when the connection mode of the electronic device 1000 having the multi-function human interface is the second connection mode. The controller 1050 may load a third setting value when the connection mode of the electronic device 1000 having the multi-function human interface is the third connection mode. However, no limitation thereto is imposed.

Herein, the setting values of the electronic device 1000 having the multi-function human interface may include various setting values, such as a matching value for a key input sensor and a key code value, a setting value related to the OS of an electronic device connected, a touch sensitivity value, a pointer position movement sensitivity value, a setting value related to the operation mode of the electronic device 1000 having the multi-function human interface, and a setting value for a touch area, but are not limited to the above-described examples.

In addition, the electronic device 1000 having the multi-function human interface may further include elements, such as a memory part for storing at least one piece of data, a battery part for supplying power, and a transmitting part for transmitting at least one piece of data to a connected electronic device.

Figure 2:
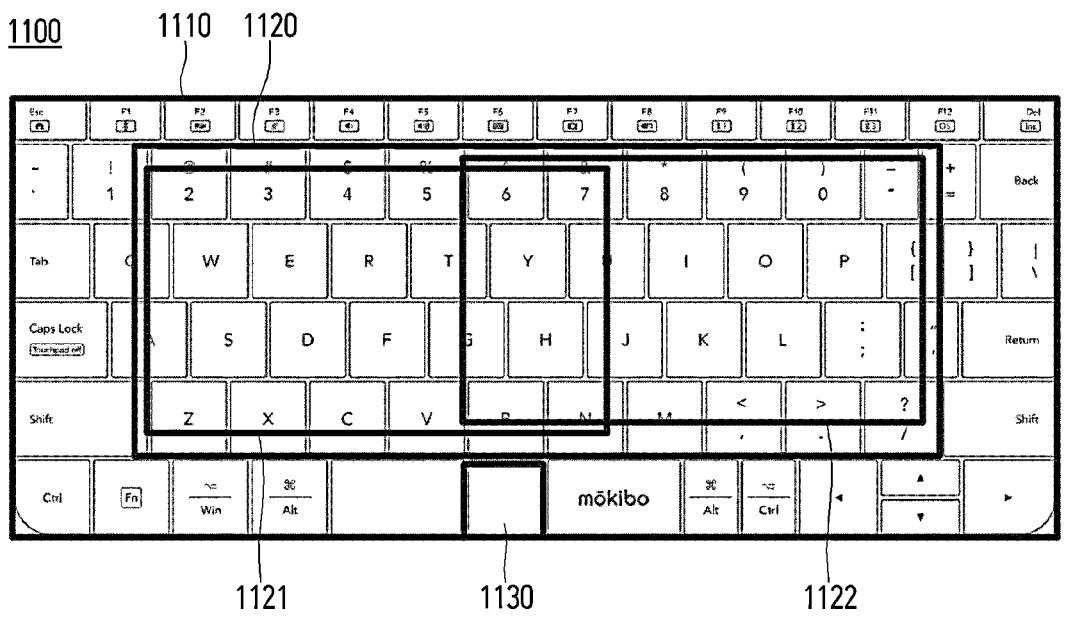
FIG. 2 is a diagram illustrating a keyboard layout of an electronic device having a multi-function human interface according to an embodiment.

FIG. 2 is a diagram illustrating a keyboard layout of an electronic device having a multi-function human interface according to an embodiment.

Referring to FIG. 2, an electronic device 1100 having a multi-function human interface according to an embodiment may include a key input area 1110 and a touch input area 1120.

Herein, the key input area 1110 may be an area for generating at least one key input signal according to a user's key input.

For example, the key input area 1110 may be an area in which when a user pushes a first key cap, a key input signal is generated from a key input sensor placed corresponding to the first key cap, or when a user pushes a second key cap, a key input signal is generated from a key input sensor placed corresponding to the second key cap, but is not limited thereto.

In addition, the user's key input may include push input and pressure input on at least one key cap included in the electronic device 1100 having the multi-function human interface, but is not limited thereto. The user's key input may include the concepts of various types of input that may be generally understood as key input.

In addition, the key input signal generated in the key input area 1110 may be processed by a controller included in the electronic device 1100 having the multi-function human interface.

For example, the controller included in the electronic device 1100 having the multi-function human interface may generate at least one key value on the basis of the key input signal generated in the key input area 1110, but is not limited thereto.

In addition, for example, the controller included in the electronic device 1100 having the multi-function human interface may generate at least one piece of pointer execution command information on the basis of the key input signal generated in the key input area 1110, but is not limited thereto.

Herein, the at least one key value may mean a key code corresponding to the key input signal, and may also mean a text value and a function value corresponding to the key code, but is not limited thereto. The at least one key value may include those generally understood as key values.

In addition, herein, the key code may mean a value used to identify a user's key input, a key input signal generated from a user's key input, a text value, or a function value, but is not limited thereto. The key code may include those that may be generally understood as key codes.

In addition, the touch input area 1120 may be an area for generating at least one touch input signal according to a user's touch input.

For example, the touch input area 1120 may be an area in which when a user touches a first area included in the touch input area 1120, a touch input signal is generated from a touch input sensor placed corresponding to the first area, or when a user touches a second area included in the touch input area 1120, a touch input signal is generated from a touch input sensor placed corresponding to the second area, but is not limited thereto.

In addition, the user's touch input may include various types of input for generating touch input signals from a touch input sensor included in the electronic device 1100 having the multi-function human interface.

For example, the user's touch input may include a touch of a key cap included in the electronic device 1100 having the multi-function human interface, but is not limited thereto.

In addition, the touch input signal generated in the touch input area 1120 may be processed by the controller included in the electronic device 1100 having the multi-function human interface.

For example, the controller included in the electronic device 1100 having the multi-function human interface may generate pointer position related information on the basis of the touch input signal generated in the touch input area 1120, but is not limited thereto.

In addition, for example, the controller included in the electronic device 1100 having the multi-function human interface may generate at least one piece of pointer execution command information on the basis of the touch input signal generated in the touch input area 1120, but is not limited thereto.

In addition, as shown in FIG. 2, the key input area 1110 and the touch input area 1120 may overlap at least partially.

For example, the key input area 1110 may be formed corresponding to the keyboard layout of the electronic device 1100 having the multi-function human interface, and the touch input area 1120 may be formed corresponding to a portion of the keyboard layout of the electronic device 1100 having the multi-function human interface. However, no limitation thereto is imposed.

In addition, for example, the touch input area 1120 may be formed to be included in the key input area 1110, but is not limited thereto.

In addition, for example, the touch input area 1120 may be formed to overlap at least a portion of the key input area 1110 and may be formed not to overlap at least a portion of the key input area 1110, but is not limited thereto.

In addition, according to an embodiment, the size of the key input area 1110 and the size of the touch input area 1120 may be the same, but are not limited thereto.

In addition, according to an embodiment, the size of the key input area 1110 and the size of the touch input area 1120 may be different from each other, but are not limited thereto.

In addition, according to an embodiment, an area in which the key input area 1110 and the touch input area 1120 overlap may be defined as a multi-functional area.

For example, as shown in FIG. 2, when the touch input area 1120 is formed to be included in the key input area 1110, an area corresponding to the touch input area 1120 may be defined as the multi-functional area. However, no limitation thereto is imposed.

In addition, a multi-functional area according to an embodiment may be an area for generating at least one key input signal according to a user's key input and for generating at least one touch input signal according to a user's touch input.

Herein, the above-described details may be applied to the key input signal generated according to a user's key input and the touch input signal generated according to a user's touch input, so a redundant description will be omitted.

In addition, referring to FIG. 2, an electronic device 1100 having a multi-function human interface according to an embodiment may include a pointer execution command unit 1130.

Herein, the pointer execution command unit 1130 may be an element for generating at least one pointer execution command.

In addition, herein, the pointer execution command may include one of the execution commands corresponding to a mouse left click or right click, but is not limited thereto.

A pointer execution command unit 1130 according to an embodiment may be placed to be included in the keyboard layout of the electronic device 1100 having the multi-function human interface.

For example, a pointer execution command unit 1130 according to an embodiment may be positioned between two space bars of the electronic device 1100 having the multi-function human interface, but is not limited thereto.

In addition, a pointer execution command unit 1130 according to an embodiment may be placed to be included in the key input area 1110.

For example, a pointer execution command unit 1130 according to an embodiment may include the above-described key input sensor. The key input sensor included in the pointer execution command unit 1130 may generate a key input signal according to a user's input to the pointer execution command unit 1130, and the controller included in the electronic device 1100 having the multi-function human interface may generate at least one pointer execution command on the basis of the key input signal. However, no limitation thereto is imposed.

In addition, a pointer execution command unit 1130 according to an embodiment may be placed outside the touch input area 1120 as shown in FIG. 2, but is not limited thereto.

In addition, a pointer execution command unit 1130 according to an embodiment may be placed inside the touch input area 1120, unlike FIG. 2, but is not limited thereto.

In addition, referring to FIG. 2, the touch input area 1120 according to an embodiment may include a first touch input area 1121 and a second touch input area 1122.

Herein, the above-described details of the touch input area 1120 may be applied to the first touch input area 1121 and the second touch input area 1122, so a redundant description will be omitted.

According to an embodiment, the first touch input area 1121 and the second touch input area 1122 may be set to overlap at least partially.

For example, as shown in FIG. 2, the first touch input area 1121 may be set to overlap the J key cap at least partially, and the second touch input area 1122 may be set to overlap the G key cap at least partially. In the area corresponding to a portion of the G key cap, a portion of the J key cap, and the H key cap, the first touch input area 1121 and the second touch input area 1122 may be set to overlap, but are not limited thereto.

In addition, according to an embodiment, the first touch input area 1121 and the second touch input area 1122 may be set not to overlap.

For example, unlike FIG. 2, the first touch input area 1121 may be set to be an area that is closer to the left side than the second touch input area 1122 is close to the left side, and may be set to overlap a portion of the H key cap. The second touch input area 1122 may be set to be an area that is closer to the right side than the first touch input area 1121 is close to the right side, and may be set to overlap another portion of the H key cap. However, no limitation thereto is imposed.

In addition, according to an embodiment, the electronic device 1100 having the multi-function human interface may operate such that different touch input areas are active depending on the operation modes.

Herein, a touch input area being active may mean that pointer position related information is generated on the basis of a touch input signal for the touch input area being active, but is not limited thereto. A touch input area being active may include concepts that are generally understood to mean that the touch input area is active.

More specifically, according to an embodiment, the electronic device 1100 having the multi-function human interface may operate in a first operation mode in which the touch input area 1120 is active, a second operation mode in which the first touch input area 1121 is active, on a third operation mode in which the second touch input area 1122 is active.

Herein, the first operation mode may be a mode for generating pointer position related information on the basis of a touch input signal generated in the touch input area 1120.

According to an embodiment, in the first operation mode, when a user's touch input to the touch input area 1120 is obtained, a touch input signal is generated and the electronic device 1100 having the multi-function human interface may generate pointer position related information on the basis of the touch input signal.

For example, in the first operation mode, when a touch start point is positioned in the touch input area 1120, the electronic device 1100 having the multi-function human interface may generate pointer position related information. However, no limitation thereto is imposed.

In addition, the second operation mode may be a mode for generating pointer position related information on the basis of a touch input signal generated in the first touch input area 1121.

According to an embodiment, in the second operation mode, when a user's touch input to the first touch input area 1121 is obtained, a touch input signal is generated and the electronic device 1100 having the multi-function human interface may generate pointer position related information on the basis of the touch input signal.

For example, in the second operation mode, when a touch start point is positioned in the first touch input area 1121, the electronic device 1100 having the multi-function human interface may generate pointer position related information. However, no limitation thereto is imposed.

In addition, according to an embodiment, in the second operation mode, when a user's touch input to a touch input area outside the first touch input area 1121 is obtained, the electronic device 1100 having the multi-function human interface may not generate pointer position related information. However, no limitation thereto is imposed.

In addition, according to an embodiment, in the second operation mode, when a touch start point is positioned in the first touch input area 1121, the electronic device 1100 having the multi-function human interface may generate pointer position related information although a touch path to a touch end point and a touch input area outside the first touch input area 1121 overlap at least partially.

In addition, the third operation mode may be a mode for generating pointer position related information on the basis of a touch input signal generated in the second touch input area 1122.

According to an embodiment, in the third operation mode, when a user's touch input to the second touch input area 1122 is obtained, a touch input signal is generated and the electronic device 1100 having the multi-function human interface may generate pointer position related information on the basis of the touch input signal.

For example, in the third operation mode, when a touch start point is positioned in the second touch input area 1122, the electronic device 1100 having the multi-function human interface may generate pointer position related information. However, no limitation thereto is imposed.

In addition, according to an embodiment, in the third operation mode, when a user's touch input to a touch input area outside the second touch input area 1122 is obtained, the electronic device 1100 having the multi-function human interface may not generate pointer position related information. However, no limitation thereto is imposed.

In addition, according to an embodiment, in the third operation mode, when a touch start point is positioned in the second touch input area 1122, the electronic device 1100 having the multi-function human interface may generate pointer position related information although a touch path to a touch end point and a touch input area outside the second touch input area 1122 overlap at least partially.

In addition, according to an embodiment, the second mode may correspond to a left hand mode and the third mode may correspond to a right hand mode, but are not limited thereto.

In addition, according to an embodiment, touch input areas that are active according to the operation modes may be specified by a user.

For example, the electronic device 1100 having the multi-function human interface may include a fourth operation mode that is a user's custom operation mode. A touch input area active in the fourth operation mode may be set by the user, but no limitation thereto is imposed.

Herein, the touch input area active in the fourth operation mode may be set in various ways, such as by a user's gesture, motion, or touch input, or by obtaining a setting value of a user from outside.

Hereinafter, an electronic device having a multi-function human interface in which a key input sensor and touch input sensor are provided in an integrated layer as described above will be described in more detail.

Figure 3:
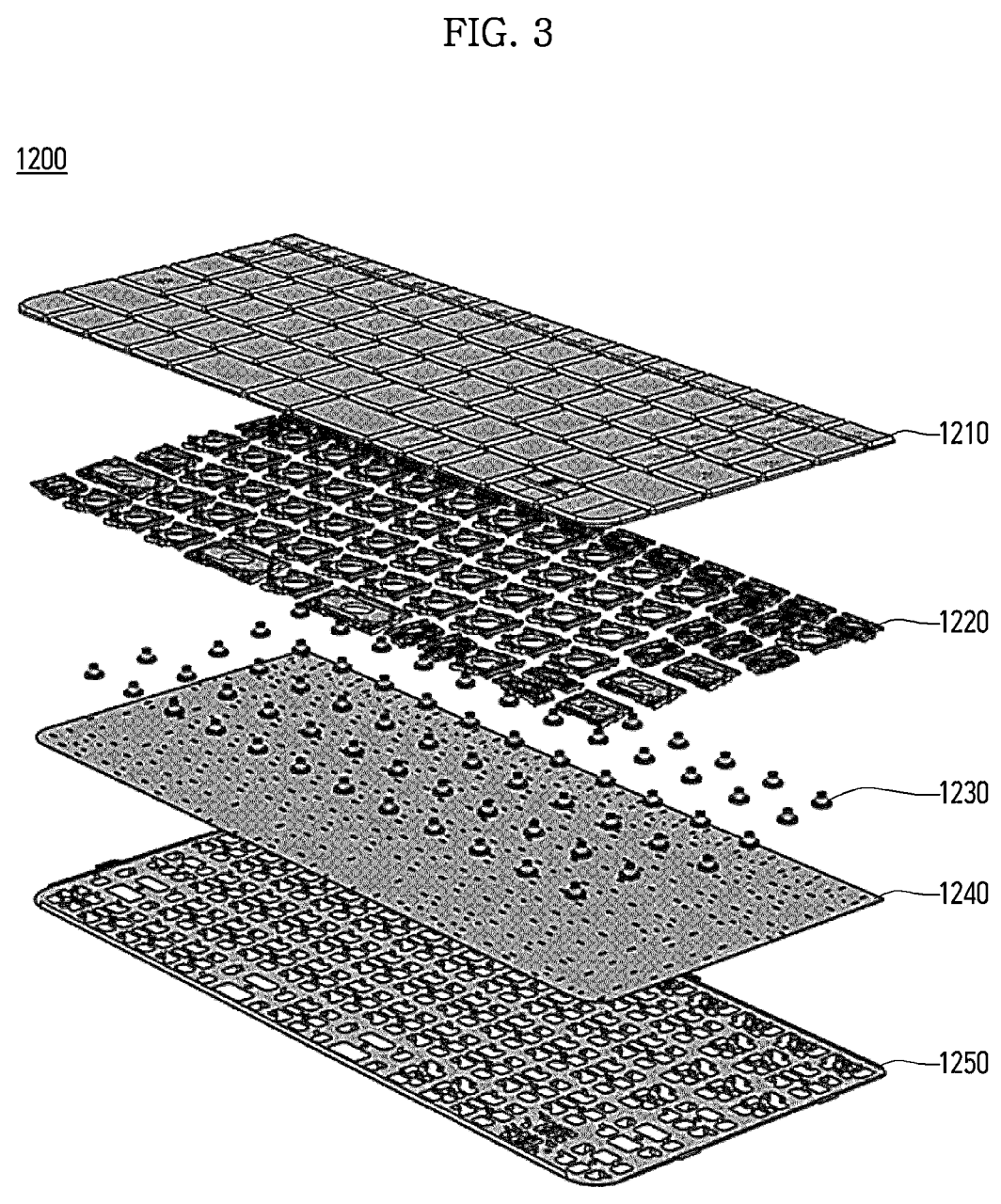

FIG. 3 is a diagram illustrating layers of an electronic device having a multi-function human interface according to an embodiment.

Referring to FIG. 3, an electronic device 1200 having a multi-function human interface according to an embodiment may include at least one of the following layers: a key cap layer 1210, a keyboard mechanism layer 1220, an elastic unit layer 1230, an electrode layer 1240, and a lower plate layer 1250.

A key cap layer 1210 according to an embodiment may include a plurality of key caps.

Herein, the above-described details may be applied to the plurality of key caps, so a redundant description will be omitted.

A plurality of key caps included in a key cap layer 1210 according to an embodiment may mean the topmost elements, which come into contact with a user, of the electronic device 1200 having the multi-function human interface, but are not limited thereto.

In addition, a plurality of key caps included in a key cap layer 1210 according to an embodiment may obtain at least one input from a user.

For example, a plurality of key caps included in a key cap layer 1210 according to an embodiment may obtain key input, text input, push input, pressure input, descending input, touch input, and sliding input from a user, but are not limited thereto.

On the surfaces of a plurality of key caps included in a key cap layer 1210 according to an embodiment, corresponding letters may be printed, but no limitation thereto is imposed.

A keyboard mechanism layer 1220 according to an embodiment may include a plurality of keyboard mechanism units.

Herein, the plurality of keyboard mechanism units included in the keyboard mechanism layer 1220 may be connected to the plurality of key caps, respectively, and may guide respective movements of the plurality of key caps.

In addition, a keyboard mechanism layer 1220 according to an embodiment may include a plurality of scissors mechanism units.

Herein, the scissors mechanism unit may mean a mechanism unit provided as a two-part assembly formed by two support units that cross in an X shape and are respectively coupled to different portions of a corresponding key cap to guide the movement of the corresponding key cap, but is not limited thereto. The scissors mechanism unit may include the concept of a scissors mechanism as generally understood.

In addition, a keyboard mechanism layer 1220 according to an embodiment may include a plurality of butterfly mechanism units.

Herein, the butterfly mechanism unit may mean a mechanism unit provided as a single-part assembly in which opposite ends of one support unit are coupled to different portions of a corresponding key cap and deformed with a hinge positioned between the opposite ends in the center to guide the movement of the corresponding key cap, but is not limited thereto. The butterfly mechanism unit may include the concept of a butterfly mechanism as generally understood.

In addition, a keyboard mechanism layer 1220 according to an embodiment may include various keyboard mechanism units for guiding movement of a corresponding key cap in addition to the above-described examples.

In addition, an elastic unit layer 1230 according to an embodiment may include a plurality of elastic units.

Herein, the above-described details may be applied to the plurality of elastic units, so a redundant description will be omitted.

The plurality of elastic units included in the elastic unit layer 1230 according to an embodiment may be placed corresponding to the plurality of key caps, respectively, to provide force of restitution to each of the plurality of key caps.

In addition, an electrode layer 1240 according to an embodiment may include a plurality of electrodes for generating key input signals or touch input signals according to a user's input.

For example, an electrode layer 1240 according to an embodiment may generate touch input signals according to a user's touch input, and may generate key input signals according to a user's key input.

Herein, the user's touch input or the user's key input may be obtained through the key cap layer 1210, but is not limited thereto. The above-described details of the touch input or key input with reference to FIG. 1 may be applied thereto, so a redundant description will be omitted.

In addition, a plurality of electrodes included in an electrode layer 1240 according to an embodiment may be placed corresponding to the key cap layer 1210.

For example, a plurality of electrodes that are included in an electrode layer 1240 according to an embodiment and function to generate at least key input signals may be placed corresponding to the plurality of key caps included in the key cap layer 1210, respectively, but are not limited thereto.

In addition, for example, a plurality of electrodes that are included in an electrode layer 1240 according to an embodiment and function to generate at least touch input signals may be placed to be overlapped by at least a portion of the plurality of key caps included in the key cap layer 1210, but are not limited thereto.

In addition, an electrode layer 1240 according to an embodiment may include a plurality of layers.

For example, an electrode layer 1240 according to an embodiment may include a first layer in which a plurality of electrodes are placed, a second layer for electrical connection to at least a portion of the plurality of electrodes, a cover layer for protecting at least a portion of the first layer or the second layer, and a conductive layer for shielding against external noise signals. The first layer, the second layer, and the cover layer may be formed in combination, but are not limited thereto.

Herein, the electrode layer 1240 may be provided with an adhesive layer for providing adhesive between at least some of the plurality of layers included in the above-described electrode layer.

In addition, herein, the cover layer may be used as a light guide plate of a backlight unit of the electronic device having the multi-function human interface.

For example, the cover layer may include a light diffusion area that receives light from a light source and allows light to diffuse in a predetermined area, but is not limited thereto.

Herein, the light diffusion area may be formed using lasers or pigments, but is not limited thereto. The light diffusion area may be formed by various methods and materials to function as the backlight unit of the electronic device having the multi-function human interface.

In addition, an electrode layer 1240 according to an embodiment may be formed as a flexible printed circuit board (FPCB) or may be formed by depositing a conductive pigment on a plastic film, but is not limited thereto.

In addition, an electrode layer 1240 according to an embodiment may include a plurality of holes.

Herein, the plurality of holes may be formed to allow a coupling member included in a lower plate to pass through to couple the plurality of keyboard mechanism units included in the above-described keyboard mechanism layer 1220 to the lower plate layer, which will be described below.

In addition, the plurality of holes may be formed to allow a coupling member included in the keyboard mechanism layer 1220 to pass through to couple the above-described keyboard mechanism layer 1220 to the lower plate layer.

In addition, at least one of the plurality of holes may not allow a coupling member for coupling the above-described keyboard mechanism layer 1220 to the lower plate layer to pass through.

Herein, at least one of the plurality of holes may function to allow the light source of the backlight to pass through, but is not limited thereto.

In addition, depending on the position state of the above-described keyboard mechanism layer 1220, at least a portion of the above-described keyboard mechanism layer 1220 may be or may not be positioned in at least one of the plurality of holes.

In addition, at least one of the plurality of holes may be formed in at least one of the plurality of layer included in the electrode layer 1240.

For example, at least one of the plurality of holes may be formed in the cover layer included in the electrode layer 1240, and may not be formed in the first layer or the second layer. However, no limitation thereto is imposed.

In addition, when at least one of the plurality of holes is formed in the cover layer included in the electrode layer 1240 and is not formed in the first layer and the second layer, the cover layer may be manufactured to have a transparent or semi-transparent characteristic. However, no limitation thereto is imposed.

In addition, at least one hole formed in the cover layer but not in the first layer and the second layer may be realized in the form of a circular, quadrangular, linear, or cross shape, but is not limited thereto.

In addition, at least one hole formed in the cover layer but not in the first layer and the second layer may be placed to be at least partially overlapped by at least one electrode included in the first layer.

For example, at least one hole formed in the cover layer but not in the first layer and the second layer may be placed to be at least partially overlapped by a first electrode and a second electrode included in the first layer, but is not limited thereto.

In addition, the above-described at least one hole formed in the cover layer but not in the first layer and/or the second layer may not only mean a physical hole, and may include the concept of a hole through which at least one substance, such as light, can pass. For example, the above-described at least one hole may include the concept of a light-transmissive area that is provided as a transparent or semi-transparent material having a higher light transmittance than the surroundings of the hole, but is not limited thereto.

A lower plate layer 1250 according to an embodiment may be provided to allow the plurality of keyboard mechanism units included in the keyboard mechanism layer 1220 to be mounted on the lower plate layer.

In addition, a lower plate layer 1250 according to an embodiment may include a plurality of coupling members for mounting the plurality of keyboard mechanism units included in the keyboard mechanism layer 1220.

Herein, a plurality of coupling members included in a lower plate layer 1250 according to an embodiment may be coupled to the plurality of keyboard mechanism units, respectively to allow each of the plurality of keyboard mechanism units to be mounted on the lower plate layer 1250.

For example, a lower plate layer 1250 according to an embodiment may include a first to a fourth coupling member. The first to the fourth coupling member may be coupled to four parts of a first keyboard mechanism unit included in the keyboard mechanism layer 1220, respectively. The first keyboard mechanism unit may be mounted on the lower plate layer 1250, but is not limited thereto.

In addition, the keyboard mechanism layer 1220 according to an embodiment may include at least one coupling member to be mounted on the lower plate layer 1250.

For example, a coupling member included in the keyboard mechanism layer 1220 according to an embodiment may pass through the plurality of holes in the electrode layer 1240 and may be coupled to the lower plate layer 1250.

Herein, at least one coupling member included in the keyboard mechanism layer 1220 may be a separate unit (not shown) for mounting a plurality of keyboard mechanism units (seesaws) included in the keyboard mechanism layer 1220 and may include a plurality of holes, but is not limited thereto.

In addition, an electronic device 1200 having a multi-function human interface according to an embodiment may be configured such that the lower plate layer 1250, the electrode layer 1240, the elastic unit layer 1230, the keyboard mechanism layer 1220, and the key cap layer 1210 are laminated in that order.

Figure 4:
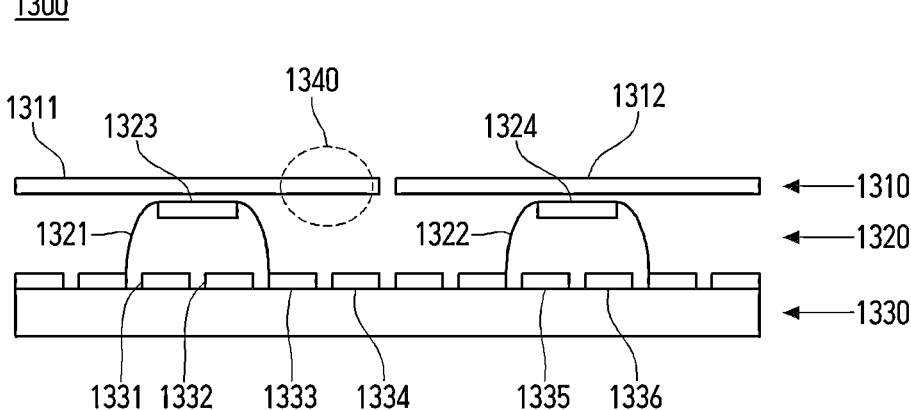
FIG. 4 is a diagram illustrating the operation of an electronic device having a multi-function human interface according to an embodiment.

FIG. 4 is a diagram illustrating the operation of an electronic device having a multi-function human interface according to an embodiment.

Referring to FIG. 4, an electronic device 1300 having a multi-function human interface according to an embodiment may include a key cap layer 1310, an elastic unit layer 1320, and an electrode layer 1330.

Herein, the above-described details may be applied to the key cap layer 1310, the elastic unit layer 1320, and the electrode layer 1330, so a redundant description will be omitted.

A key cap layer 1310 according to an embodiment may include a plurality of key caps.

For example, as shown in FIG. 4, a key cap layer 1310 according to an embodiment may include a first key cap 1311 and a second key cap 1312, but is not limited thereto.

In addition, an elastic unit layer 1320 according to an embodiment may include a plurality of elastic units.

For example, as shown in FIG. 4, an elastic unit layer 1320 according to an embodiment may include a first elastic unit 1321 placed corresponding to the first key cap 1311, and a second elastic unit 1322 placed corresponding to the second key cap 1312, but is not limited thereto.

In addition, a plurality of elastic units included in an elastic unit layer 1320 according to an embodiment may include a conductive material.

However, the above-described conductive material or the conductive material to be described below may be included in at least one key cap included in the key cap layer 1310 according to an embodiment, or at least one key cap may be provided as a conductive material. In this case, the conductive material may be configured to move in response to movement of the at least one key cap such that the distance to the electrode layer 1330 is changed. However, hereinafter, for convenience of description, a description will be given based on the case of a conductive material included in a plurality of elastic units.

For example, the first elastic unit 1321 included in an elastic unit layer 1320 according to an embodiment may include a first conductive material 1323 and the second elastic unit 1322 may include a second conductive material 1324, but are not limited thereto.

Herein, the conductive material may be an element for causing changes in capacitance of the electrode layer 1330 as the conductive material approaches the electrode layer 1330 because of external force applied to the key cap layer 1310.

In addition, the conductive material may be provided as various materials, such as carbon, for causing changes in capacitance of the electrode layer 1330.

In addition, an electrode layer 1330 according to an embodiment may include a plurality of electrodes, and the plurality of electrodes may constitute a portion of an electrode line that functions as a transmitter or a receiver.

For example, an electrode layer 1330 according to an embodiment may include a first electrode 1331, a second electrode 1332, a third electrode 1333, a fourth electrode 1334, a fifth electrode 1335, and a sixth electrode 1336, but is not limited thereto.

In addition, a plurality of electrodes included in an electrode layer 1330 according to an embodiment may be placed to be overlapped by at least a portion of the plurality of key caps.

For example, the first to the fourth electrode 1331 to 1334 included in an electrode layer 1330 according to an embodiment may be placed to be overlapped by the first key cap 1311 and the fifth and the sixth electrode 1335 and 1336 may be placed to be overlapped by the second key cap 1312, but are not limited thereto.

Herein, placing the electrodes to be overlapped by the key caps may mean overlapping the electrodes and the key caps when viewed from the direction in which the layers included in the electronic device 1300 having the multi-function human interface are laminated, but is not limited thereto.

In addition, at least a portion of a plurality of electrodes included in an electrode layer 1330 according to an embodiment may be placed corresponding to the plurality of elastic units, respectively.

For example, the first and the second electrode 1331 and 1332 included in an electrode layer 1330 according to an embodiment may be placed corresponding to the first elastic unit 1321 and the fifth and the sixth electrode 1335 and 1336 may be placed corresponding to the second elastic unit 1322, but are not limited thereto.

In addition, hereinafter, for convenience of description, the first electrode 1331, the third electrode 1333, and the fifth electrode 1335 are described as electrodes that constitute a portion of an electrode line functioning as a transmitter, and the second electrode 1332, the fourth electrode 1334, and the sixth electrode 1446 are described as electrodes that constitute a portion of an electrode line functioning as a receiver.

According to an embodiment, when a user's key input or push input on the first key cap 1311 is obtained, the first key cap 1311 may move downward.

Herein, the shape of the first elastic unit 1321 may be changed as the first key cap 1311 moves, and the change in the shape of the first elastic unit 1321 may shorten the distance between the first conductive material 1323 included in the first elastic unit 1321 and the first and the second electrode 1331 and 1332.

Accordingly, a first key input signal may be generated by changing the capacitance between the first conductive material 1323 and at least the first electrode 1331 constituting at least a portion of a first electrode line functioning as a first transmitter and the second electrode 1332 constituting at least a portion of a second electrode line functioning as a first receiver.

In addition, according to an embodiment, when a user's key input or push input on the second key cap 1312 is obtained, the second key cap 1312 may move downward.

Herein, the shape of the second elastic unit 1322 may be changed as the second key cap 1312 moves, and the change in the shape of the second elastic unit 1322 may shorten the distance between the second conductive material 1324 included in the second elastic unit 1322 and the fifth and the sixth electrode 1335 and 1336.

Accordingly, a second key input signal may be generated by changing the capacitance between the second conductive material 1324 and at least the fifth electrode 1335 constituting at least a portion of a third electrode line functioning as a second transmitter and the sixth electrode 1336 constituting at least a portion of a fourth electrode line functioning as a second receiver.

In addition, according to an embodiment, when touch input by a user's finger to a first area 1340 of the key cap layer 1310 is obtained, a first touch input signal may be generated by changing the capacitance between the user's finger and at least the third electrode 1333 constituting at least a portion of a fifth electrode line functioning as a third transmitter and the fourth electrode 1334 constituting at least a portion of a sixth electrode line functioning as a third receiver.

Herein, the size of the first key input signal and the size of the second key input signal may be equal to or greater than a first reference value, and the size of the first touch input signal may be equal to or greater than a second reference value. However, no limitation thereto is imposed.

In addition, the size of the first key input signal and the size of the second key input signal may be equal to or greater than a first reference value, and the size of the first touch input signal may be equal to or greater than a second reference value but may be equal to or less than the first reference value. However, no limitation thereto is imposed.

In addition, the first key input signal, the second key input signal, and the first touch input signal may be processed by the above-described controller, and on the basis of this, at least one key value or pointer position related information may be generated. However, the above-described details may be applied thereto, so a redundant description will be omitted.

As described above, the electronic device 1300 having the multi-function human interface shown in FIG. 4 relates to an embodiment in which the touch input sensor and the key input sensor are realized in an integrated layer. In this case, the electronic device 1300 having the multi-function human interface may have the overall volume reduced, improved durability, and reduced manufacturing cost.

Figure 5:
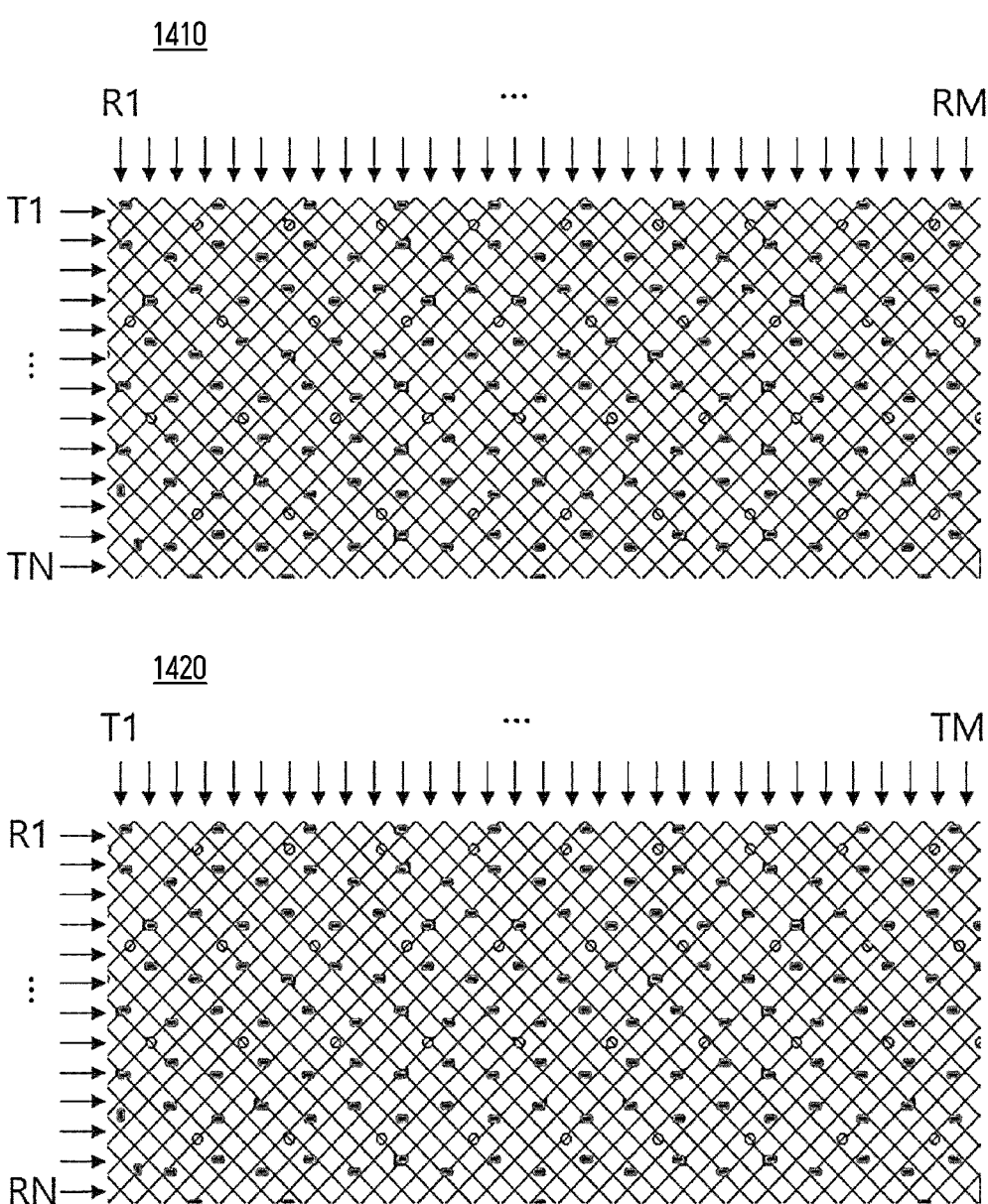
FIG. 5 is a diagram illustrating an electrode layer included in an electronic device having a multi-function human interface according to an embodiment.

FIG. 5 is a diagram illustrating an electrode layer included in an electronic device having a multi-function human interface according to an embodiment.

Referring to FIG. 5, an electronic device having a multi-function human interface according to an embodiment may include an electrode layer 1410, 1420. FIG. 5 shows a first electrode layer 1410 and a second electrode layer 1420 according to an embodiment for convenience of description.

The electrode layer 1410, 1420 according to an embodiment may include first-type lines and second-type lines.

Herein, each of the first-type lines may consist of electrodes electrically connected in a longitudinal direction (length direction) of a keyboard layout, and each of the second-type lines may consist of electrodes electrically connected in a width direction of the keyboard layout.

In addition, herein, the longitudinal direction of the keyboard layout may be understood as the X-axis direction, and the width direction of the keyboard layout may be understood as the Y-axis direction. However, no limitation thereto is imposed.

In addition, herein, the electrical connection of the electrodes constituting the first-type lines or the second-type lines may be realized on the same surface on the same layer, or may be realized through different layers formed integrated with each other. However, no limitation thereto is imposed.

In addition, in order to generate electrical signals based on changes in capacitance of the electrode layer 1410, 1420, the first-type lines may function as either a transmitter or a receiver, and the second-type lines may function as the other of the transmitter or the receiver.

For example, the first electrode layer 1410 may include first-type lines consisting of electrodes electrically connected in the longitudinal direction of the keyboard layout, and second-type lines consisting of electrodes electrically connected in the width direction of the keyboard layout. The first-type lines included in the first electrode layer 1410 may function as at least one transmitter, and the second-type lines included in the first electrode layer 1410 may function as at least one receiver.

For a more specific example, as shown in FIG. 5, the first electrode layer 1410 may include N first-type lines and M second-type lines. The N first-type lines may function as different N transmitters, and the M second-type lines may function as different M receivers. However, no limitation thereto is imposed.

In addition, for example, the second electrode layer 1420 may include first-type lines consisting of electrodes electrically connected in the longitudinal direction of the keyboard layout, and second-type lines consisting of electrodes electrically connected in the width direction of the keyboard layout. The first-type lines included in the second electrode layer 1420 may function as at least one receiver, and the second-type lines included in the second electrode layer 1420 may function as at least one transmitter.

For a more specific example, as shown in FIG. 5, the second electrode layer 1420 may include N first-type lines and M second-type lines. The N first-type lines may function as different N receivers, and the M second-type lines may function as different M transmitters. However, no limitation thereto is imposed.

In addition, the signal timing of the first-type lines included in the electrode layer 1410, 1420 according to an embodiment may be different from each other.

For example, when the first-type lines included in the electrode layer 1410, 1420 according to an embodiment function as respective transmitters, the driving signal timing of the first-type lines may be different from each other, but is not limited thereto.

In addition, for example, when the first-type lines included in the electrode layer 1410, 1420 according to an embodiment function as respective receivers, the scan signal timing of the first-type lines may be different from each other, but is not limited thereto.

In addition, the signal timing of the second-type lines included in the electrode layer 1410, 1420 according to an embodiment may be different from each other.

When the second-type lines included in the electrode layer 1410, 1420 according to an embodiment function as respective transmitters, the driving signal timing of the second-type lines may be different from each other, but is not limited thereto.

In addition, for example, when the second-type lines included in the electrode layer 1410, 1420 according to an embodiment function as respective receivers, the scan signal timing of the second-type lines may be different from each other, but is not limited thereto.

Hereinafter, the electrodes included in the above-described electrode layer 1410, 1420 will be described in more detail.

Figure 6:
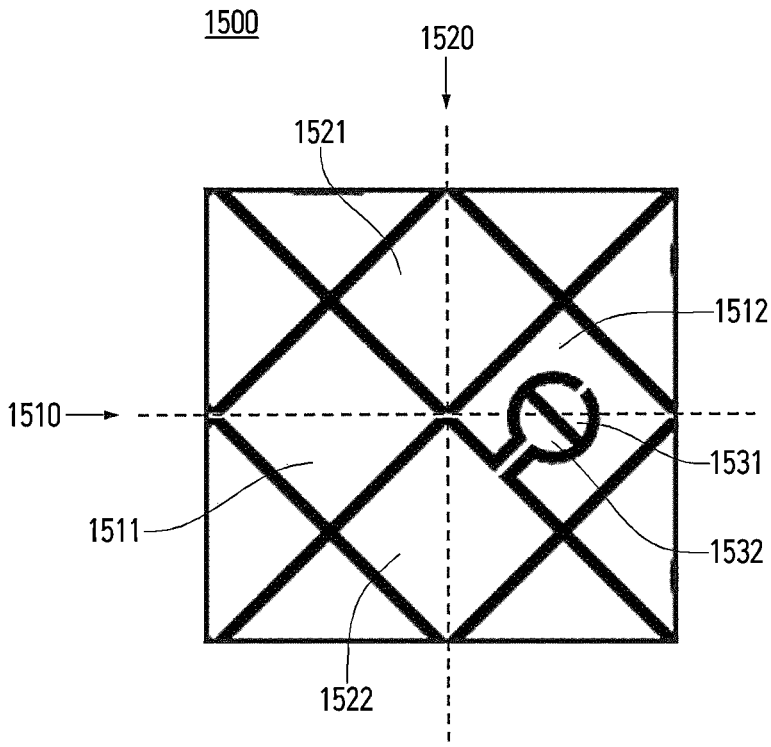
FIG. 6 is a diagram illustrating a portion of an electrode layer to describe the electrode layer included in an electronic device having a multi-function human interface according to an embodiment.

FIG. 6 is a diagram illustrating a portion of an electrode layer to describe the electrode layer included in an electronic device having a multi-function human interface according to an embodiment.

Referring to FIG. 6, an electrode layer 1500 included in an electronic device having a multi-function human interface according to an embodiment may include a first-type line 1510 and a second-type line 1520.

Herein, the above-described details may be applied to the first-type line 1510 and the second-type line 1520, so a redundant description will be omitted.

According to an embodiment, the first-type line 1510 may include a first electrode 1511 and a second electrode 1512, and the second-type line 1520 may include a third electrode 1521 and a fourth electrode 1522. However, no limitation thereto is imposed.

Herein, the first electrode 1511 and the third electrode 1521 according to an embodiment may be defined as a first-type electrode, and the second electrode 1512 and the fourth electrode 1522 may be defined as a second-type electrode.

In addition, according to an embodiment, the first-type electrode may mean an electrode for generating at least touch input signals according to a user's input, but is not limited thereto.

For example, the first-type electrode may mean an electrode for generating touch input signals according to a user's touch input, but is not limited thereto.

Herein, the above-described details may be applied to the user's touch input, so a redundant description will be omitted.

In addition, according to an embodiment, the second-type electrode may mean an electrode for generating at least key input signals according to a user's input, but is not limited thereto.

For example, the second-type electrode may mean an electrode for generating key input signals according to a user's key input, but is not limited thereto.

Herein, the above-described details may be applied to the user's key input, so a redundant description will be omitted.

In addition, according to an embodiment, the first-type electrode may mean an electrode having a predetermined shape, but is not limited thereto.

For example, the first-type electrode may mean an electrode in a rhombic shape, but is not limited thereto.

In addition, according to an embodiment, the second-type electrode may mean an electrode having a different shape than the first-type electrode, but is not limited thereto.

For example, the second-type electrode may mean an electrode not in a rhombic shape when the shape of the first-type electrode is a rhombic shape, but is not limited thereto.

In addition, according to an embodiment, the second-type electrode may include a protrusion for generating at least key input signals according to a user's input.

For example, the second electrode defined as the second-type electrode may include a first protrusion 1531, and the fourth electrode may include a second protrusion 1532. However, no limitation thereto is imposed.

In addition, according to an embodiment, the second-type electrode included in the first-type line may be placed adjacent to the second-type electrode included in the second-type line.

For example, the second electrode 1512 that is the second-type electrode included in the first-type line 1510 may be placed adjacent to the fourth electrode 1522 that is the second-type electrode included in the second-type line 1520.

In addition, according to an embodiment, a protrusion of the second-type electrode included in the first-type line may be placed adjacent to a protrusion of the second-type electrode included in the second-type line.

For example, the first protrusion 1531 of the second electrode 1512 that is the second-type electrode included in the first-type line 1510 may be placed adjacent to the second protrusion 1532 of the fourth electrode 1522 that is the second-type electrode included in the second-type line 1520.

In addition, according to an embodiment, a protrusion of the second-type electrode may be placed corresponding to an elastic unit (not shown) included in the electronic device having the multi-function human interface.

For example, the first protrusion 1531 of the second electrode 1512 and the second protrusion 1532 of the fourth electrode 1522 which are the second-type electrodes may be placed corresponding to a first elastic unit (not shown) included in the electronic device having the multi-function human interface.

In addition, according to an embodiment, a protrusion of the second-type electrode may be placed corresponding to a conductive material (not shown) of an elastic unit included in the electronic device having the multi-function human interface.

For example, the first protrusion 1531 of the second electrode 1512 and the second protrusion 1532 of the fourth electrode 1522 which are the second-type electrodes may be placed corresponding to a first conductive material (not shown) of a first elastic unit included in the electronic device having the multi-function human interface.

In addition, according to an embodiment, a protrusion of the second-type electrode may be placed corresponding to a key cap (not shown) included in the electronic device having the multi-function human interface.

For example, the first protrusion 1531 of the second electrode 1512 and the second protrusion 1532 of the fourth electrode 1522 which are the second-type electrodes may be placed corresponding to a first key cap included in the electronic device having the multi-function human interface, but is not limited thereto.

In addition, according to an embodiment, the areas of two adjacent protrusions may be substantially the same.

For example, the area of the first protrusion 1531 of the second electrode 1512 and the area of the second protrusion 1532 of the fourth electrode 1522 which are the second-type electrodes may be substantially the same, but are not limited thereto.

In addition, according to an embodiment, the areas of two adjacent protrusions may be different from each other.

For example, the area of the first protrusion 1531 of the second electrode 1512 and the area of the second protrusion 1532 of the fourth electrode 1522 which are the second-type electrodes may be different from each other, but are not limited thereto.

In addition, according to an embodiment, the areas of two adjacent protrusions may be formed to have various ratios.

For example, the area of the first protrusion 1531 of the second electrode 1512 and the area of the second protrusion 1532 of the fourth electrode 1522 which are the second-type electrodes may be formed to have various ratios, such as 5:5, 4:6, 3:7, 2:8, 1:9, 6:4, 7:3, 8:2, and 9:1, but are not limited thereto.

In addition, according to an embodiment, a protrusion of the second-type electrode may be formed to protrude in the shape of a cape.

For example, the second protrusion 1532 of the fourth electrode 1522 that is the second-type electrode may be formed to protrude in the shape of a cape of the fourth electrode 1522, but is not limited thereto.

In addition, according to an embodiment, a protrusion of the second-type electrode may be formed at a position of a bay of the second-type electrode.

For example, the first protrusion 1531 of the second electrode 1512 that is the second-type electrode may be formed to protrude at the position of the bay of the second electrode 1512, but is not limited thereto.

In addition, according to an embodiment, an electrode adjacent to and electrically connected to the second-type electrode may be a first-type electrode.

For example, the first electrode 1511 that is an electrode adjacent to and electrically connected to the second electrode 1512 that is the second-type electrode included in the first-type line 1510 may be a first-type electrode.

In addition, for example, the third electrode 1521 that is an electrode adjacent to and electrically connected to the fourth electrode 1522 that is the second-type electrode included in the second-type line 1520 may be a first-type electrode.

Hereinafter, the above-described second-type electrode will be described in more detail.

Figure 7:
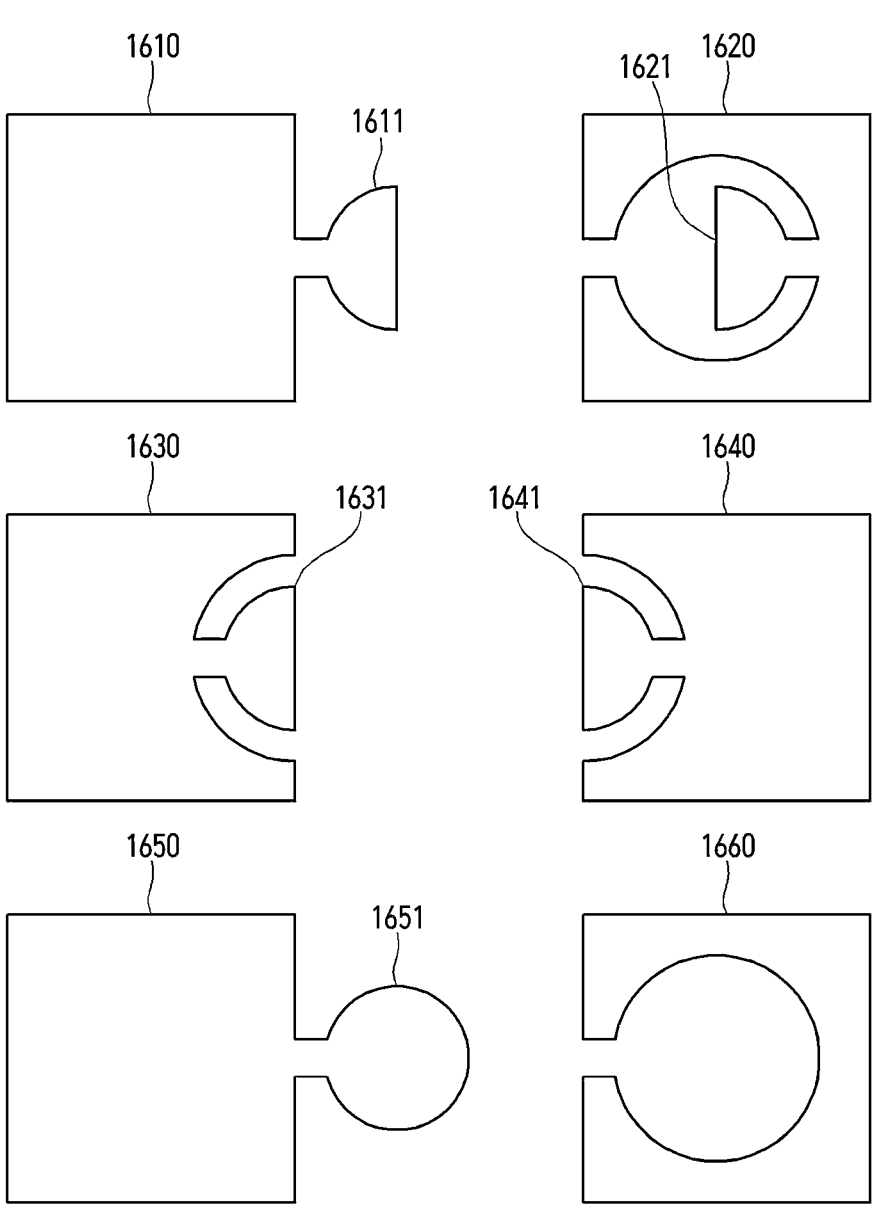
FIG. 7 is a diagram illustrating various embodiments of a second-type electrode according to an embodiment.

FIG. 7 is a diagram illustrating various embodiments of a second-type electrode according to an embodiment.

More specifically, FIG. 7 shows various embodiments of a second-type electrode that may be included in an electronic device having a multi-function human interface according to an embodiment.

Herein, the above-described details may be applied to the second-type electrode. For convenience of description, an electrode defined in the above-described details is named the second-type electrode, and it will be sufficiently understood by those skilled in the art that electrodes corresponding to the same definition are named in other ways.

Referring to FIG. 7, various embodiments of the second-type electrode may include a first electrode 1610, a second electrode 1620, a third electrode 1630, a fourth electrode 1640, a fifth electrode 1650, and a sixth electrode 1660.

However, embodiments of the present disclosure are not limited to the embodiments shown in FIG. 7, and may include various embodiments, such as modifications to FIG. 7, which may be modified to realize the technical idea of the present disclosure.

A second-type electrode according to an embodiment may include a protrusion for generating at least key input signals according to a user's input.

For example, the first electrode 1610 that is a second-type electrode according to an embodiment may include a first protrusion 1611. The second electrode 1620 that is a second-type electrode according to an embodiment may include a second protrusion 1621. The third electrode 1630 that is a second-type electrode according to an embodiment may include a third protrusion 1631. The fourth electrode 1640 that is a second-type electrode according to an embodiment may include a fourth protrusion 1641. The fifth electrode 1650 that is a second-type electrode according to an embodiment may include a fifth protrusion 1651.

In addition, a position of a protrusion included in a second-type electrode according to an embodiment may vary.

For example, the first protrusion 1611 of the first electrode 1610 that is a second-type electrode according to an embodiment may be placed at a position corresponding to the cape of the first electrode 1610, but is not limited thereto.

In addition, for example, the second protrusion 1621 of the second electrode 1620 that is a second-type electrode according to an embodiment may be placed at a position corresponding to the bay of the second electrode 1620, but is not limited thereto.

In addition, for example, the third protrusion 1631 of the third electrode 1630 that is a second-type electrode according to an embodiment may be placed at a position corresponding to the bay of the third electrode 1630, but is not limited thereto.

Herein, the size of the area corresponding to the bay of the third electrode 1630 may be different from the size of the area corresponding to the bay of the second electrode 1620. Accordingly, the position of the third protrusion 1631 of the third electrode 1630 may be different from the position of the second protrusion 1621 of the second electrode 1620.

In addition, for example, the fourth protrusion 1641 of the fourth electrode 1640 that is a second-type electrode according to an embodiment may be placed at a position corresponding to the bay of the fourth electrode 1640, but is not limited thereto.

Herein, the size of the area corresponding to the bay of the fourth electrode 1640 may be different from the size of the area corresponding to the bay of the second electrode 1620. Accordingly, the position of the fourth protrusion 1641 of the fourth electrode 1640 may be different from the position of the second protrusion 1621 of the second electrode 1620.

In addition, for example, the fifth protrusion 1651 of the fifth electrode 1650 that is a second-type electrode according to an embodiment may be placed at a position corresponding to the cape of the fifth electrode 1650, but is not limited thereto.

In addition, a second-type electrode according to an embodiment may not include a protrusion.

For example, the sixth electrode 1660 that is a second-type electrode according to an embodiment may be formed not to include a protrusion, but is not limited thereto.

In addition, according to an embodiment, two second-type electrodes may be placed as a pair.

Herein, the two second-type electrodes may be electrodes that constitute at least a portion of a line functioning as a transmitter and a line functioning as a receiver, respectively.

For example, according to an embodiment, the first electrode 1610 and the second electrode 1620 may be placed as a pair, but are not limited thereto.

In addition, for example, according to an embodiment, the third electrode 1630 and the fourth electrode 1640 may be placed as a pair, but are not limited thereto.

In addition, for example, according to an embodiment, the fifth electrode 1650 and the sixth electrode 1660 may be placed as a pair, but are not limited thereto.

In addition, according to an embodiment, the two second-type electrodes placed as a pair may be placed such that the protrusions of the respective electrodes are at least partially received in the area corresponding to the bay of one of the electrodes.

For example, according to an embodiment, the first and second electrodes 1610 and 1620 may be placed such that the first protrusion 1611 and the second protrusion 1621 are at least partially received in the area corresponding to the bay of the second electrode 1620, but are not limited thereto.

In addition, according to an embodiment, the two second-type electrodes placed as a pair may be placed such that the protrusions of the respective electrodes are at least partially received in the area defined by the bays of the respective electrodes.

For example, according to an embodiment, the third and fourth electrodes 1630 and 1640 may be placed such that the third protrusion 1631 and the fourth protrusion 1641 are at least partially received in the area defined by the area corresponding to the bay of the third electrode 1630 and by the area corresponding to the bay of the fourth electrode 1640, but are not limited thereto.

In addition, according to an embodiment, the two second-type electrodes placed as a pair may be placed such that the protrusion of one of the electrodes is at least partially received in the area corresponding to the bay of the other electrode.

For example, according to an embodiment, the fifth and sixth electrodes 1650 and 1660 may be placed such that the fifth protrusion 1651 is at least partially received in the area corresponding to the bay of the sixth electrode 1660, but are not limited thereto.

Figure 8:
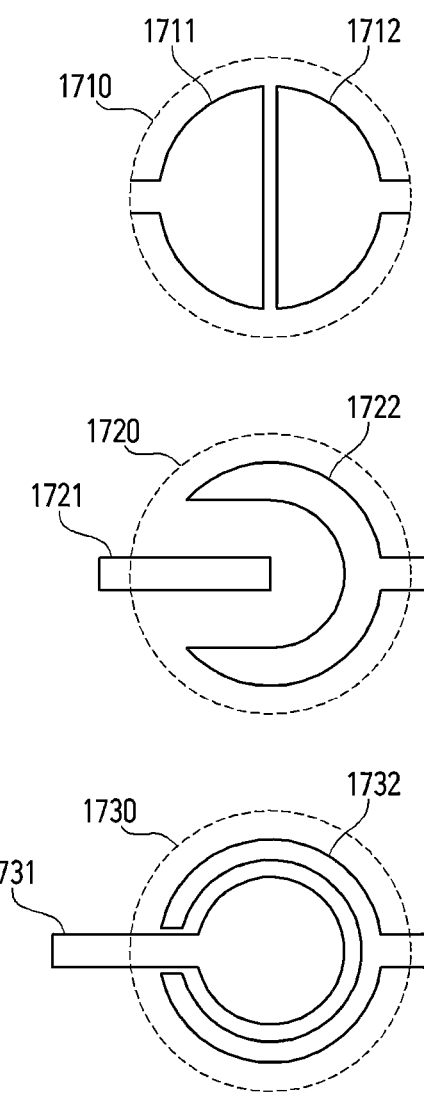
FIG. 8 is a diagram illustrating various embodiments of a protrusion of a second-type electrode according to an embodiment.

FIG. 8 is a diagram illustrating various embodiments of a protrusion of a second-type electrode according to an embodiment.

However, embodiments of the present disclosure are not limited to the embodiments shown in FIG. 8, and may include various embodiments, such as modifications to FIG. 8, which may be modified to realize the technical idea of the present disclosure.

Referring to FIG. 8, protrusions of second-type electrodes according to an embodiment may be placed as a pair, and may be provided to form an area for generating at least key input signals according to a user's input.

For example, referring to FIG. 8, a first protrusion 1711 and a second protrusion 1712 according to an embodiment may be placed as a pair, and may be provided to form a first area 1710 for generating at least key input signals according to a user's input, but are not limited thereto.

In addition, for example, referring to FIG. 8, a third protrusion 1721 and a fourth protrusion 1722 according to an embodiment may be placed as a pair, and may be provided to form a second area 1720 for generating at least key input signals according to a user's input, but are not limited thereto.

In addition, for example, referring to FIG. 8, a fifth protrusion 1731 and a sixth protrusion 1732 according to an embodiment may be placed as a pair, and may be provided to form a third area 1730 for generating at least key input signals according to a user's input, but are not limited thereto.

In addition, an electronic device having a multi-function human interface according to an embodiment may include an elastic unit, and the elastic unit may be placed corresponding to an area for generating at least key input signals according to a user's input.

For example, an elastic unit included in an electronic device having a multi-function human interface according to an embodiment may be placed corresponding to the first area 1710 that is formed by the first protrusion 1711 and the second protrusion 1712 placed as a pair according to an embodiment to generate at least key input signals according to a user's input, but is not limited thereto.

In addition, for example, an elastic unit included in an electronic device having a multi-function human interface according to an embodiment may be placed corresponding to the second area 1720 that is formed by the third protrusion 1721 and the fourth protrusion 1722 placed as a pair according to an embodiment to generate at least key input signals according to a user's input, but is not limited thereto.

In addition, for example, an elastic unit included in an electronic device having a multi-function human interface according to an embodiment may be placed corresponding to the third area 1730 that is formed by the fifth protrusion 1731 and the sixth protrusion 1732 placed as a pair according to an embodiment to generate at least key input signals according to a user's input, but is not limited thereto.

In addition, an electronic device having a multi-function human interface according to an embodiment may include an elastic unit. The elastic unit may include a conductive material. The conductive material of the elastic unit may be placed corresponding to an area for generating at least key input signals according to a user's input.

For example, a conductive material of an elastic unit included in an electronic device having a multi-function human interface according to an embodiment may be placed corresponding to the first area 1710 that is formed by the first protrusion 1711 and the second protrusion 1712 placed as a pair according to an embodiment to generate at least key input signals according to a user's input, but is not limited thereto.

In addition, for example, a conductive material of an elastic unit included in an electronic device having a multi-function human interface according to an embodiment may be placed corresponding to the second area 1720 that is formed by the third protrusion 1721 and the fourth protrusion 1722 placed as a pair according to an embodiment to generate at least key input signals according to a user's input, but is not limited thereto.

In addition, for example, a conductive material of an elastic unit included in an electronic device having a multi-function human interface according to an embodiment may be placed corresponding to the third area 1730 that is formed by the fifth protrusion 1731 and the sixth protrusion 1732 placed as a pair according to an embodiment to generate at least key input signals according to a user's input, but is not limited thereto.

A second-type electrode for generating at least key input signals has been described with reference to FIGS. 6 to 8.

However, for convenience of description, in FIGS. 6 to 8, the configuration of an electrode including a protrusion is described as a second-type electrode, but the configuration itself of a protrusion included in a second-type electrode described above may be understood as a second-type electrode. This does not depart from the technical idea of the present disclosure.

Thus, a second-type electrode is an element for generating at least key input signals, and may sometimes be understood as the above-described protrusion itself, and may also be understood as an electrode including a protrusion as described above.

Figure 9:
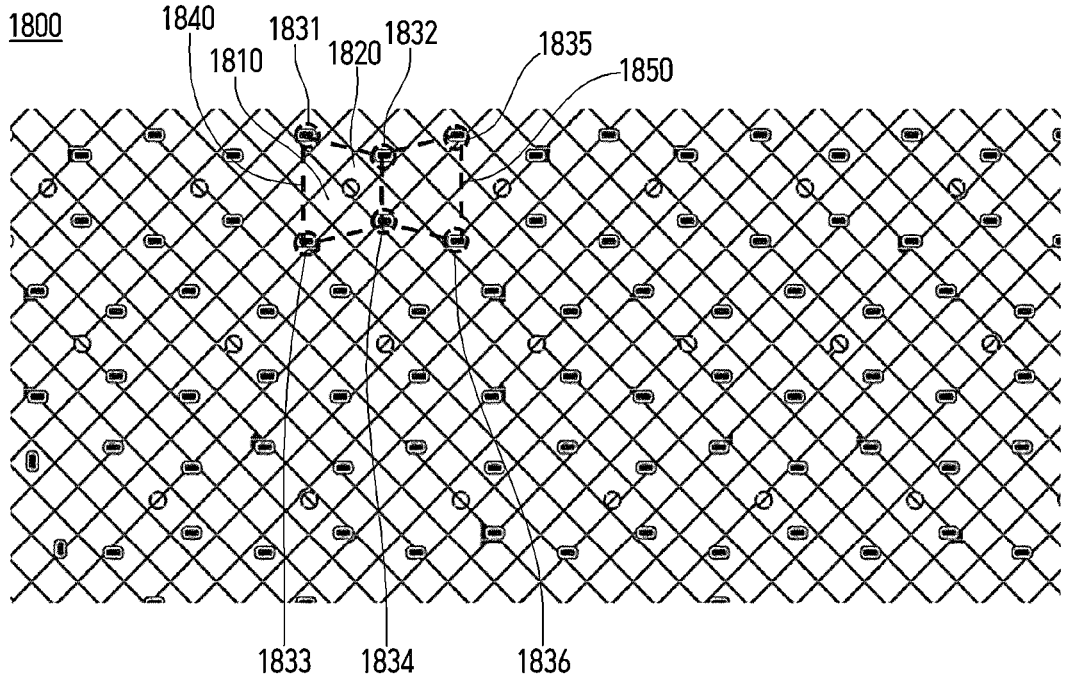
FIG. 9 is a diagram illustrating a portion of an electrode layer according to an embodiment to describe the electrode layer included in an electronic device having a multi-function human interface according to an embodiment.

FIG. 9 is a diagram illustrating a portion of an electrode layer according to an embodiment to describe the electrode layer included in an electronic device having a multi-function human interface according to an embodiment.

The above-described details of the electrode layer may be applied to an electrode layer 1800 according to an embodiment described with reference to FIG. 9, and the above-described details may be applied to a first-type line, a second-type line, a first-type electrode, and a second-type electrode included in the electrode layer, so a redundant description will be omitted.

Referring to FIG. 9, an electrode layer 1800 according to an embodiment may include a plurality of electrodes.

For example, an electrode layer 1800 according to an embodiment may include a first electrode 1810 and a second electrode 1820.

Herein, the first electrode 1810 and the second electrode 1820 may be a second-type electrode for generating at least key input signals according to a user's input.

In addition, referring to FIG. 9, an electrode layer 1800 according to an embodiment may include a plurality of holes.

For example, an electrode layer 1800 according to an embodiment may include a first hole 1831, a second hole 1832, a third hole 1833, and a fourth hole 1834.

Herein, the above-described details may be applied to the plurality of holes, so a redundant description will be omitted.

In addition, herein, the first to fourth holes 1831 to 1834 according to an embodiment may be holes for the passage of coupling members of a lower plate for coupling a first keyboard mechanism unit included in the electronic device having the multi-function human interface, but are not limited thereto.

According to an embodiment, at least one second-type electrode included in the electrode layer 1800 may be placed to be at least partially included in an area defined by at least four holes included in the electrode layer 1800.

For example, referring to FIG. 9, the first electrode 1810 and the second electrode 1820 that are second-type electrodes included in the electrode layer 1800 may be placed to be included in a first area 1840 defined by the first to fourth holes 1831 to 1834 included in the electrode layer 1800, but are not limited thereto.

In addition, according to an embodiment, a protrusion of at least one second-type electrode included in the electrode layer 1800 may be placed to be included in an area defined by at least four holes included in the electrode layer 1800.

For example, referring to FIG. 9, respective protrusions of the first electrode 1810 and the second electrode 1820 that are second-type electrodes included in the electrode layer 1800 may be placed to be included in the first area 1840 defined by the first to fourth holes 1831 to 1834 included in the electrode layer 1800, but are not limited thereto.

In addition, according to an embodiment, a plurality of holes included in the electrode layer 1800 may be formed to have different lengths in the longitudinal direction of a keyboard layout and different lengths in the width direction of the keyboard layout.

For example, the first to fourth holes 1831 to 1834 included in the electrode layer 1800 according to an embodiment may be provided in a rectangular shape of which the length in the longitudinal direction of the keyboard layout is longer than the length in the width direction of the keyboard layout, but are not limited thereto.

In addition, according to an embodiment, a plurality of holes included in the electrode layer 1800 may be provided in various shapes.

For example, a plurality of holes included in the electrode layer 1800 according to an embodiment may be provided in a rectangular shape, a square shape, an elliptical shape, a circular shape, or a trapezoidal shape, but may be provided in various shapes without limited to the above-described examples.

In addition, when a plurality of holes included in the electrode layer 1800 according to an embodiment may be formed such that the length in the longitudinal direction of the keyboard layout is different from the length in the width direction of the keyboard layout, orientations of at least some of the plurality of holes may be the same.

For example, the orientations of the first to fourth holes 1831 to 1834 included in the electrode layer 1800 may be the same as each other, but are not limited thereto.

In addition, among a plurality of holes included in the electrode layer 1800 according to an embodiment, the orientations of holes related to the same key cap may be the same as each other.

For example, when the first to fourth holes 1831 to 1834 included in the electrode layer 1800 are holes related to a first key cap, the orientations of the first to fourth holes 1831 to 1834 may be the same as each other, but are not limited thereto.

In addition, among a plurality of holes included in the electrode layer 1800 according to an embodiment, the orientations of holes related to the same keyboard mechanism unit may be the same as each other.

For example, when the first to fourth holes 1831 to 1834 included in the electrode layer 1800 are holes related to a first keyboard mechanism unit, the orientations of the first to fourth holes 1831 to 1834 may be the same as each other, but are not limited thereto.

In addition, according to an embodiment, when the second-type electrode is placed to be at least partially included in an area defined by at least four holes included in the electrode layer 1800, the second-type electrode may not be included in an area defined by at least two holes adjacent to some of the at least four holes.

For example, the electrode layer 1800 may include the first to fourth holes 1831 to 1834, a fifth hole 1835, and a sixth hole 1836. The first electrode 1810 and the second electrode 1820 may be included in the first area 1840 defined by the first to fourth holes 1831 to 1834. The second-type electrode may not be included in a second area 1850 defined by the second hole 1832, the fourth hole 1834, the fifth hole 1835, and the sixth hole 1836.

In addition, according to an embodiment, when a protrusion of the second-type electrode is placed to be included in an area defined by at least four holes included in the electrode layer 1800, a protrusion of the second-type electrode may not be included in an area defined by at least two holes adjacent to some of the at least four holes.

For example, the electrode layer 1800 may include the first to fourth holes 1831 to 1834, a fifth hole 1835, and a sixth hole 1836. The protrusions of the first electrode 1810 and the second electrode 1820 may be included in the first area 1840 defined by the first to fourth holes 1831 to 1834. The protrusion of the second-type electrode may not be included in the second area 1850 defined by the second hole 1832, the fourth hole 1834, the fifth hole 1835, and the sixth hole 1836.

In addition, according to an embodiment, the second hole 1832 may be a hole adjacent to the first hole 1831 in the longitudinal direction of the keyboard layout. The fifth hole 1835 may be a hole adjacent to the second hole 1832 in the longitudinal direction of the keyboard layout. The third hole 1833 may be a hole adjacent to the first hole 1831 in the width direction of the keyboard layout. The fourth hole 1834 may be a hole adjacent to the third hole 1833 in the longitudinal direction of the keyboard layout and adjacent to the second hole 1832 in the width direction of the keyboard layout. The sixth hole 1836 may be a hole adjacent to the fourth hole 1834 in the longitudinal direction of the keyboard layout and adjacent to the fifth hole 1835 in the width direction of the keyboard layout. However, no limitation thereto is imposed.

In addition, the distance between the first hole 1831 and the third hole 1833 may be the same as the distance between the fifth hole 1835 and the sixth hole 1836, but no limitation thereto is imposed.

In addition, the distance between the first hole 1831 and the fifth hole 1835 may be the same as the distance between the third hole 1833 and the sixth hole 1836, but no limitation thereto is imposed.

Figure 10:
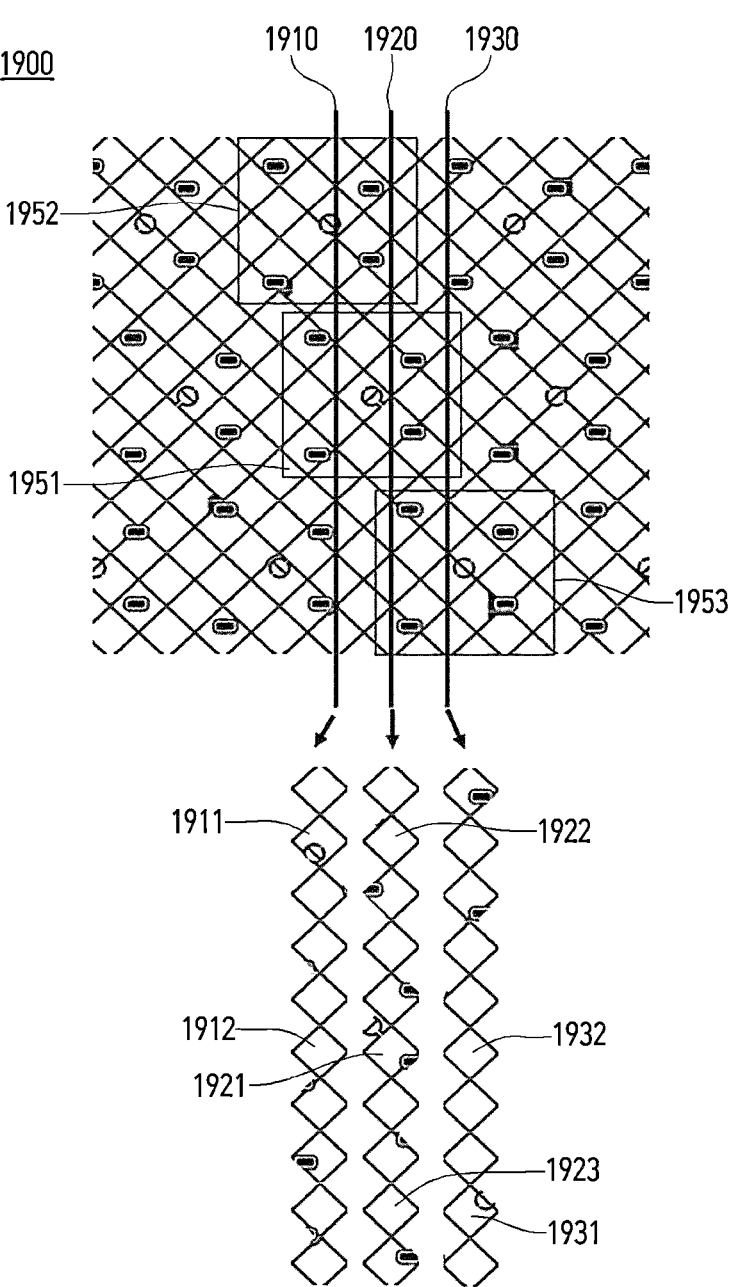
FIG. 10 is a diagram illustrating a portion of an electronic device having a multi-function human interface according to an embodiment to describe an electronic device having a multi-function human interface according to an embodiment.

FIG. 10 is a diagram illustrating a portion of an electronic device having a multi-function human interface according to an embodiment to describe an electronic device having a multi-function human interface according to an embodiment.

Referring to FIG. 10, an electronic device 1900 having a multi-function human interface according to an embodiment may include a key cap layer and an electrode layer.

Herein, the above-described details may be applied to the key cap layer and the electrode layer, so a redundant description will be omitted.

A key cap layer according to an embodiment may include a plurality of key caps.

For example, a key cap layer according to an embodiment may include a first key cap 1951, a second key cap 1952, and a third key cap 1953.

Herein, according to an embodiment, the second key cap 1952 may mean a key cap adjacent to the first key cap 1951 in the width direction of the keyboard layout. The third key cap 1953 may mean a key cap adjacent to the first key cap 1951 in the width direction of the keyboard layout and spaced apart from the second key cap 1952 in the width direction of the keyboard layout.

In addition, according to an embodiment, the second key cap 1952 may mean a key cap displaced from the first key cap 1951 by a first distance in the longitudinal direction of the keyboard layout. The third key cap 1953 may mean a key cap displaced from the first key cap 1951 by a second distance in the longitudinal direction of the keyboard layout. Herein, the second distance may be greater than the first distance, but is not limited thereto.

In addition, an electrode layer according to an embodiment may include a plurality of electrodes, and may include a plurality of second-type lines consisting of electrodes electrically connected in the width direction of the keyboard layout.

In addition, an electrode layer according to an embodiment may include a first line 1910, a second line 1920, and a third line 1930 consisting of electrodes electrically connected in the width direction of the keyboard layout, but is not limited thereto.

Herein, the shape of the first line 1910, the second line 1920, and the third line 1930 may be a shape in which electrodes constituting each of the first line 1910, the second line 1920, and the third line 1930 are connected. For ease of understanding, FIG. 10 shows the first line 1910, the second line 1920, and the third line 1930 in more detail.

The second-type lines according to an embodiment may be placed to be overlapped by at least one key cap.

Herein, the meaning of placing the second-type lines to be overlapped by at least one key cap may include the meaning of placing at least a portion of the electrodes constituting each of the second-type lines to be overlapped by at least one key cap.

For example, the first line 1910 according to an embodiment may be placed to be overlapped by the first key cap 1951 and the second key cap 1952, but is not limited thereto.

In addition, for examples, the second line 1920 according to an embodiment may be placed to be overlapped by the first key cap 1951, the second key cap 1952, and the third key cap 1953, but is not limited thereto.

In addition, for example, the third line 1930 according to an embodiment may be placed to be overlapped by the first key cap 1951 and the third key cap 1953, but is not limited thereto.

In addition, the second-type lines according to an embodiment may include a first-type electrode for generating at least touch input signals or a second-type electrode for generating at least key input signals according to a user's input.

For example, the first line 1910 according to an embodiment may include a first electrode 1911 that is a second-type electrode for generating at least key input signals and a second electrode 1912 that is a first-type electrode for generating at least touch input signals, but is not limited thereto.

In addition, for example, the second line 1920 according to an embodiment may include a third electrode 1921 that is a second-type electrode for generating at least key input signals, and a fourth electrode 1922 and a fifth electrode 1923 that are first-type electrodes for generating at least touch input signals, but is not limited thereto.

In addition, for example, the third line 1930 according to an embodiment may include a sixth electrode 1931 that is a second-type electrode for generating at least key input signals, and a seventh electrode 1932 that is a first-type electrode for generating at least touch input signals, but is not limited thereto.

In addition, regarding the electrodes constituting each of the second-type lines according to an embodiment, a first-type electrode for generating at least touch input signals may be provided with more or with a larger area than a second-type electrode for generating at least key input signals.

For example, referring to the portion of the electrode layer shown in FIG. 10, among ten electrodes constituting the first line 1910, only the first electrode 1911 may be a second-type electrode and the remaining nine electrodes may be first-type electrodes, but are not limited thereto.

In addition, for example, referring to the portion of the electrode layer shown in FIG. 10, among ten electrodes constituting the second line 1920, only the third electrode 1921 may be a second-type electrode and the remaining nine electrodes may be first-type electrodes, but are not limited thereto.

In addition, for example, referring to the portion of the electrode layer shown in FIG. 10, among ten electrodes constituting the third line 1930, only the sixth electrode 1931 may be a second-type electrode and the remaining nine electrodes may be first-type electrodes, but are not limited thereto.

In addition, according to an embodiment, the third electrode 1921 that is the second-type electrode included in the second line 1920 may be used to generate a first key input signal according to a user's key input on the first key cap 1951.

In addition, according to an embodiment, the first electrode 1911 that is the second-type electrode included in the first line 1910 may be used to generate a second key input signal according to a user's key input on the second key cap 1952.

In addition, according to an embodiment, the sixth electrode 1931 that is the second-type electrode included in the third line 1930 may be used to generate a third key input signal according to a user's key input on the third key cap 1953.

In addition, according to an embodiment, the first electrode 1911 used to generate a second key input signal according to a user's key input on the second key cap 1952 may be electrically connected to the second electrode 1912 used to generate a touch input signal according to a user's touch input to on a partial area of the first key cap 1951, but may not be electrically connected to the third electrode 1921 used to generate a first key input signal according to a user's key input on the first key cap 1951.

In addition, according to an embodiment, the third electrode 1921 used to generate a first key input signal according to a user's key input on the first key cap 1951 may be electrically connected to the fourth electrode 1922 used to generate a touch input signal according to a user's touch input on a partial area of the second key cap 1952 and the fifth electrode 1923 used to generate a touch input signal according to a user's touch input on a partial area of the third key cap 1953, but may not be electrically connected to the first electrode 1911 used to generate a second key input signal according to a user's key input on the second key cap 1952, and may not be electrically connected to the sixth electrode 1931 used to generate a third key input signal according to a user's key input on the third key cap 1953.

In addition, according to an embodiment, the sixth electrode 1931 used to generate a third key input signal according to a user's key input on the third key cap 1953 may be electrically connected to the seventh electrode 1932 used to generate a touch input signal according to a user's touch input on a partial area of the first key cap 1951, but may not be electrically connected to the third electrode 1921 used to generate a first key input signal according to a user's key input on the first key cap 1951.

In addition, according to an embodiment, at least some of the plurality of key caps may be placed to overlap a plurality of electrodes.

For example, the first key cap 1951, the second key cap 1952, and the third key cap 1953 included in the plurality of key caps may be placed to overlap a plurality of electrodes.

For a more specific example, the first key cap 1951 may be placed to overlap the second electrode 1912 and the seventh electrode 1932 that are first-type electrodes and the third electrode 1921 that is a second-type electrode. The second key cap 1952 may be placed to overlap the fourth electrode 1922 that is a first-type electrode and the first electrode 1911 that is a second-type electrode. The third key cap 1953 may be placed to overlap the fifth electrode 1923 that is a first-type electrode and the sixth electrode 1931 that is a second-type electrode.

Herein, the first electrode 1911 that is a second-type electrode overlapped by the second key cap 1952 may be electrically connected to the second electrode 1912 that is a first-type electrode overlapped by the first key cap 1951, but may not be electrically connected to the third electrode 1921 that is a second-type electrode overlapped by the first key cap 1951.

In addition, herein, the third electrode 1921 that is a second-type electrode overlapped by the first key cap 1951 may be electrically connected to the fourth electrode 1922 that is a first-type electrode overlapped by the second key cap 1952 and the fifth electrode 1923 that is a first-type electrode overlapped by the third key cap 1953, but may not be electrically connected to the first electrode 1911 that is a second-type electrode overlapped by the second key cap 1952, and may not be electrically connected to the sixth electrode 1931 that is a second-type electrode overlapped by the third key cap 1953.

In addition, herein, the sixth electrode 1931 that is a second-type electrode overlapped by the third key cap 1953 may be electrically connected to the seventh electrode 1932 that is a first-type electrode overlapped by the first key cap 1951, but may not be electrically connected to the third electrode 1921 that is a second-type electrode overlapped by the first key cap 1951.

In addition, according to an embodiment, at least two adjacent lines among second-type lines included in the electrode layer may include at least one second-type electrode.

For example, the first line 1910 and the second line 1920 adjacent to the first line 1910 may include the first electrode 1911 and the third electrode 1921 that are second-type electrodes, respectively.

In addition, for example, the second line 1920 and the third line 1930 adjacent to the second line 1920 may include the third electrode 1921 and the sixth electrode 1931 that are second-type electrodes, respectively.

Figure 11:
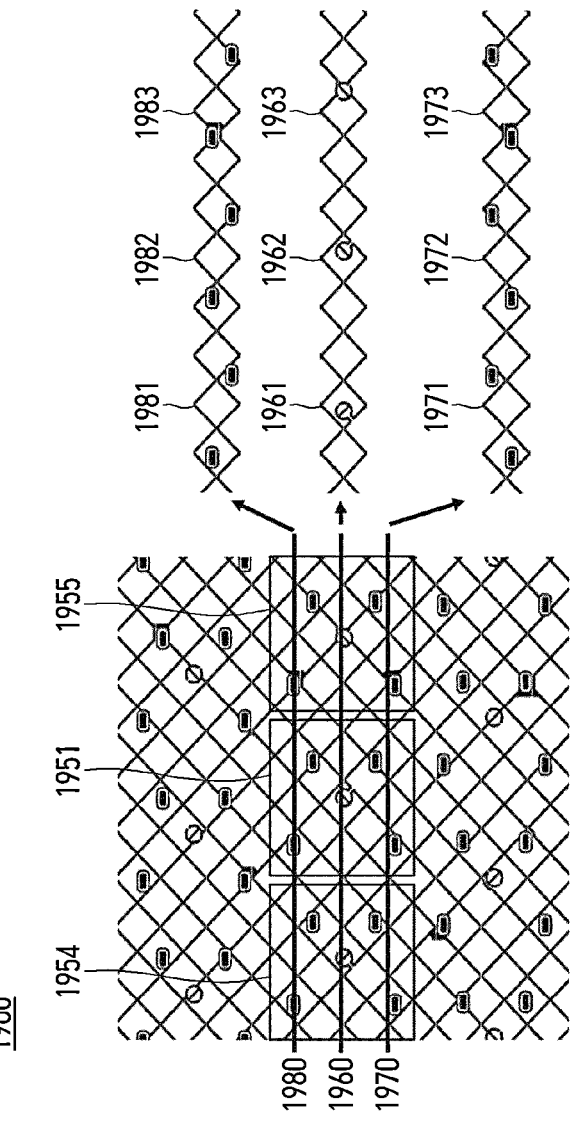
FIG. 11 is a diagram illustrating a portion of an electronic device having a multi-function human interface according to an embodiment to describe an electronic device having a multi-function human interface according to an embodiment.

FIG. 11 is a diagram illustrating a portion of an electronic device having a multi-function human interface according to an embodiment to describe an electronic device having a multi-function human interface according to an embodiment.

In addition, the electrode layers shown in FIGS. 10 and 11 may mean the same portion. The figures have been divided for convenience of description, so those skilled in the art will be able to understand FIGS. 10 and 11 comprehensively to derive the technical idea. The technical idea of the present disclosure also includes technical ideas derived considering FIGS. 10 and 11 comprehensively.

Referring to FIG. 11, an electronic device 1900 having a multi-function human interface according to an embodiment may include a key cap layer and an electrode layer.

Herein, the above-described details may be applied to the key cap layer and the electrode layer, so a redundant description will be omitted.

A key cap layer according to an embodiment may include a plurality of key caps.

For example, a key cap layer according to an embodiment may include a first key cap 1951, a fourth key cap 1954, and a fifth key cap 1955.

Herein, according to an embodiment, the fourth key cap 1954 may mean a key cap adjacent to the first key cap 1951 in the longitudinal direction of the keyboard layout. The fifth key cap 1955 may mean a key cap adjacent to the first key cap 1951 in the longitudinal direction of the keyboard layout and spaced apart from the fourth key cap 1954 in the longitudinal direction of the keyboard layout.

In addition, an electrode layer according to an embodiment may include a plurality of electrodes, and may include a plurality of first-type lines consisting of electrodes electrically connected in the longitudinal direction of the keyboard layout.

For example, an electrode layer according to an embodiment may include a fourth line 1960, a fifth line 1970, and a sixth line 1980 consisting of electrodes electrically connected in the longitudinal direction of the keyboard layout, but is not limited thereto.

Herein, the shape of the fourth line 1960, the fifth line 1970, and the sixth line 1980 may be a shape in which electrodes constituting each of the fourth line 1960, the fifth line 1970, and the sixth line 1980 are connected. For ease of understanding, FIG. 11 shows the fourth line 1960, the fifth line 1970, and the sixth line 1980 in more detail.

The first-type lines according to an embodiment may be placed to be overlapped by at least one key cap.

Herein, the meaning of placing the first-type lines to be overlapped by at least one key cap may include the meaning of placing at least a portion of the electrodes constituting each of the first-type lines to be overlapped by at least one key cap.

For example, the fourth line 1960 according to an embodiment may be placed to be overlapped by the first key cap 1951, the fourth key cap 1954, and the fifth key cap 1955, but is not limited thereto.

In addition, for example, the fifth line 1970 according to an embodiment may be placed to be overlapped by the first key cap 1951, the fourth key cap 1954, and the fifth key cap 1955, but is not limited thereto.

In addition, for example, the sixth line 1970 according to an embodiment may be placed to be overlapped by the first key cap 1951, the fourth key cap 1954, and the fifth key cap 1955, but is not limited thereto.

In addition, the first-type lines according to an embodiment may include a first-type electrode for generating at least touch input signals or a second-type electrode for generating at least key input signals according to a user's input.

For example, the fourth line 1960 according to an embodiment may include an eighth electrode 1961, a ninth electrode 1962, and a tenth electrode 1963 that are second-type electrodes for generating at least key input signals, but is not limited thereto.

In addition, for example, the fifth line 1970 according to an embodiment may include an eleventh electrode 1971, a twelfth electrode 1972, and a thirteenth electrode 1973 that are first-type electrodes for generating at least touch input signals, but is not limited thereto.

In addition, for example, the sixth line 1980 according to an embodiment may include a fourteenth electrode 1981, a fifteenth electrode 1982, and a sixteenth electrode 1983 that are first-type electrodes for generating at least touch input signals, but is not limited thereto.

In addition, regarding the electrodes constituting each of the first-type lines according to an embodiment, a first-type electrode for generating at least touch input signals may be provided with more or with a larger area than a second-type electrode for generating at least key input signals.

For example, referring to the portion of the electrode layer shown in FIG. 11, among ten electrodes constituting the fourth line 1960, the eighth electrode 1961, the ninth electrode 1962, and the tenth electrode 1963 may be second-type electrodes and the remaining seven electrode may be first-type electrodes, but are not limited thereto.

In addition, for example, referring to the portion of the electrode layer shown in FIG. 11, all ten electrodes constituting the fifth line 1970 may be first-type electrodes, but are not limited thereto.

In addition, for example, referring to the portion of the electrode layer shown in FIG. 11, all ten electrodes constituting the sixth line 1980 may be first-type electrodes, but are not limited thereto.

In addition, according to an embodiment, the eighth electrode 1961 that is the second-type electrode included in the fourth line 1960 may be used to generate a fourth key input signal according to a user's key input on the fourth key cap 1954.

In addition, according to an embodiment, the ninth electrode 1962 that is the second-type electrode included in the fourth line 1960 may be used to generate a first key input signal according to a user's key input on the first key cap 1951.

In addition, according to an embodiment, the tenth electrode 1963 that is the second-type electrode included in the fourth line 1960 may be used to generate a fifth key input signal according to a user's key input on the fifth key cap 1955.

In addition, according to an embodiment, when any one of the first-type lines included in the electrode layer includes a second-type electrode, another adjacent line may not include a second-type electrode.

For example, when the fourth line 1960 includes the eighth electrode 1961, the ninth electrode 1962, and the tenth electrode 1963 that are second electrodes, the fifth line 1970 and the sixth line 1980 adjacent to the fourth line 1960 may not include a second-type electrode.

In addition, according to an embodiment, when a first-type line included in the electrode layer includes a plurality of second-type electrodes, the numbers of first-type electrodes placed between adjacent second-type electrodes among the plurality of second-type electrodes may be at least partially the same.

For example, when the fourth line 1960 includes the eighth electrode 1961, the ninth electrode 1962, and the tenth electrode 1963 that are second-type electrodes, the number of first-type electrodes placed between the eighth and ninth electrodes 1961 and 1962 may be two and the number of first-type electrodes placed between the ninth and tenth electrodes 1962 and 1963 may also be two, but are not limited thereto.

FIG. 12 is a diagram illustrating an electrode layer included in an electronic device having a multi-function human interface according to an embodiment.

In FIG. 12, for convenience of description, electrodes and electrical connection lines are shown in block.

Referring to FIG. 12, an electrode layer 2000 according to an embodiment may consist of a plurality of layers.

For example, as shown in FIG. 12, the electrode layer 2000 according to an embodiment may at least include a first layer 2010 and a second layer 2020, but is not limited thereto.

Herein, the above-described details of the electrode layer, such as a first-type line, a second-type line, a first-type electrode, and a second-type electrode, may be applied to the electrode layer 2000, so a redundant description will be omitted.

According to an embodiment the first layer 2010 included in the electrode layer 2000 may be a layer in which electrodes are positioned.

For example, the first layer 2010 may be a layer in which electrodes are patterned, but is not limited thereto.

In addition, according to an embodiment, electrical connection of electrodes included in the electrode layer 2000 and included in at least one line of a first-type line constituting electrodes electrically connected in the longitudinal direction of the keyboard layout or a second-type line constituting electrodes electrically connected in the width direction of the keyboard layout may be provided in the first layer 2010.

For example, as shown in FIG. 12, electrical connection for a first-type line constituting electrodes electrically connected in the longitudinal direction of the keyboard layout may be provided in the first layer 2010, but is not limited thereto.

In addition, according to an embodiment, the second layer 2020 included in the electrode layer 2000 may be a layer for providing electrical connection between at least some of the electrodes positioned in the first layer 2010.

For example, the second layer 2020 may be a layer with patterned wires for providing electrical connection between at least some of the electrodes positioned in the first layer 2010, but is not limited thereto.

In addition, according to an embodiment, electrical connection of electrodes included in the electrode layer 2000 and included in at least one line of a first-type line constituting electrodes electrically connected in the longitudinal direction of the keyboard layout or a second-type line constituting electrodes electrically connected in the width direction of the keyboard layout may be provided in the second layer 2020.

For example, as shown in FIG. 12, electrical connection for a second-type line constituting electrodes electrically connected in the width direction of the keyboard layout may be provided through the second layer 2020, but is not limited thereto.

The details described with reference to FIG. 12 relates to an embodiment of providing electrical connection between electrodes for generating touch input signals or key input signals. The technical idea of the present disclosure is not limited to the embodiment described with reference to FIG. 12. Various methods of electrically connecting electrodes or providing electrically connected electrodes may be also included in the technical idea of the present disclosure.

Figure 13:
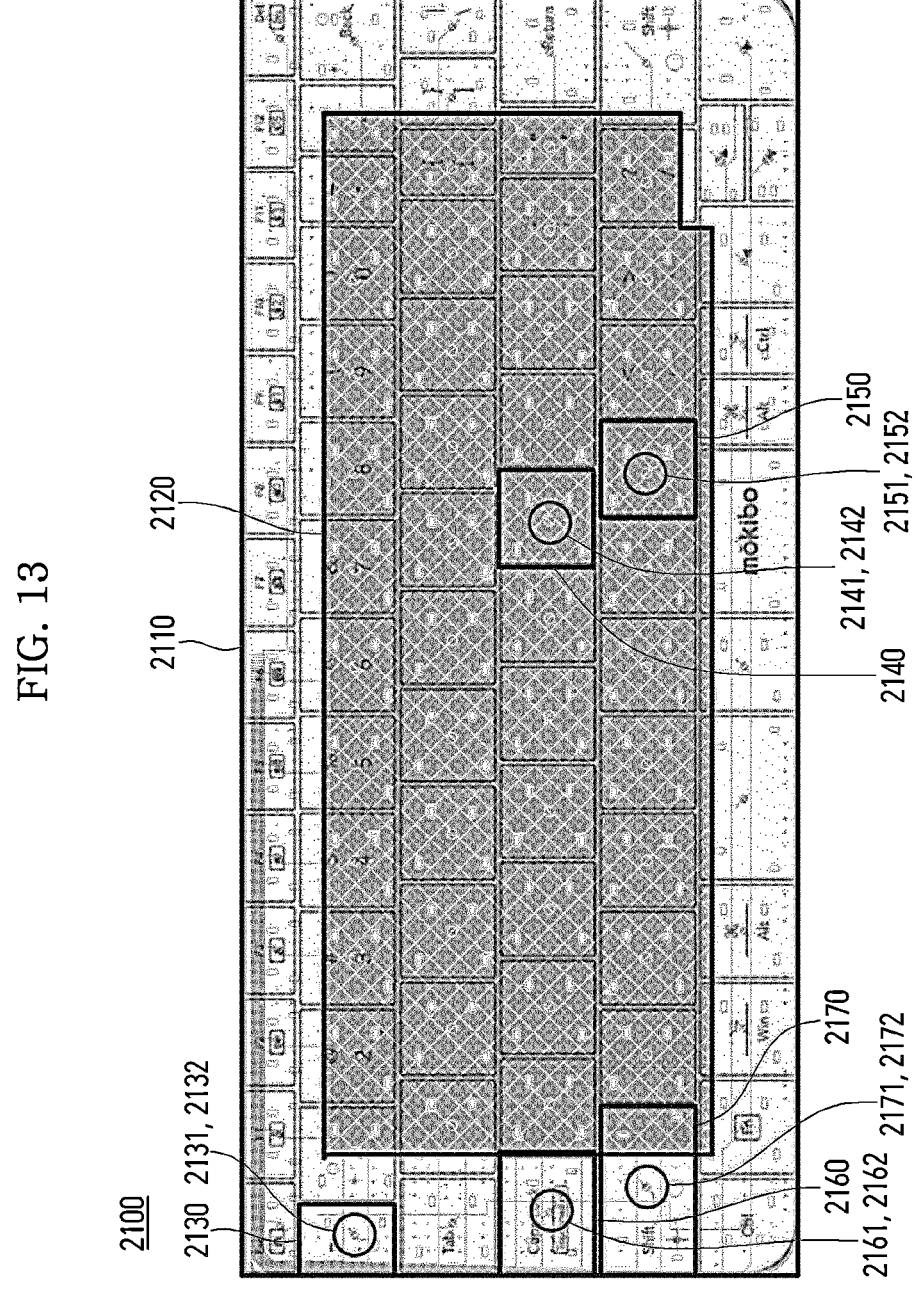
FIG. 13 is a diagram illustrating an electronic device having a multi-function human interface according to an embodiment.

FIG. 13 is a diagram illustrating an electronic device having a multi-function human interface according to an embodiment.

Referring to FIG. 13, an electronic device 2100 having a multi-function human interface according to an embodiment may include a key cap layer and an electrode layer.

Herein, the above-described details may be applied to the key cap layer and the electrode layer, so a redundant description will be omitted.

In addition, referring to FIG. 13, an electronic device 2100 having a multi-function human interface according to an embodiment may include a key input area 2110 and a touch input area 2120. In an area in which the key input area 2110 and the touch input area 2120 overlap, a multi-functional area may be positioned.

Herein, the above-described details may be applied to the key input area 2110, the touch input area 2120, and the multi-functional area, so a redundant description will be omitted.

A key cap layer according to an embodiment may include a key cap included in the multi-functional area and a key cap not included in the multi-functional area.

For example, a key cap layer according to an embodiment may include a first key cap 2130 not overlapping the multi-functional area and not included in the multi-functional area, a second key cap 2140 overlapping the multi-functional area and included in the multi-functional area, a third key cap 2150 overlapping the multi-functional area and included in the multi-functional area, a fourth key cap 2160 not overlapping the multi-functional area and not included in the multi-functional area, and a fifth key cap 2170 partially overlapping the multi-functional area and not included in the multi-functional area, but is not limited thereto.

In addition, according to an embodiment, in order to generate a key input signal according to a user's key input to the key input area 2110 of the electronic device 2100 having the multi-function human interface, at least one pair of electrodes may be placed to be overlapped by a plurality of key caps included in the key cap layer.

For example, at least a first and second electrodes 2131 and 2132 may be placed to be overlapped by the first key cap in order to generate a first key input signal according to a user's key input on the first key cap 2130.

In addition, for example, at least a third and fourth electrodes 2141 and 2142 may be placed to be overlapped by the second key cap in order to generate a second key input signal according to a user's key input on the second key cap 2140.

In addition, for example, at least a fifth and sixth electrodes 2151 and 2152 may be placed to be overlapped by the third key cap in order to generate a third key input signal according to a user's key input on the third key cap 2150.

In addition, for example, at least a seventh and eighth electrodes 2161 and 2162 may be placed to be overlapped by the fourth key cap in order to generate a fourth key input signal according to a user's key input on the fourth key cap 2160.

In addition, for example, at least a ninth and tenth electrodes 2171 and 2172 may be placed to be overlapped by the fifth key cap in order to generate a fifth key input signal according to a user's key input on the fifth key cap 2170.

In addition, according to an embodiment, a pair of electrodes overlapped by a key cap not included in the multi-functional area may be third-type electrodes.

For example, the first and second electrodes 2131 and 2132 placed to be overlapped by the first key cap 2130 may be third-type electrodes, but are not limited thereto.

In addition, for example, the seventh and eighth electrodes 2161 and 2162 placed to be overlapped by the fourth key cap 2160 may be third-type electrodes, but are not limited thereto.

In addition, for example, the ninth and tenth electrodes 2171 and 2172 placed to be overlapped by the fifth key cap 2170 may be third-type electrodes, but are not limited thereto.

Herein, the third-type electrode may be an electrode for generating key input signals according to a user's input.

In addition, the third-type electrode may be provided in the shape of a protrusion of the above-described second-type electrode, but is not limited thereto.

In addition, a key cap not overlapping the multi-functional area may overlap a pair of electrodes, but may not overlap other electrodes among a plurality of electrodes included in the electrode layer.

For example, the first key cap 2130 may overlap the first and second electrodes 2131 and 2132, but may not overlap other electrodes included in the electrode layer. However, no limitation thereto is imposed.

In addition, according to an embodiment, electrodes for generating key input signals respectively for two key caps adjacent in the width direction of the keyboard layout among the key caps included in the multi-functional area may not be electrically connected to each other.

For example, the electrodes for generating a second key input signal and a third key input signal respectively for the second key cap 2140 and the third key cap 2150 that are included in the multi-functional area and adjacent to each other in the width direction of the keyboard layout may not be electrically connected to each other.

More specifically, the third and fourth electrodes 2141 and 2142 that are overlapped by the second key cap 2140 and for generating the second key input signal may not be electrically connected to the fifth and sixth electrodes 2151 and 2152 that are overlapped by the third key cap 2150 and for generating the third key input signal.

In addition, according to an embodiment, at least portions of electrodes for generating key input signals respectively for two key caps adjacent in the width direction of the keyboard layout among the key caps not included in the multi-functional area may be electrically connected to each other.

For example, at least portions of electrodes for generating a fourth key input signal and a fifth key input signal respectively for the fourth key cap 2160 and the fifth key cap 2170 that are not included in the multi-functional area and are adjacent to each other in the width direction of the keyboard layout may be electrically connected to each other.

More specifically, the seventh electrode 2161 among a pair of electrodes that are overlapped by the fourth key cap 2160 and for generating the fourth key input signal may be electrically connected to the ninth electrode 2171 among a pair of electrodes that are overlapped by the fifth key cap 2170 and for generating the fifth key input signal.

According to the technical idea of the present disclosure described with reference to FIG. 13, a key input sensor and a touch input sensor may be realized in an electrode layer, the touch resolution of a multi-functional area may be improved, and the configuration of a key input area not included in the multi-functional area may be more simplified.

Figure 14:
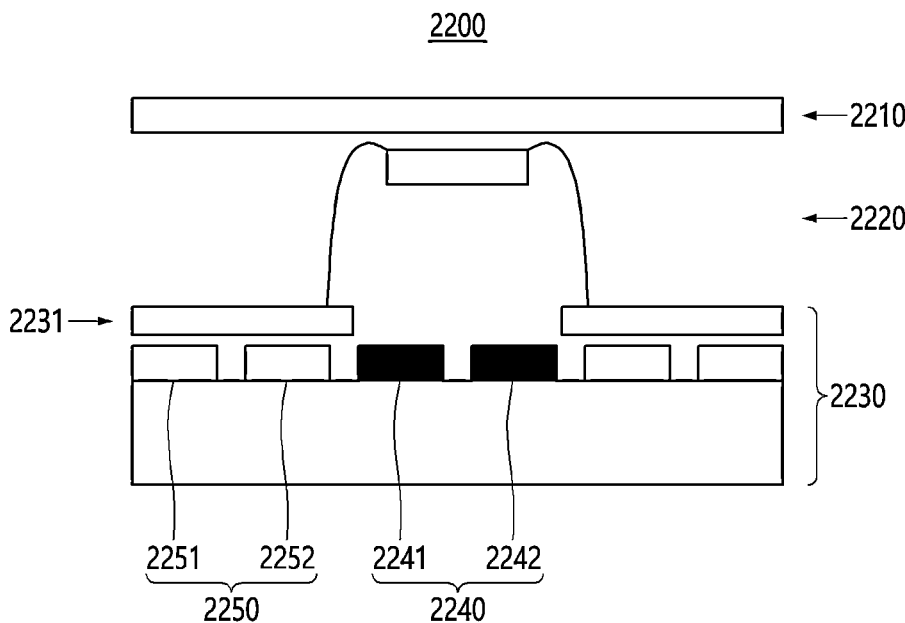
FIG. 14 is a diagram illustrating an electronic device having a multi-function human interface according to an embodiment.

FIG. 14 is a diagram illustrating an electronic device having a multi-function human interface according to an embodiment.

More specifically, FIG. 14 is a diagram illustrating an electronic device having a multi-function human interface, using a portion of the electronic device having the multi-function human interface for convenience of description.

Referring to FIG. 14, an electronic device 2200 having a multi-function human interface according to an embodiment may include a key cap layer 2210, an elastic unit layer 2220, and an electrode layer 2230.

Herein, the above-described details may be applied to the key cap layer 2210, the elastic unit layer 2220, and the electrode layer 2230, so a redundant description will be omitted.

In addition, an electrode layer 2230 according to an embodiment may include at least one touch input sensor 2250 and at least one key input sensor 2240.

Herein, the above-described details may be applied to the at least one touch input sensor 2250, so a redundant description will be omitted.

In addition, herein, the above-described details may be applied to the at least one key input sensor 2240, so a redundant description will be omitted.

In addition, herein, the above-described details of the third-type electrode and the switch may be applied to the at least one key input sensor 2240, so a redundant description will be omitted.

In addition, at least one key input sensor 2240 according to an embodiment may be configured as a portion of at least one electrode constituting at least one touch input sensor 2250, and may consist of an electrode different from at least one electrode constituting at least one touch input sensor 2250. When two electrodes constitute at least one key input sensor 2240 according to an embodiment, one of the electrodes may be configured as a portion of at least one electrode constituting at least one touch input sensor 2250 and the other one of the electrodes may be configured as an electrode different from at least one electrode constituting at least one touch input sensor 2250. However, no limitation thereto is imposed.

In addition, an electrode layer 2230 according to an embodiment may further include an insulating layer 2231.

Herein, for convenience of description, the insulating layer 2231 is described as being included in the electrode layer 2230, but may be provided to be distinguished from the electrode layer 2230.

In addition, an insulating layer 2231 according to an embodiment may be placed to overlap at least one electrode included in the electrode layer 2230.

For example, an insulating layer 2231 according to an embodiment may be placed to overlap a first electrode 2251 and a second electrode 2252 constituting a touch input sensor 2250 included in the electrode layer 2230, but is not limited thereto.

In addition, an insulating layer 2231 according to an embodiment may be placed not to overlap at least one electrode included in the electrode layer 2230.

For example, an insulating layer 2231 according to an embodiment may be placed not to overlap a third electrode 2241 and a fourth electrode 2242 constituting a key input sensor 2240 included in the electrode layer 2230, but is not limited thereto.

In addition, an insulating layer 2231 according to an embodiment may be provided to include at least one hole.

For example, an insulating layer 2231 according to an embodiment may be provided to include a first hole positioned in an area corresponding to a third electrode 2241 and a fourth electrode 2242 constituting a key input sensor 2240 included in the electrode layer 2230, but is not limited thereto.

In addition, for example, an insulating layer 2231 according to an embodiment may be provided to include a first hole positioned in an area corresponding to a first conductive material included in a first elastic unit included in the elastic unit layer 2220, but is not limited thereto.

In addition, for example, an insulating layer 2231 according to an embodiment may be provided to include a first hole positioned in an area corresponding to the center of a first key cap included in the key cap layer 2210, but is not limited thereto.

Figure 15:
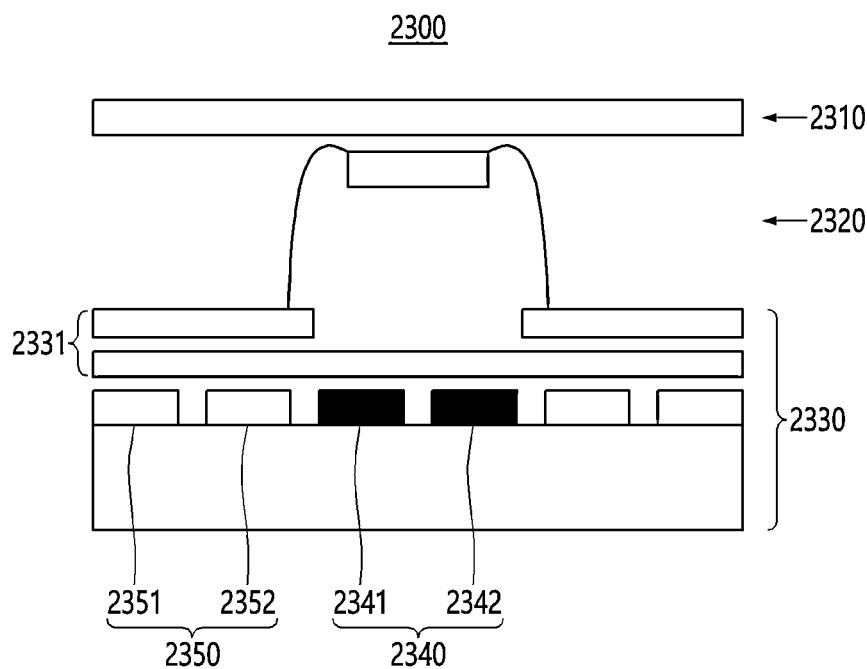
FIG. 15 is a diagram illustrating an electronic device having a multi-function human interface according to an embodiment.

FIG. 15 is a diagram illustrating an electronic device having a multi-function human interface according to an embodiment.

More specifically, FIG. 15 is a diagram illustrating an electronic device having a multi-function human interface, using a portion of the electronic device having the multi-function human interface for convenience of description.

Referring to FIG. 15, an electronic device 2300 having a multi-function human interface according to an embodiment may include a key cap layer 2310, an elastic unit layer 2320, and an electrode layer 2330.

Herein, the above-described details may be applied to the key cap layer 2310, the elastic unit layer 2320, and the electrode layer 2330, so a redundant description will be omitted.

In addition, an electrode layer 2330 according to an embodiment may include at least one touch input sensor 2350 and at least one key input sensor 2340.

Herein, the above-described details may be applied to the at least one touch input sensor 2350, so a redundant description will be omitted.

In addition, herein, the above-described details may be applied to the at least one key input sensor 2340, so a redundant description will be omitted.

In addition, herein, the above-described details of the third-type electrode and the switch may be applied to the at least one key input sensor 2340, so a redundant description will be omitted.

In addition, at least one key input sensor 2340 according to an embodiment may be configured as a portion of at least one electrode constituting at least one touch input sensor 2350, and may consist of an electrode different from at least one electrode constituting at least one touch input sensor 2350. When two electrodes constitute at least one key input sensor 2340 according to an embodiment, one of the electrodes may be configured as a portion of at least one electrode constituting at least one touch input sensor 2350 and the other one of the electrode may be configured as an electrode different from at least one electrode constituting at least one touch input sensor 2350. However, no limitation thereto is imposed.

In addition, an electrode layer 2330 according to an embodiment may further include an insulating layer 2331.

Herein, for convenience of description, the insulating layer 2331 is described as being included in the electrode layer 2330, but may be provided to be distinguished from the electrode layer 2330.

In addition, an insulating layer 2331 according to an embodiment may be placed to overlap at least one electrode included in the electrode layer 2330.

For example, an insulating layer 2331 according to an embodiment may be placed to overlap a first electrode 2351 and a second electrode 2352 constituting a touch input sensor 2350, and a third electrode 2341 and a fourth electrode 2342 constituting a key input sensor 2340 included in the electrode layer 2330, but is not limited thereto.

In addition, an insulating layer 2331 according to an embodiment may be provided to have different thicknesses at least partially.

For example, an insulating layer 2331 according to an embodiment may be provided such that the thickness of a first area overlapping a first electrode 2351 and a second electrode 2352 constituting a touch input sensor 2350 included in the electrode layer 2330 is greater than the thickness of a second area overlapping a third electrode 2341 and a fourth electrode 2342 constituting a key input sensor 2340 included in the electrode layer 2330, but is not limited thereto.

In addition, for example, an insulating layer 2331 according to an embodiment may be provided such that the thickness of a first area overlapping a first electrode 2351 and a second electrode 2352 constituting a touch input sensor 2350 included in the electrode layer 2330 is greater than the thickness of a second area corresponding to a first conductive material included in a first elastic unit included in the elastic unit layer 2220, but is not limited thereto.

In addition, for example, an insulating layer 2331 according to an embodiment may be provided such that the thickness of a first area overlapping a first electrode 2351 and a second electrode 2352 constituting a touch input sensor 2350 included in the electrode layer 2330 is greater than the thickness of a second area corresponding to the center of a first key cap, but is not limited thereto.

In addition, according to the technical idea of the present disclosure described generally throughout the present specification, the integration of a key input sensor and a touch input sensor may reduce the overall thickness and volume of an electronic device having a multi-function human interface, may enable faster and clearer switching of usage interfaces of an electronic device having a multi-function human interface in terms of being capable of controlling integrated signals, and may, as described above, improve the durability of an electronic device having a multi-function human interface and reduce manufacturing cost.

Figure 16:
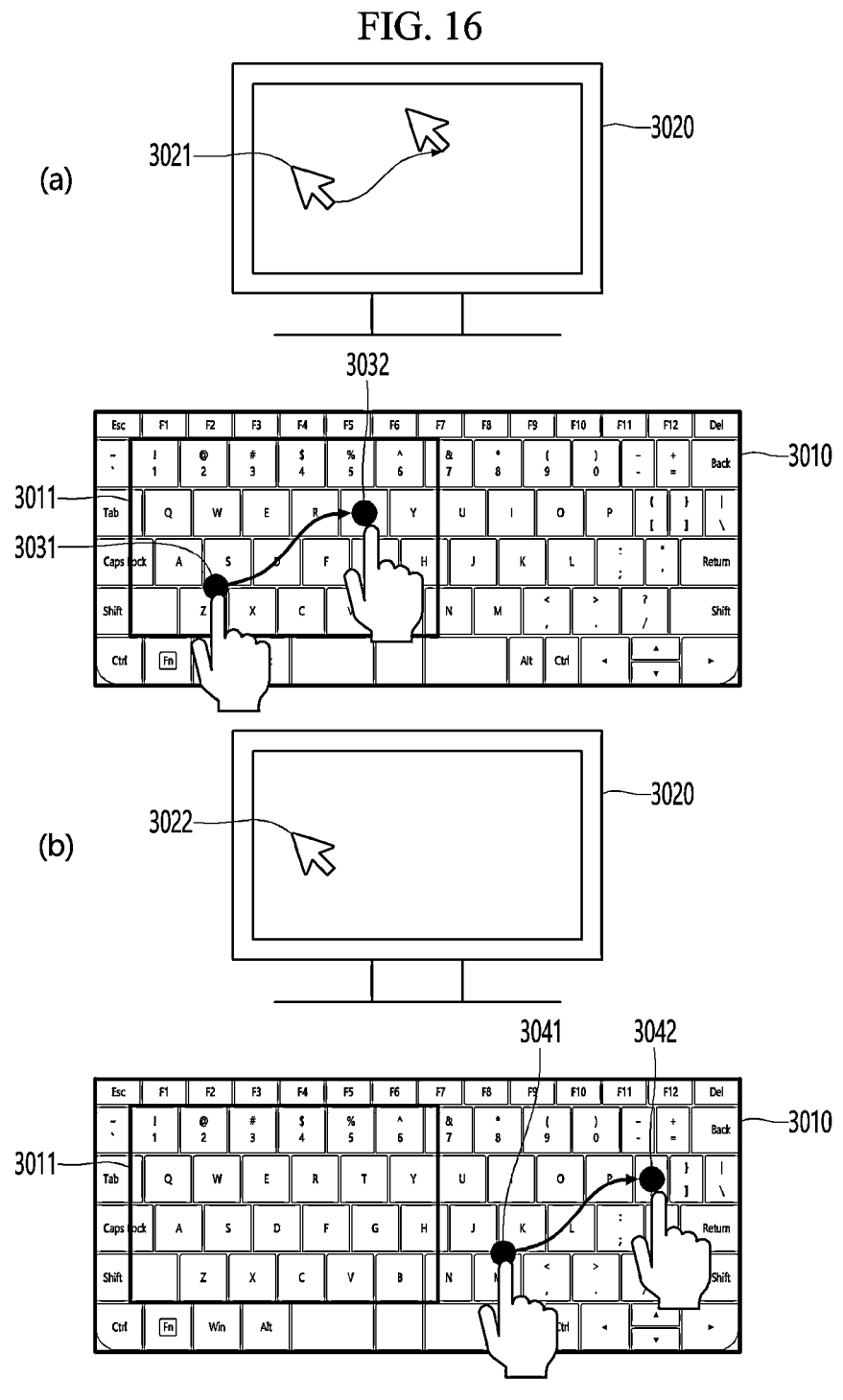
FIG. 16 is a diagram illustrating an operation mode of an electronic device having a multi-function human interface according to an embodiment and an operation of an interface device accordingly.

FIG. 16 is a diagram illustrating an operation mode of an electronic device having a multi-function human interface according to an embodiment and an operation of an interface device accordingly.

Referring to FIG. 16, an electronic device 3010 having a multi-function human interface according to an embodiment may include a touch input area, and may operate in an operation mode in which at least a portion of the touch input area is active.

For example, an electronic device 3010 having a multi-function human interface according to an embodiment may include a touch input area corresponding to at least a portion of a keyboard layout, and may operate in a first operation mode in which a first touch input area 3011 included in the touch input area is active. However, no limitation thereto is imposed.

Herein, the above-described details may be applied to the touch input area, so a redundant description will be omitted.

In addition, for convenience of description, FIG. 16 will be described based on the case of the first operation mode in which the first touch input area 3011 included in the touch input area is active. However, embodiments of the present disclosure are not limited thereto, and may include embodiments of a case of operation in another operation mode in which a touch input area (for example, a touch input area on the right) different from the first touch input area 3011 is active.

In addition, herein, a touch input area being active may mean that pointer position related information is generated on the basis of a touch input signal for the touch input area being active, but is not limited thereto. A touch input area being active may include concepts that are generally understood to mean that the touch input area is active.

FIG. 16(*a*) is a diagram illustrating, for example, a case in which a user's touch input to the first touch input area 3011 is obtained. FIG. 16(*b*) is a diagram illustrating, for example, a case in which a user's touch input area for the outside of the first touch input area 3011 is obtained.

First, referring to FIG. 16(*a*), according to an embodiment, touch input to the first touch input area 3011 of the electronic device 3010 having the multi-function human interface may be obtained from a user.

For example, as shown in FIG. 16(*a*), touch input of which a touch start point 3031 and a touch end point 3032 are included in the first touch input area 3011 of the electronic device 3010 having the multi-function human interface may be obtained from a user, but is not limited thereto.

Herein, the touch start point 3031 may mean a point at which touch input is initiated from a user, may mean a point at which touch input first obtained within a predetermined time period is obtained, and may mean a point at which a touch input signal equal to or greater than a particular criterion is first generated. However, without being limited thereto, the touch start point may include concepts that are generally understood as a touch start point.

In addition, herein, the touch end point 3032 may mean a point at which touch input from a user is terminated, may mean a point at which touch input last obtained within a predetermined time period is obtained, and may mean a point at which a touch input signal equal to or greater than a particular criterion is last generated. However, without being limited thereto, the touch end point may include concepts that are generally understood as a touch end point.

In addition, herein, the touch input between the touch start point 3031 and the touch end point 3032 may be defined as a touch path, but is not limited thereto.

Referring back to FIG. 16(*a*), when touch input to the first touch input area 3011 of the electronic device 3010 having the multi-function human interface is obtained from a user, pointer position related information may be generated.

For example, according to an embodiment, when touch input to the first touch input area 3011 of the electronic device 3010 having the multi-function human interface is obtained from a user, pointer position related information may be generated, the pointer position related information may be forwarded to an electronic device connected to the electronic device 3010 having the multi-function human interface, and the position of a pointer 3021 displayed on a display device 3020 of the electronic device connected to the electronic device 3010 having the multi-function human interface may be changed and displayed. However, no limitation thereto is imposed.

Next, referring to FIG. 16(*b*), according to an embodiment, touch input to the outside of the first touch input area 3011 of the electronic device 3010 having the multi-function human interface may be obtained from a user.

For example, as shown in FIG. 16(*b*), touch input of which a touch start point 3041 and a touch end point 3042 are not included in the first touch input area 3011 of the electronic device 3010 having the multi-function human interface may be obtained from a user, but is not limited thereto.

Herein, the touch start point 3041 may mean a point at which touch input is initiated from a user, may mean a point at which touch input first obtained within a predetermined time period is obtained, and may mean a point at which a touch input signal equal to or greater than a particular criterion is first generated. However, without being limited thereto, the touch start point may include concepts that are generally understood as a touch start point.

In addition, herein, the touch end point 3042 may mean a point at which touch input from a user is terminated, may mean a point at which touch input last obtained within a predetermined time period is obtained, and may mean a point at which a touch input signal equal to or greater than a particular criterion is last generated. However, without being limited thereto, the touch end point may include concepts that are generally understood as a touch end point.

In addition, herein, the touch input between the touch start point 3041 and the touch end point 3042 may be defined as a touch path, but is not limited thereto.

In addition, herein, the outside of the first touch input area 3011 may mean an area not included in the first touch input area 3011, may mean an area that is included in the keyboard layout of the electronic device 3010 having the multi-function human interface, but not included in the first touch input area 3011, and may mean an area that is included in a touch input area of the electronic device 3010 having the multi-function human interface, but not included in the first touch input area 3011. However, no limitation thereto is imposed.

Referring back to FIG. 16(*b*), when touch input to the outside of the first touch input area 3011 of the electronic device 3010 having the multi-function human interface is obtained from a user, pointer position related information may not be generated.

For example, according to an embodiment, when touch input to the outside the first touch input area 3011 of the electronic device 3010 having the multi-function human interface is obtained from a user, pointer position related information is not generated. Accordingly, the position of a pointer 3022 displayed on a display device 3020 of an electronic device connected to the electronic device 3010 having the multi-function human interface may not be changed. However, no limitation thereto is imposed.

In addition, herein, the meaning of not generating pointer position related information may include the case in which a touch input signal is obtained, but the obtained touch input signal is ignored and pointer position related information is not generated, the case in which a touch input signal is obtained and the obtained touch input signal is processed, but pointer position related information is not generated, or the case in which a touch input signal itself is not obtained. However, without being limited thereto, the meaning of not generating pointer position related information may include various examples of not generating the pointer position related information.

As in the above-described examples, when an electronic device 3010 having a multi-function human interface operates in an operation mode in which at least a portion of a touch input area is active, convenience may be given to a user who predominantly uses the active touch input area.

For example, as described above, when the electronic device 3010 having the multi-function human interface operates in the first operation mode in which the first touch input area 3011 is active, convenience may be provided to a user who predominantly uses his or her left hand.

For a more specific example, when a user who predominantly uses his or her left hand is typing using the electronic device 3010 having the multi-function human interface and wants to move a pointer using his or her left hand, the user can move the pointer using his or her left hand without moving his or her right hand away from the electronic device 3010 having the multi-function human interface. In this case, his or her right hand may be positioned in an external area outside the first touch input area 3011, so pointer position related information is not generate by touch input by his or her right hand, thereby providing convenience to the user.

This may be understood to provide convenience to a user who predominantly uses his or her right hand when the electronic device 3010 having the multi-function human interface operates in a second operation mode in which a second touch input area that is an area corresponding to the right hand is active. Without limited to the above-described examples, there are many other ways to provide convenience to a user.

However, the size of an active touch input area may be smaller than the size of the entire touch input area of the electronic device 3010 having the multi-function human interface, and the reduced touch input area may give inconvenience to a user.

Therefore, there is a need to develop a technology for providing a touch input area that is active according to a user, and for eliminating inconvenience caused by the reduced size of the touch input area.

Hereinafter, this will be described in more detail.

Figure 17:
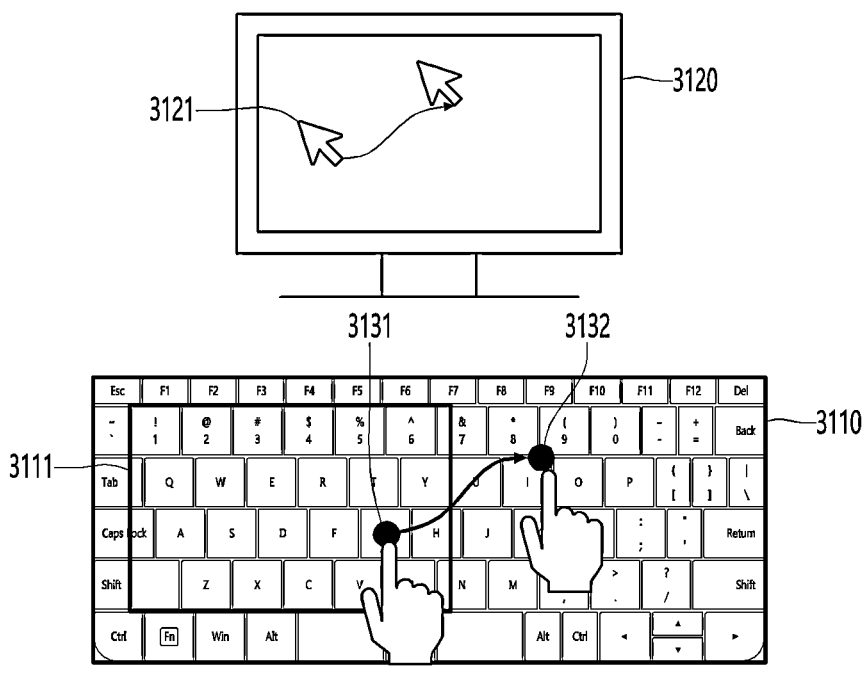
FIG. 17 is a diagram illustrating an operation mode of an electronic device having a multi-function human interface according to an embodiment and an operation of an interface device accordingly.

FIG. 17 is a diagram illustrating an operation mode of an electronic device having a multi-function human interface according to an embodiment and an operation of an interface device accordingly.

Referring to FIG. 17, an electronic device 3110 having a multi-function human interface according to an embodiment may include a touch input area, and may operate in an operation mode in which at least a portion of the touch input area is active.

For example, an electronic device 3110 having a multi-function human interface according to an embodiment may include a touch input area corresponding to at least a portion of a keyboard layout, and may operate in a first operation mode in which a first touch input area 3111 included in the touch input area is active. However, no limitation thereto is imposed.

Herein, the above-described details may be applied to the touch input area, so a redundant description will be omitted.

In addition, for convenience of description, FIG. 17 will be described based on the case of the first operation mode in which the first touch input area 3111 included in the touch input area is active. However, embodiments of the present disclosure are not limited thereto, and may include embodiments of a case of operation in another operation mode in which a touch input area (for example, a touch input area on the right) different from the first touch input area 3111 is active.

In addition, herein, a touch input area being active may mean that pointer position related information is generated on the basis of a touch input signal for the touch input area being active, but is not limited thereto. A touch input area being active may include concepts that are generally understood to mean that the touch input area is active.

More specifically, FIG. 17 is a diagram illustrating, for example, a case in which a touch start point 3131 according to a user's touch input is positioned in the first touch input area 3111, but a touch end point 3132 according to the user's touch input or at least a portion of a touch path between the touch start point 3131 and the touch end point 3132 according to the user's touch input is positioned outside the first touch input area 3111.

Herein, the touch start point 3131 may mean a point at which touch input is initiated from a user, may mean a point at which touch input first obtained within a predetermined time period is obtained, and may mean a point at which a touch input signal equal to or greater than a particular criterion is first generated. However, without being limited thereto, the touch start point may include concepts that are generally understood as a touch start point.

In addition, herein, the touch end point 3132 may mean a point at which touch input from a user is terminated, may mean a point at which touch input last obtained within a predetermined time period is obtained, and may mean a point at which a touch input signal equal to or greater than a particular criterion is last generated. However, without being limited thereto, the touch end point may include concepts that are generally understood as a touch end point.

In addition, herein, the touch input between the touch start point 3131 and the touch end point 3132 may be defined as a touch path, but is not limited thereto.

Referring back to FIG. 17, when a touch start point 3131 according to a user's touch input is positioned in the first touch input area 3111, pointer position related information may be generated although a touch end point 3132 according to the user's touch input or at least a portion of a touch path between the touch start point 3131 to the touch end point 3132 according to the user's touch input is positioned outside the first touch input area 3111.

For example, according to an embodiment, when a touch start point 3131 according to a user's touch input is positioned in the first touch input area 3111 and a touch end point 3132 according to the user's touch input or at least a portion of a touch path between the touch start point 3131 and the touch end point 3132 according to the user's touch input is positioned outside the first touch input area 3111, pointer position related information may be generated. The pointer position related information may be forwarded to an electronic device connected to the electronic device 3110 having the multi-function human interface. The position of a pointer 3121 displayed on a display device 3120 of the electronic device connected to the electronic device 3110 having the multi-function human interface may be changed and displayed. However, no limitation thereto is imposed.

Herein, a moving path of the pointer 3121 displayed on the display device 3120 may correspond to the touch path between the touch start point 3131 and the touch end point 3132, but is not limited thereto.

In addition, herein, the touch end point 3132 according to the user's touch input or the at least a portion of the touch path between the touch start point 3131 and the touch end point 3132 according to the user's touch input may be positioned outside the first touch input area 3111, but may be positioned within a touch input area of the electronic device 3110 having the multi-function human interface.

Figure 18:
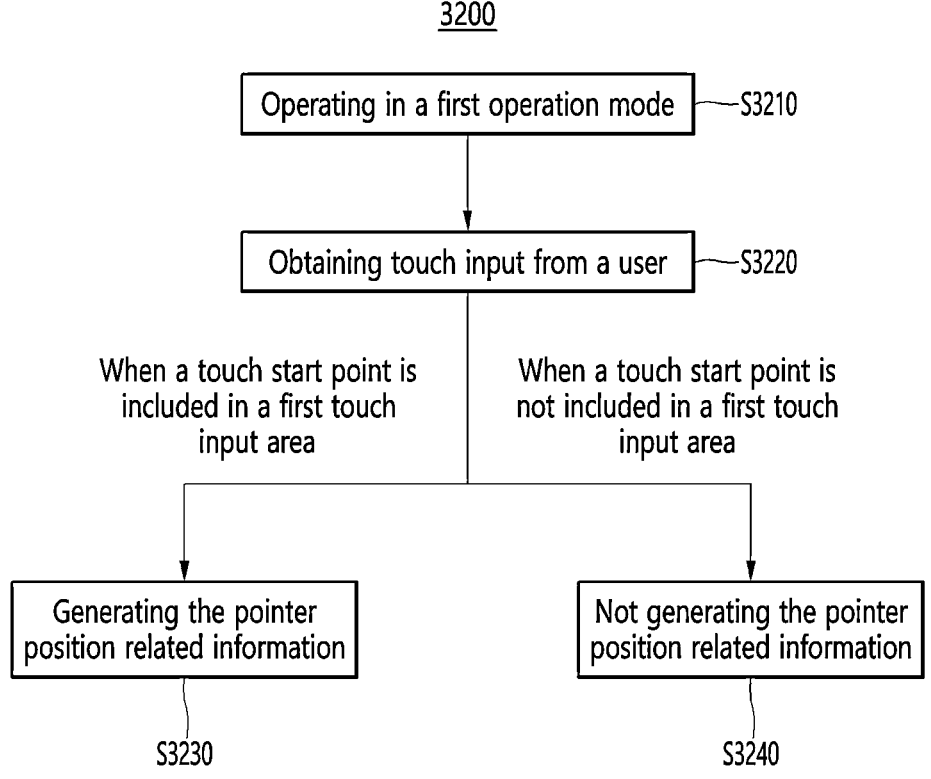
FIG. 18 is a flow chart illustrating an operation method of an electronic device having a multi-function human interface according to an embodiment.

FIG. 18 is a flow chart illustrating an operation method of an electronic device having a multi-function human interface according to an embodiment.

Referring to FIG. 18, an operation method 3200 of an electronic device having a multi-function human interface according to an embodiment may include at least one of the following steps: operating in a first operation mode in step S3210; obtaining touch input from a user in step S3220; generating pointer position related information when a touch start point according to the touch input obtained from the user is included in a first touch input area in step S3230; and not generating the pointer position related information when the touch start point according to the touch input obtained from the user is not included in the first touch input area in step S3240.

Herein, the above-described details may be applied to an electronic device having a multi-function human interface, so a redundant description will be omitted.

In addition, in step S3210 of operating in a first operation mode according to an embodiment, the first operation mode may be an operation mode in which at least a portion of a touch input area of an electronic device having a multi-function human interface is active.

For example, in step S3210 of operating in a first operation mode according to an embodiment, the first operation mode may be an operation mode in which a first touch input area included in a touch input area of an electronic device having a multi-function human interface is active, but is not limited thereto.

In addition, in step S3220 of obtaining touch input from a user according to an embodiment, the touch input from the user may mean touch input to at least a portion of a plurality of key caps included in an electronic device having a multi-function human interface, but is not limited thereto.

In addition, in step S3220 of obtaining touch input from a user according to an embodiment, the touch input from the user may mean the user's input for generating a touch input signal in at least a portion of an electrode layer included in an electronic device having a multi-function human interface, but is not limited thereto.

In addition, in step S3230 of generating pointer position related information when a touch start point according to the touch input obtained from the user is included in a first touch input area according to an embodiment, the touch start point may mean a point at which touch input is initiated from a user, may mean a point at which touch input first obtained within a predetermined time period is obtained, and may mean a point at which a touch input signal equal to or greater than a particular criterion is first generated. However, without being limited thereto, the touch start point may include concepts that are generally understood as a touch start point.

In addition, in step S3230 of generating pointer position related information when a touch start point according to the touch input obtained from the user is included in a first touch input area according to an embodiment, the first touch input area may mean at least a portion of a touch input area that is active in the first operation mode.

In addition, in step S3230 of generating pointer position related information when a touch start point according to the touch input obtained from the user is included in a first touch input area according to an embodiment, the pointer position related information may be information related to the position of a pointer of an electronic device connected to the electronic device having the multi-function human interface, but is not limited thereto.

In addition, in step S3230 of generating pointer related information when a touch start point according to the touch input obtained from the user is included in a first touch input area according to an embodiment, the pointer position related information may be forwarded to an electronic device connected to the electronic device having the multi-function human interface. Accordingly, the position of the pointer displayed on the display device of the electronic device connected to the electronic device having the multi-function human interface may be changed and displayed. However, no limitation thereto is imposed.

In addition, in step S3240 of not generating the pointer position related information when the touch start point according to the touch input obtained from the user is not included in the first touch input area according to an embodiment, not generating the pointer position related information may be understood to include various cases, such as not generating a touch input signal according to the user's touch input, and generating a touch input signal but not generating pointer position related information on the basis of the touch input signal.

FIG. 19 is a flow chart illustrating an operation method of an electronic device having a multi-function human interface according to an embodiment.

Referring to FIG. 19, an operation method 3300 of an electronic device having a multi-function human interface according to an embodiment may include at least one of the following steps: operating in a first operation mode in step S3310; obtaining touch input from a user in step S3320; generating pointer position related information when a touch start point according to the touch input obtained from the user is included in a first touch input area in step S3330; not generating the pointer position related information when the touch start point according to the touch input obtained from the user is not included in the first touch input area in step S3340; obtaining touch input to a predetermined area from the user in step S3350; and operating in a third operation mode in step S3360.

Herein, the above-described details may be applied to an electronic device having a multi-function human interface, so a redundant description will be omitted.

In addition, the above-described details may be applied to step S3310 of operating in a first operation mode according to an embodiment, so a redundant description will be omitted.

In addition, the above-described details may be applied to step S3320 of obtaining touch input from a user according to an embodiment, so a redundant description will be omitted.

In addition, the above-described details may be applied to step S3330 of generating pointer position related information when a touch start point according to the touch input obtained from the user is included in a first touch input area according to an embodiment, so a redundant description will be omitted.

In addition, the above-described details may be applied to step S3340 of not generating the pointer position related information when the touch start point according to the touch input obtained from the user is not included in the first touch input area according to an embodiment, so a redundant description will be omitted.

In addition, in step S3350 of obtaining touch input to a predetermined area from the user according to an embodiment, the predetermined area may be a predetermined area for changing an operation mode of an electronic device having a multi-function human interface.

For example, in step S3350 of obtaining touch input to a predetermined area from the user according to an embodiment, the predetermined area may be a predetermined area for changing a touch input area of an electronic device having a multi-function human interface, but is not limited thereto.

In addition, in step S3350 of obtaining touch input to a predetermined area from the user according to an embodiment, the predetermined area may be an area included in the first touch input area.

For example, in step S3350 of obtaining touch input to a predetermined area from the user according to an embodiment, the predetermined area may be a particular area included in the first touch input area, but is not limited thereto.

In addition, in step S3350 of obtaining touch input to a predetermined area from the user according to an embodiment, the predetermined area may be an area close to a boundary of the first touch input area.

For example, in step S3350 of obtaining touch input to a predetermined area from the user according to an embodiment, the predetermined area may be an area that includes at least a portion of a boundary of the first touch input area, but is not limited thereto.

In addition, in step S3350 of obtaining touch input to a predetermined area from the user according to an embodiment, the predetermined area may be an area close to the center of a touch input area of an electronic device having a multi-function human interface.

For example, in step S3350 of obtaining touch input to a predetermined area from the user according to an embodiment, the predetermined area may be an area including the center of a touch input area of an electronic device having a multi-function human interface, but is not limited thereto.

In addition, in step S3350 of obtaining touch input to a predetermined area from the user according to an embodiment, the direction in which the center of the predetermined area is positioned from the center of the first touch input area may be different from the direction in which the center of the first touch input area is positioned from the center of a touch input area of an electronic device having a multi-function human interface.

For example, in step S3350 of obtaining touch input to a predetermined area from the user according to an embodiment, when the center of the first touch input area is positioned to the left of the center of the touch input area of the electronic device having the multi-function human interface, the center of the predetermined area may be positioned to the right of the center of the first touch input area. However, no limitation thereto is imposed.

In addition, in step S3350 of obtaining touch input to a predetermined area from the user according to an embodiment, the predetermined area may be an area overlapping at least one key cap of a key cap corresponding to key G or a key cap corresponding to key H.

In addition, in step S3350 of obtaining touch input to a predetermined area from the user according to an embodiment, the predetermined area designed as in the embodiments described above may be to mechanically detect the user's intent to use a large touch input area, but is not limited to.

In addition, in step S3350 of obtaining touch input to a predetermined area from the user according to an embodiment, the touch input to the predetermined area may mean touch input corresponding to a touch path of touch starting from the touch start point or corresponding to the touch end point, but is not limited thereto.

In addition, in step S3350 of obtaining touch input to a predetermined area from the user according to an embodiment, when the touch start point of the touch input to the predetermined area is positioned in the first touch input area, operating in the third operation mode takes place. Conversely, when the touch start point of the touch input to the predetermined area is not positioned in the first touch input area, operating in the third operation mode may not take place. However, no limitation thereto is imposed.

In addition, in step S3350 of obtaining touch input to a predetermined area from the user according to an embodiment, the predetermined area may vary according to the operation mode.

For example, in step S3350 of obtaining touch input to a predetermined area from the user according to an embodiment, when an electronic device having a multi-function human interface operates in the first operation mode, the predetermined area may be a first area. When the electronic device having the multi-function human interface operates in a second operation mode, the predetermined area may be a second area. However, no limitation thereto is imposed.

In addition, for example, in step S3350 of obtaining touch input to a predetermined area from the user according to an embodiment, when an electronic device having a multi-function human interface operates in a left hand mode, the predetermined area may be a first area. When the electronic device having the multi-function human interface operates in a right hand mode, the predetermined area may be a second area. However, no limitation thereto is imposed.

In addition, in step S3360 of operating in a third operation mode according to an embodiment, the third operation mode may be an operation mode in which a touch input area different from a touch input area active in the first operation mode is active.

For example, in step S3360 of operating in a third operation mode according to an embodiment, the third operation mode may be an operation mode in which a second touch input area that is an area including the first touch input area and being greater than the first touch input area is active, but is not limited thereto.

In addition, for example, in step S3360 of operating in a third operation mode according to an embodiment, the third operation mode may be an operation mode in which a second touch input area at least partially overlapping the first touch input area and different from the first touch input area is active, but is not limited thereto.

In addition, for example, in step S3360 of operating in a third operation mode according to an embodiment, the third operation mode may be an operation mode in which a second touch input area different from the first touch input area is active, but is not limited thereto.

In addition, for example, in step S3360 of operating in a third operation mode according to an embodiment, the third operation mode may be an operation mode in which the entire touch input area of an electronic device having a multi-function human interface is active, but is not limited thereto.

In addition, in step S3360 of operating in a third operation mode according to an embodiment, pointer position related information may be generated although the touch path starting from the touch start point or the touch end point is not included in the first touch input area.

In addition, in step S3360 of operating in a third operation mode according to an embodiment, pointer position related information may be generated although touch input obtained from the user is not included in the first touch input area.

In addition, in step S3360 of operating in a third operation mode according to an embodiment, when touch input is not obtained from the user for a particular time interval or longer, an electronic device having a multi-function human interface may operate back in the first operation mode. However, no limitation thereto is imposed.

In addition, according to an operation method 3300 of an electronic device having a multi-function human interface according to an embodiment, an electronic device having a multi-function human interface may operate in a left hand mode. In the left hand mode, a left touch input area may be active. When a touch start point according to touch input obtained from a user is not included in the left touch input area, pointer position related information may not be generated. When the touch start point according to the touch input obtained from the user is included in the left touch input area, the pointer position related information may be generated. When the user slides to the right from the touch start point and at least a portion of a touch path is included in a predetermined area, switching to a full mode may take place and operating in the full mode may take place. In the full mode, the entire touch input area may be active. Even when the user slides to the right leaving the left touch input area, the pointer position related information may be generated.

In addition, according to an operation method 3300 of an electronic device having a multi-function human interface according to an embodiment, an electronic device having a multi-function human interface may operate in a right hand mode. In the right hand mode, a right touch input area may be active. When a touch start point according to touch input obtained from a user is not included in the right touch input area, pointer position related information may not be generated. When the touch start point according to the touch input obtained from the user is included in the right touch input area, the pointer position related information may be generated. When the user slides to the left from the touch start point and at least a portion of a touch path is included in a predetermined area, switching to a full mode may take place and operating in the full mode may take place. In the full mode, the entire touch input area may be active. Even when the user slides to the left leaving the right touch input area, the pointer position related information may be generated.

Figure 20:
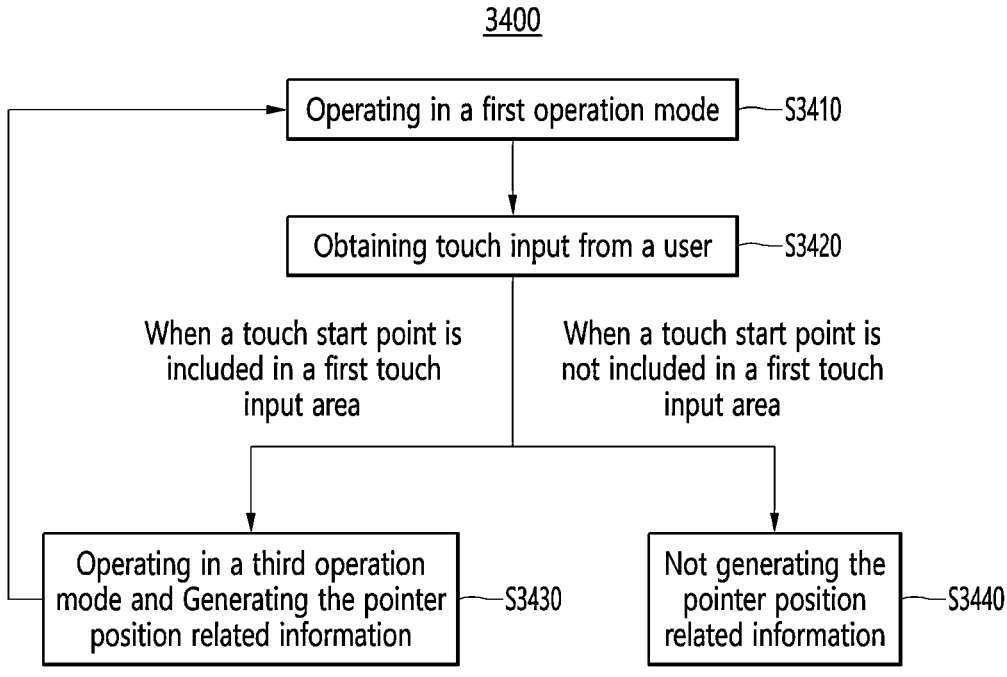
FIG. 20 is a flow chart illustrating an operation method of an electronic device having a multi-function human interface according to an embodiment.

FIG. 20 is a flow chart illustrating an operation method of an electronic device having a multi-function human interface according to an embodiment.

Referring to FIG. 20, an operation method 3400 of an electronic device having a multi-function human interface according to an embodiment may include at least one of the following steps: operating in a first operation mode in step S3410; obtaining touch input from a user in step S3420; operating in a third operation mode when a touch start point according to the touch input obtained from the user is included in a first touch input area, and generating pointer position related information in step S3430; and not generating the pointer position related information when the touch start point according to the touch input obtained from the user is not included in the first touch input area in step S3340.

Herein, the above-described details may be applied to an electronic device having a multi-function human interface, so a redundant description will be omitted.

In addition, the above-described details may be applied to step S3410 of operating in a first operation mode according to an embodiment, so a redundant description will be omitted.

In addition, the above-described details may be applied to step S3420 of obtaining touch input from a user according to an embodiment, so a redundant description will be omitted.

In addition, the above-described details may be applied to step S3440 of not generating the pointer position related information when the touch start point according to the touch input obtained from the user is not included in the first touch input area according to an embodiment, so a redundant description will be omitted.

In addition, in step S3430 of operating in a third operation mode when a touch start point according to the touch input obtained from the user is included in a first touch input area, and generating pointer position related information according to an embodiment, the above-described details may be applied to the third operation mode, so a redundant description will be omitted.

In addition, in step S3430 of operating in a third operation mode when a touch start point according to the touch input obtained from the user is included in a first touch input area, and generating pointer position related information according to an embodiment, the above-described details may be applied to the touch start point and the first touch input area, so a redundant description will be omitted.

In addition, in step S3430 of operating in a third operation mode when a touch start point according to the touch input obtained from the user is included in a first touch input area, and generating pointer position related information according to an embodiment, the above-described details may be applied to step of generating the pointer position related information, so a redundant description will be omitted.

In addition, according to an operation method 3400 of an electronic device having a multi-function human interface according to an embodiment, an electronic device having a multi-function human interface may operate in a left hand mode. In the left hand mode, a left touch input area may be active. When a touch start point according to touch input obtained from a user is not included in the left touch input area, pointer position related information may not be generated. When the touch start point according to the touch input obtained from the user is included in the left touch input area, switching to a full mode may take place and operating in the full mode may take place and the pointer position related information may be generated. In the full mode, the entire touch input area may be active. Even when the user slides to the right leaving the left touch input area, the pointer position related information may be generated.

In addition, according to an operation method 3400 of an electronic device having a multi-function human interface according to an embodiment, an electronic device having a multi-function human interface may operate in a right hand mode. In the right hand mode, a right touch input area may be active. When a touch start point according to touch input obtained from a user is not included in the right touch input area, pointer position related information may not be generated. When the touch start point according to the touch input obtained from the user is included in the right touch input area, switching to a full mode may take place and operating in the full mode may take place and the pointer position related information may be generated. In the full mode, the entire touch input area may be active. Even when the user slides to the left leaving the right touch input area, the pointer position related information may be generated.

Hereinafter, expandable various embodiments of an operation method of an electronic device having a multi-function human interface according to various embodiments described with reference to FIGS. 1 to 20 will be described in more detail.

An operation method of an electronic device having a multi-function human interface according to an embodiment may include changing an operation mode of the electronic device having the multi-function human interface from a second operation mode (full mode) to a first operation mode (first touch input area mode) when at least one cancellation condition is satisfied during operation in the second operation mode (full mode).

Herein, the at least one cancellation condition may include a condition related to time, and the operation mode of the electronic device having the multi-function human interface may be changed from the second operation mode to the first operation mode when the electronic device having the multi-function human interface does not obtain touch input from a user for a particular period of time or longer while operating in the second operation mode.

In addition, herein, the electronic device having the multi-function human interface may include a plurality of key caps, the at least one cancellation condition may include a condition related to key input, and the operation mode of the electronic device having the multi-function human interface may be changed from the second operation mode to a key input operation mode when the electronic device having the multi-function human interface obtains a key input signal corresponding to a first key cap included in the plurality of key caps while operating in the second operation mode.

In addition, herein, when the electronic device having the multi-function human interface obtains a key input signal corresponding to a second key cap included in the plurality of key caps while operating in the second operation mode, the operation mode of the electronic device having the multi-function human interface may remain in the second operation mode.

In addition, herein, while operating in the second operation mode, when the electronic device having the multi-function human interface obtains a key input signal corresponding to a first key cap included in the plurality of key caps and the operation mode of the electronic device having the multi-function human interface is changed from the second operation mode to the key input operation mode and then touch input is obtained from a user, the operation mode of the electronic device having the multi-function human interface may be changed from the key input operation mode to the first operation mode.

In addition, herein, the at least one cancellation condition may include a condition related to touch input, and the operation mode of the electronic device having the multi-function human interface may be changed from the second operation mode to the first operation mode when the electronic device having the multi-function human interface obtains touch input for a predetermined number of touch points from a user while operating in the second operation mode.

In addition, herein, the touch input for the predetermined number of touch points may include touch input for four touch points.

In addition, herein, the at least one cancellation condition may include a condition related to touch input, and the operation mode of the electronic device having the multi-function human interface may be changed from the second operation mode to the first operation mode when the electronic device having the multi-function human interface obtains touch input to a particular area from a user while operating in the second operation mode.

In addition, herein, the operation mode of the electronic device having the multi-function human interface may be changed from the second operation mode to the first operation mode when the electronic device having the multi-function human interface obtains touch input for four touch points for the particular area from a user while operating in the second operation mode.

In addition, herein, the at least one cancellation condition may include a condition related to a power mode, and the electronic device having the multi-function human interface may operate in the first operation mode when the electronic device having the multi-function human interface is powered off and then powered on again while operating in the second operation mode.

In addition, according to an operation method of an electronic device having a multi-function human interface according to an embodiment, an operation mode of an electronic device having a multi-function human interface may be changed from a first operation mode to a second operation mode, and then the second operation mode may remain.

For example, when touch input of which a touch start point is included in a first touch input area and a touch end point or at least a portion of a touch path is included in an external area (at least a portion of an area that is not included in a first touch input area, but is included in a touch input area) is obtained from a user, and then additional touch input of which a touch start point is included in the external area is obtained, pointer position related information may be generated on the basis of the additional touch input obtained from the user. However, no limitation thereto is imposed.

In addition, according to an operation method of an electronic device having a multi-function human interface according to an embodiment, when a touch start point in an area that is not included in a first touch input area, but is included in a touch input area is obtained from a user, pointer related information may not be generated, but various functions related to touch may be performed.

For example, when touch input obtained from a user is touch input that is included in an external area outside a first touch input area and is related to a predetermined gesture, a function related to a predetermined gesture may be generated. However, no limitation thereto is imposed.

Herein, a predetermined gesture may mean the number of touch points, and the direction of touch, and may include 2-point touch, 3-point touch, 4-point touch, 5-point touch, 2-point sliding, 2-point left sliding, 2-point right sliding, 2-point upward sliding, 2-point downward sliding, 3-point sliding, 3-point left sliding, 3-point right sliding, 3-point upward sliding, 3-point downward sliding, 4-point sliding, 4-point left sliding, 4-point right sliding, 4-point upward sliding, 4-point downward sliding, 5-point sliding, 5-point left sliding, 5-point right sliding, 5-point upward sliding, and 5-point downward sliding. However, no limitation thereto is imposed.

In addition, herein, a function related to a predetermined gesture may include at least one of the functions of scrolling, zooming, and screen swapping, but is not limited thereto. A function related to a predetermined gesture may include various functions that are generally understood as functions according to touch gestures.

In addition, for example, when touch input obtained from a user is included in an external area outside a first touch input area, adjustment information for adjusting an attribute value of an adjustment target attribute may be generated. However, no limitation thereto is imposed.

Herein, the attribute value of the adjustment target attribute may mean an audio volume-related attribute value, and a playback-related attribute value, but may include various concepts that are generally understood as an attribute value.

In addition, for example, when touch input obtained from a user is included in an external area outside a first touch input area and is touch input with one touch point, a key value corresponding to an arrow may be generated according to a sliding direction of the touch input. However, no limitation thereto is imposed.

For a more specific example, if touch input obtained from a user is included in an external area outside a first touch input area and is touch input with one touch point, a key value corresponding to a right arrow may be generated when the sliding direction of touch input is right, or a key value corresponding to a left arrow may be generated when the sliding direction is left, or a key value corresponding to an upward arrow may be generated when the sliding direction is upward, or a key value corresponding to a downward arrow may be generated when the sliding direction is downward. However, no limitation thereto is imposed.

In addition, for example, when touch input obtained from a user is included in an external area outside a first touch input area and is touch input with two touch points, a key value corresponding to a combination key may be generated according to a sliding direction of the touch input. However, no limitation thereto is imposed.

For a more specific example, if touch input obtained from a user is included in an external area outside a first touch input area and is touch input with two touch points, a combination key input including a key value corresponding to control and a key value corresponding to a right arrow may be generated when the sliding direction of touch input is right, or a combination key input including a key value corresponding to control and a key value corresponding to a left arrow may be generated when the sliding direction is left, or a combination key input including a key value corresponding to control and a key value corresponding to an upward arrow may be generated when the sliding direction is upward, or a combination key input including a key value corresponding to control and a key value corresponding to a downward arrow may be generated when the sliding direction is downward. However, no limitation thereto is imposed.

In addition, for example, when touch input obtained from a user is included in an external area outside a first touch input area and is touch input with three touch points, a key value corresponding to a combination key may be generated according to a sliding direction of the touch input. However, no limitation thereto is imposed.

For a more specific example, if touch input obtained from a user is included in an external area outside a first touch input area and is touch input with three touch points, a combination key input including a key value corresponding to control and a key value corresponding to a downward arrow may be generated when the sliding direction of touch input is right, or a combination key input including a key value corresponding to control and a key value corresponding to an upward arrow may be generated when the sliding direction is left. However, no limitation thereto is imposed.

This may be set such that a combination key in which the cursor moves to the lower paragraph in a word file may be output when the sliding direction is right, or a combination key in which the cursor moves to the upper paragraph in a word file may be output when the sliding direction is left. However, no limitation thereto is imposed.

In addition, for example, when touch input obtained from a user is included in an external area outside a first touch input area and is touch input with four touch points, a key value corresponding to a function key may be generated according to a sliding direction of the touch input. However, no limitation thereto is imposed.

For a more specific example, if touch input obtained from a user is included in an external area outside a first touch input area and is touch input with four touch points, a function key value corresponding to Page Down may be generated when the sliding direction of touch input is right, or a function key value corresponding to Page Up may be generated when the sliding direction is left. However, no limitation thereto is imposed.

In addition, the above-described examples are only one of various embodiments, and any suitable combination of the above-described examples is also included in the technical idea of the present disclosure.

In addition, the operation according to a user's touch input to an area included in an external area outside the first touch input area may be understood as the operation according to a user's touch input to an area in the first touch input area with a particular key input.

For example, when a user's touch input to an area in a first touch input area is obtained while a function key is pushed, a key value corresponding to an arrow may be generated according to the sliding direction of the touch input. However, no limitation thereto is imposed.

In addition, only one example has been described for convenience of description, but the above-described various examples may be applied to the operation according to a user's touch input to the area in the first touch input area with a particular key input.

In addition, according to an operation method of an electronic device having a multi-function human interface according to an embodiment, when a touch path of touch input obtained from a user after a touch start point of touch input obtained from the user is included in the first touch input area is included in an external area outside the first touch input area, a second touch input area different from the first touch input area may be active. When at least a portion of the touch path of touch input obtained from the user is included again in the first touch input area, the first touch input area may be active.

In addition, according to an operation method of an electronic device having a multi-function human interface according to an embodiment, the electronic device having the multi-function human interface may include a second touch input area. When a touch start point of touch input obtained from a user is included in the second touch input area, information related to adjustment of an attribute value of an adjustment target attribute may be generated. When a touch start point of touch input obtained from a user is included in the first touch input area and a touch end point or at least a portion of a touch path is included in the second touch input area, pointer position related information may be generated. When a touch start point of touch input obtained from a user is included in an external area (third area) outside the first touch input area and a touch end point or at least a portion of a touch path is included in the second touch input area, information related to adjustment of an attribute value of an adjustment target attribute may be generated.

That is, an electronic device having a multi-function human interface may include areas that are active and inactive according to operation modes, and may include an area for adjusting an attribute value. In a scenario according to an embodiment, a first touch input area may be an active area, an external area may be an inactive area, and a second touch input area is an area for adjusting an attribute value. It may be understood that when touch input starting from the first touch input area extends to the external area or the second touch input area (meaning that a touch end point or at least a portion of a touch path extends to the area), pointer position related information may be continuously generated, and touch input starting from the second touch input area may function to adjust an attribute value, and touch input starting from the external area and extending to the second touch input area may function to adjust an attribute value.

In addition, according to an operation method of an electronic device having a multi-function human interface according to an embodiment, when touch input to an external area outside the first touch input area is obtained while operating in a first operation mode Hereinafter, a scenario of use of an electronic device having a multi-function human interface according to an embodiment and the operation of an electronic device having a multi-function human interface accordingly will be described in detail.

Figure 21:
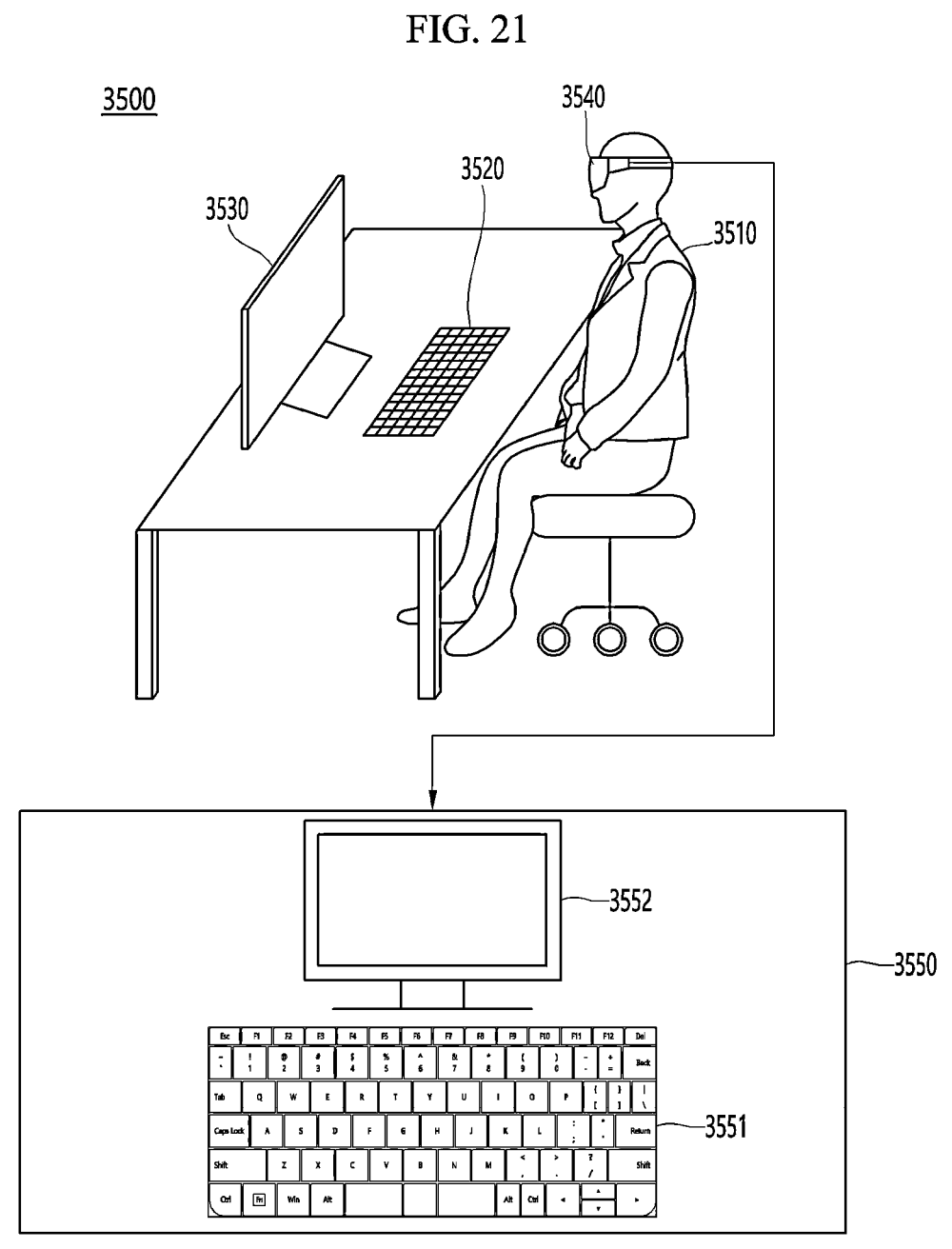

FIG. 21 is a diagram illustrating a scenario of use of an electronic device having a multi-function human interface according to an embodiment.

Referring to FIG. 21, in order to describe a scenario 3500 of use of an electronic device having a multi-function human interface according to an embodiment, a user 3510, an electronic device 3520 having a multi-function human interface, a display device 3530, and a virtual reality device 3540 are shown.

A scenario 3500 of use of an electronic device having a multi-function human interface according to an embodiment may be a scenario in which a user 3510 uses an electronic device 3520 having a multi-function human interface, and a virtual reality device 3540 together.

More specifically, a scenario 3500 of use of an electronic device having a multi-function human interface according to an embodiment may be a scenario in which a user 3510 is sitting at a desk and working, using an electronic device 3520 having a multi-function human interface as an interface device, and using a virtual reality device 3540, but is not limited thereto.

Herein, the above-described details of an electronic device having a multi-function human interface may be applied to an electronic device 3520 having a multi-function human interface according to an embodiment. However, no limitation thereto is imposed. Various examples of an interface device for a connected electronic device may be applied.

In addition, herein, a display device 3530 according to an embodiment may mean a monitor of a computer, but is not limited thereto. Various display devices capable of displaying various types of information may be included.

In addition, herein, examples of a virtual reality device 3540 according to an embodiment may include a virtual reality (VR) device, an augmented reality (AR) device, a mixed reality (MR) device, and an extended reality (XR) device, but are not limited thereto.

In addition, according to a scenario 3500 of use of an electronic device having a multi-function human interface according to an embodiment, a virtual reality device 3540 may display an image 3550 corresponding to the surroundings of a visual field of a user 3510.

For example, according to a scenario 3500 of use of an electronic device having a multi-function human interface according to an embodiment, a virtual reality device 3540 may display images 3551 and 3552 corresponding to an electronic device 3520 having a multi-function human interface and a display device 3530 that are included in the surroundings of a visual field of a user 3510, but is not limited thereto.

In addition, according to a scenario 3500 of use of an electronic device having a multi-function human interface according to an embodiment, a virtual reality device 3540 may be connected to a main processor and may display an image obtained from the main processor.

In addition, according to a scenario 3500 of use of an electronic device having a multi-function human interface according to an embodiment, a virtual reality device 3540 may include a main processor, and may generate and display various types of information.

In addition, according to a scenario 3500 of use of an electronic device having a multi-function human interface according to an embodiment, a virtual reality device 3540 may obtain at least one piece of information from an electronic device 3520 having a multi-function human interface.

For example, according to a scenario 3500 of use of an electronic device having a multi-function human interface according to an embodiment, a virtual reality device 3540 may obtain a key input signal from an electronic device 3520 having a multi-function human interface, but is not limited thereto.

In addition, for example, according to a scenario 3500 of use of an electronic device having a multi-function human interface according to an embodiment, a virtual reality device 3540 may obtain a key input value from an electronic device 3520 having a multi-function human interface, but is not limited thereto.

In addition, for example, according to a scenario 3500 of use of an electronic device having a multi-function human interface according to an embodiment, a virtual reality device 3540 may obtain a touch input signal from an electronic device 3520 having a multi-function human interface, but is not limited thereto.

In addition, for example, according to a scenario 3500 of use of an electronic device having a multi-function human interface according to an embodiment, a virtual reality device 3540 may obtain pointer position related information from an electronic device 3520 having a multi-function human interface, but is not limited thereto.

In addition, for example, according to a scenario 3500 of use of an electronic device having a multi-function human interface according to an embodiment, a virtual reality device 3540 may obtain at least one coordinate value from an electronic device 3520 having a multi-function human interface, but is not limited thereto.

In addition, for example, according to a scenario 3500 of use of an electronic device having a multi-function human interface according to an embodiment, a virtual reality device 3540 may obtain information on an operation mode from an electronic device 3520 having a multi-function human interface, but is not limited thereto.

In addition, for example, according to a scenario 3500 of use of an electronic device having a multi-function human interface according to an embodiment, a virtual reality device 3540 may obtain information on a power mode from an electronic device 3520 having a multi-function human interface, but is not limited thereto.

Hereinafter, the operation of an electronic device having a multi-function human interface will be described on the basis of an image 3550 displayed on a virtual reality device 3540 according to an embodiment.

Figure 22:
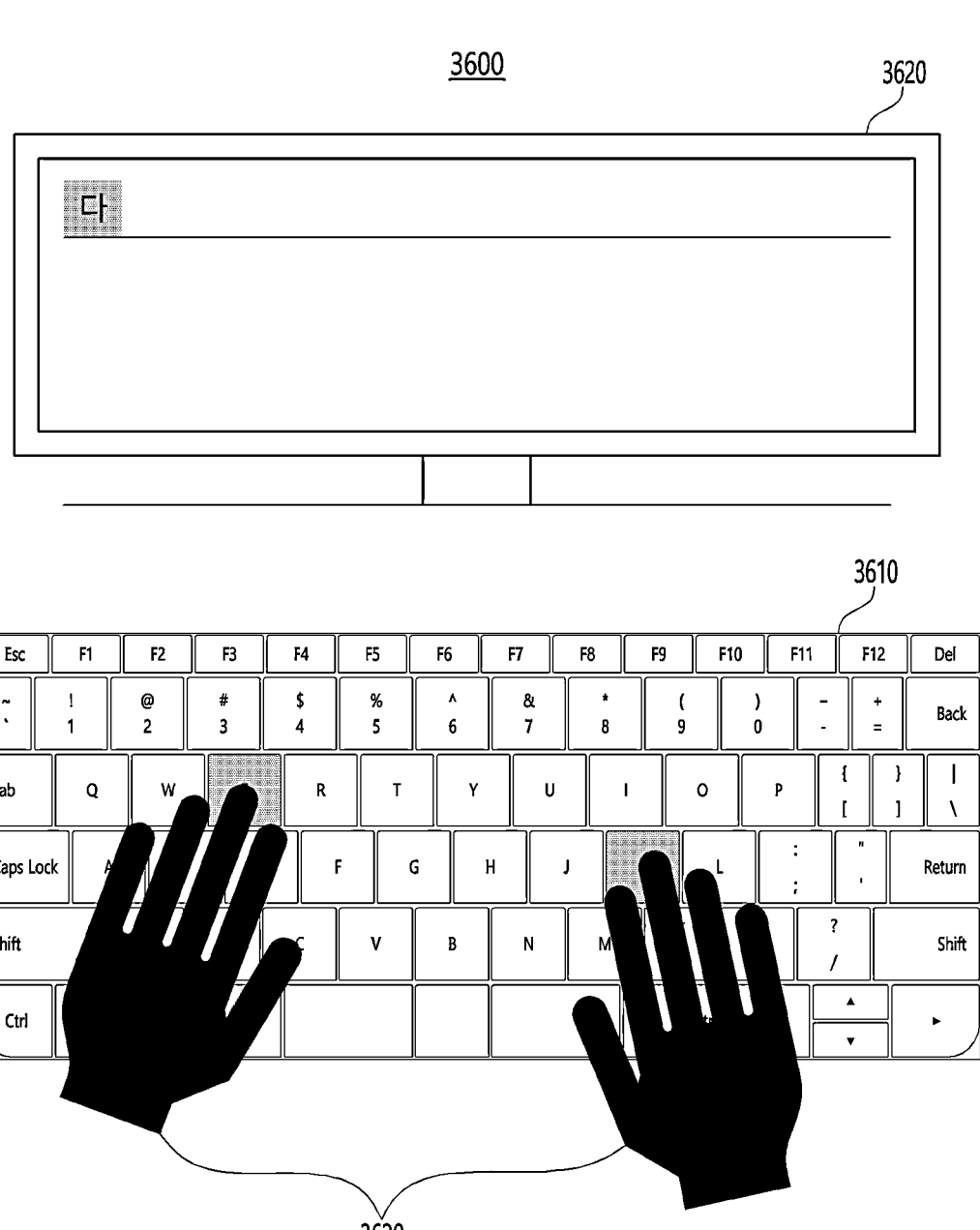
FIGS. 22 and 23 are diagrams illustrating a screen displayed through a virtual reality device according to a user's input according to an embodiment.
Figure 23:
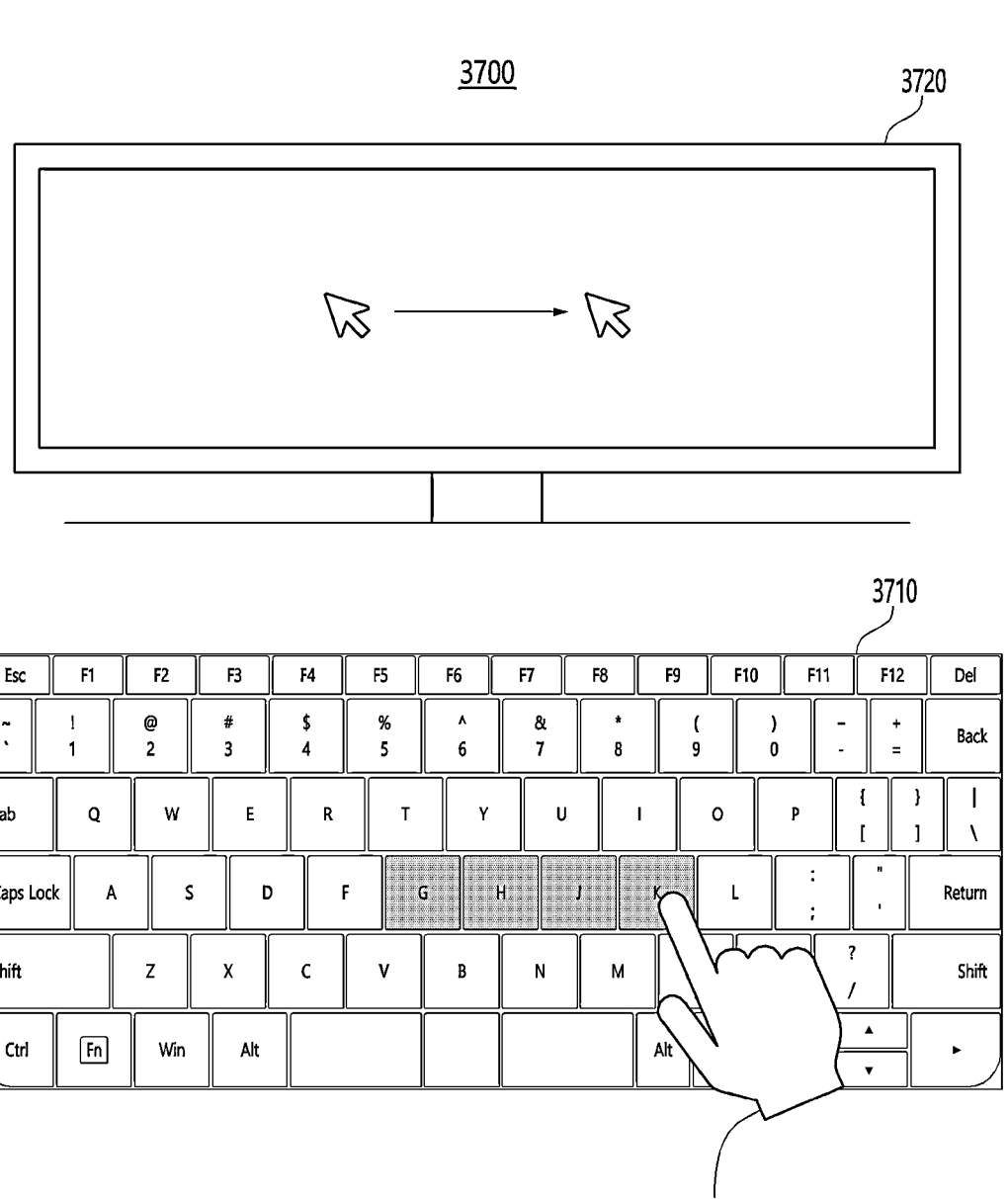

FIGS. 22 and 23 are diagrams illustrating a screen displayed through a virtual reality device according to a user's input according to an embodiment.

Referring to FIG. 22, a screen 3600 displayed through a virtual reality device according to an embodiment may include at least one of the following images: an image 3610 corresponding to an electronic device having a multi-function human interface, an image 3620 corresponding to a display device, and an image 3630 corresponding to a user's hands.

An image 3610 corresponding to an electronic device having a multi-function human interface according to an embodiment may be at least partially changed according to a user's input.

For example, when key input is obtained from a user for an electronic device having a multi-function human interface, an image of an area that is included in an image 3610 corresponding to an electronic device having a multi-function human interface according to an embodiment and corresponds to key input obtained from a user may be changed, but is not limited thereto.

In addition, for example, when a key input signal is obtained from an electronic device having a multi-function human interface, an image of an area that is included in an image 3610 corresponding to an electronic device having a multi-function human interface according to an embodiment and corresponds to a position at which a key input signal is generated may be changed, but is not limited thereto.

In addition, for example, when a key input value is obtained from an electronic device having a multi-function human interface, an image of an area that is included in an image 3610 corresponding to an electronic device having a multi-function human interface according to an embodiment and corresponds to a key input value may be changed, but is not limited thereto.

In addition, at least partially changing an image 3610 corresponding to an electronic device having a multi-function human interface according to an embodiment may include various changes.

For example, at least partially changing an image 3610 corresponding to an electronic device having a multi-function human interface according to an embodiment may include changing a color of a corresponding area, but is not limited thereto.

In addition, for example, at least partially changing an image 3610 corresponding to an electronic device having a multi-function human interface according to an embodiment may include outputting a highlight mark in a corresponding area, but is not limited thereto.

In addition, at least partially changing an image 3610 corresponding to an electronic device having a multi-function human interface according to an embodiment may include outputting various visual effects for a corresponding area in addition to the above-described examples.

In addition, at least partially changing an image 3610 corresponding to an electronic device having a multi-function human interface according to an embodiment may be maintained for a particular period of time.

For example, at least partially changing an image 3610 corresponding to an electronic device having a multi-function human interface according to an embodiment may be maintained for a first time period, but is not limited thereto.

In addition, in order to at least partially change an image 3610 corresponding to an electronic device having a multi-function human interface according to an embodiment, the electronic device having the multi-function human interface may transmit various types of information.

For example, in order to at least partially change an image 3610 corresponding to an electronic device having a multi-function human interface according to an embodiment, the electronic device having the multi-function human interface may transmit a key input signal, but is not limited thereto.

In addition, for example, in order to at least partially change an image 3610 corresponding to an electronic device having a multi-function human interface according to an embodiment, the electronic device having the multi-function human interface may transmit a key input signal and a coordinate value at which the key input signal is generated, but is not limited thereto.

In addition, for example, in order to at least partially change an image 3610 corresponding to an electronic device having a multi-function human interface according to an embodiment, the electronic device having the multi-function human interface may transmit key cap information corresponding to a position at which a key input signal is generated, but is not limited thereto.

In addition, for example, in order to at least partially change an image 3610 corresponding to an electronic device having a multi-function human interface according to an embodiment, the electronic device having the multi-function human interface may transmit a key value generated on the basis of a key input signal, but is not limited thereto.

In addition, for example, in order to at least partially change an image 3610 corresponding to an electronic device having a multi-function human interface according to an embodiment, the electronic device having the multi-function human interface may transmit a key value generated on the basis of a key input signal, and a coordinate value corresponding to the key value, but is not limited thereto.

In addition, an image 3620 corresponding to a display device according to an embodiment may be at least partially changed according to a user's input.

For example, when key input is obtained from a user for an electronic device having a multi-function human interface, text corresponding to key input obtained from a user may be output in an image 3620 corresponding to a display device according to an embodiment, but is not limited thereto.

In addition, for example, when a key input signal is obtained from an electronic device having a multi-function human interface, text corresponding to a key input signal may be output in an image 3620 corresponding to a display device according to an embodiment, but is not limited thereto.

In addition, for example, when a key input value is obtained from an electronic device having a multi-function human interface, text corresponding to a key input value may be output in an image 3620 corresponding to a display device according to an embodiment, but is not limited thereto.

In addition, the above-described key input may be represented as press input, key input, push input, and text input, but is not limited thereto.

Referring to FIG. 23, a screen 3700 displayed through a virtual reality device according to an embodiment may include at least one of the following images: an image 3710 corresponding to an electronic device having a multi-function human interface, an image 3720 corresponding to a display device, and an image 3730 corresponding to a user's hands.

An image 3710 corresponding to an electronic device having a multi-function human interface according to an embodiment may be at least partially changed according to a user's input.

For example, when touch input is obtained from a user for an electronic device having a multi-function human interface, an image of an area that is included in an image 3710 corresponding to an electronic device having a multi-function human interface according to an embodiment and corresponds to touch input obtained from a user may be changed, but is not limited thereto.

In addition, for example, when touch input is obtained from a user for an electronic device having a multi-function human interface, an image of an area that is included in an image 3710 corresponding to an electronic device having a multi-function human interface according to an embodiment and corresponds to a touch start point and a touch end point of touch input obtained from a user and a touch path from the touch start point to the touch end point, but is not limited thereto.

In addition, for example, when a touch input signal is obtained from an electronic device having a multi-function human interface, an image of an area that is included in an image 3710 corresponding to an electronic device having a multi-function human interface according to an embodiment and corresponds to a position at which a touch input signal is generated may be changed, but is not limited thereto.

In addition, for example, when a touch input coordinate value is obtained from an electronic device having a multi-function human interface, an image of an area that is included in an image 3710 corresponding to an electronic device having a multi-function human interface according to an embodiment and corresponds to a touch input coordinate value may be changed, but is not limited thereto.

In addition, at least partially changing an image 3710 corresponding to an electronic device having a multi-function human interface according to an embodiment may include various changes.

For example, at least partially changing an image 3710 corresponding to an electronic device having a multi-function human interface according to an embodiment may include changing a color of a corresponding area, but is not limited thereto.

In addition, for example, at least partially changing an image 3710 corresponding to an electronic device having a multi-function human interface according to an embodiment may include outputting a highlight mark in a corresponding area, but is not limited thereto.

In addition, at least partially changing an image 3710 corresponding to an electronic device having a multi-function human interface according to an embodiment may include outputting various visual effects for a corresponding area in addition to the above-described examples.

In addition, at least partially changing an image 3710 corresponding to an electronic device having a multi-function human interface according to an embodiment may be maintained for a particular period of time.

For example, at least partially changing an image 3710 corresponding to an electronic device having a multi-function human interface according to an embodiment may be maintained for a second time period, but is not limited thereto.

In addition, in order to at least partially change an image 3710 corresponding to an electronic device having a multi-function human interface according to an embodiment, the electronic device having the multi-function human interface may transmit various types of information.

For example, in order to at least partially change an image 3710 corresponding to an electronic device having a multi-function human interface according to an embodiment, the electronic device having the multi-function human interface may transmit a touch input signal, but is not limited thereto.

In addition, for example, in order to at least partially change an image 3710 corresponding to an electronic device having a multi-function human interface according to an embodiment, the electronic device having the multi-function human interface may transmit a touch input signal and a coordinate value at which the touch input signal is generated, but is not limited thereto.

In addition, for example, in order to at least partially change an image 3710 corresponding to an electronic device having a multi-function human interface according to an embodiment, the electronic device having the multi-function human interface may transmit key cap information corresponding to a position at which a touch input signal is generated, but is not limited thereto.

In addition, an image 3720 corresponding to a display device according to an embodiment may be at least partially changed according to a user's input.

In addition, for example, when touch input is obtained from a user for an electronic device having a multi-function human interface, the position of a pointer displayed in an image 3720 corresponding to a display device according to an embodiment may be changed, but is not limited thereto.

In addition, for example, when a touch input signal is obtained from an electronic device having a multi-function human interface, the position of a pointer displayed in an image 3720 corresponding to a display device according to an embodiment may be changed, but is not limited thereto.

In addition, for example, when a touch input coordinate value is obtained from an electronic device having a multi-function human interface, the position of a pointer displayed in an image 3720 corresponding to a display device according to an embodiment may be changed, but is not limited thereto.

In addition, the above-described touch input may be represented as touch input, and sliding touch input, but is not limited thereto.

In addition, referring to FIGS. 22 and 23, an image 3610, 3710 corresponding to an electronic device having a multi-function human interface according to an embodiment may be changed differently according to a user's input.

For example, when key input is obtained from a user for an electronic device having a multi-function human interface, a first visual effect may be output in an image 3610, 3710 corresponding to an electronic device having a multi-function human interface according to an embodiment. When touch input is obtained from a user for an electronic device having a multi-function human interface, a second visual effect may be output in an image 3610, 3710 corresponding to an electronic device having a multi-function human interface according to an embodiment. However, no limitation thereto is imposed.

Herein, the first visual effect and the second visual effect may have different colors, but are not limited thereto.

In addition, herein, the size of the first visual effect and the size of the second visual effect may be different from each other, but are not limited thereto.

In addition, herein, the duration of the first visual effect and the duration of the second visual effect may be different from each other.

For example, the duration of the second visual effect may be longer than the duration of the first visual effect, but is not limited thereto.

In addition, referring to FIGS. 22 and 23, an image 3610, 3710 corresponding to an electronic device having a multi-function human interface according to an embodiment may be changed differently an operation mode of the electronic device having the multi-function human interface.

For example, when an electronic device having a multi-function human interface operates in a first mode, a first visual effect may be output in an image 3610, 3710 corresponding to an electronic device having a multi-function human interface according to an embodiment. When an electronic device having a multi-function human interface operates in a second mode, a second visual effect may be output in an image 3610, 3710 corresponding to an electronic device having a multi-function human interface according to an embodiment. However, no limitation thereto is imposed.

In addition, for example, when an electronic device having a multi-function human interface operates in a text input mode, a first visual effect may be output in an image 3610, 3710 corresponding to an electronic device having a multi-function human interface according to an embodiment. When an electronic device having a multi-function human interface operates in a touch input mode, a second visual effect may be output in an image 3610, 3710 corresponding to an electronic device having a multi-function human interface according to an embodiment. However, no limitation thereto is imposed.

Herein, the first visual effect and the second visual effect may have different colors, but are not limited thereto.

In addition, herein, the size of the first visual effect and the size of the second visual effect may be different from each other, but are not limited thereto.

In addition, herein, the first visual effect and the second visual effect may not be simultaneously output, but are not limited thereto.

For example, when an electronic device having a multi-function human interface operates in a text input mode according to an embodiment and a user's touch input is obtained for the electronic device having the multi-function human interface, a second visual effect may not be output. However, no limitation thereto is imposed.

In addition, for example, when an electronic device having a multi-function human interface operates in a touch input mode according to an embodiment and a user's key input is obtained for the electronic device having the multi-function human interface, a first visual effect may not be output. However, no limitation thereto is imposed.

In addition, herein, the duration of the first visual effect and the duration of the second visual effect may be different from each other.

For example, the duration of the second visual effect may be longer than the duration of the first visual effect, but is not limited thereto.

In addition, according to an embodiment, while a first visual effect is output in an image 3610, 3710 corresponding to an electronic device having a multi-function human interface, when touch input is obtained from a user for the electronic device having the multi-function human interface, the first visual effect may disappear and a second visual effect may be output. However, no limitation thereto is imposed.

In addition, according to an embodiment, while a second visual effect is output in an image 3610, 3710 corresponding to an electronic device having a multi-function human interface, when key input is obtained from a user for the electronic device having the multi-function human interface, the second visual effect may disappear and a first visual effect may be output. However, no limitation thereto is imposed.

FIGS. 24 to 28 are diagrams illustrating a screen displayed through a virtual reality device according to an operation mode of an electronic device having a multi-function human interface according to an embodiment.

Before describing FIGS. 24 to 28, it will be understood that the above-described details may be applied to an operation mode of an electronic device having a multi-function human interface described below, so a redundant description will be omitted.

Figure 24:
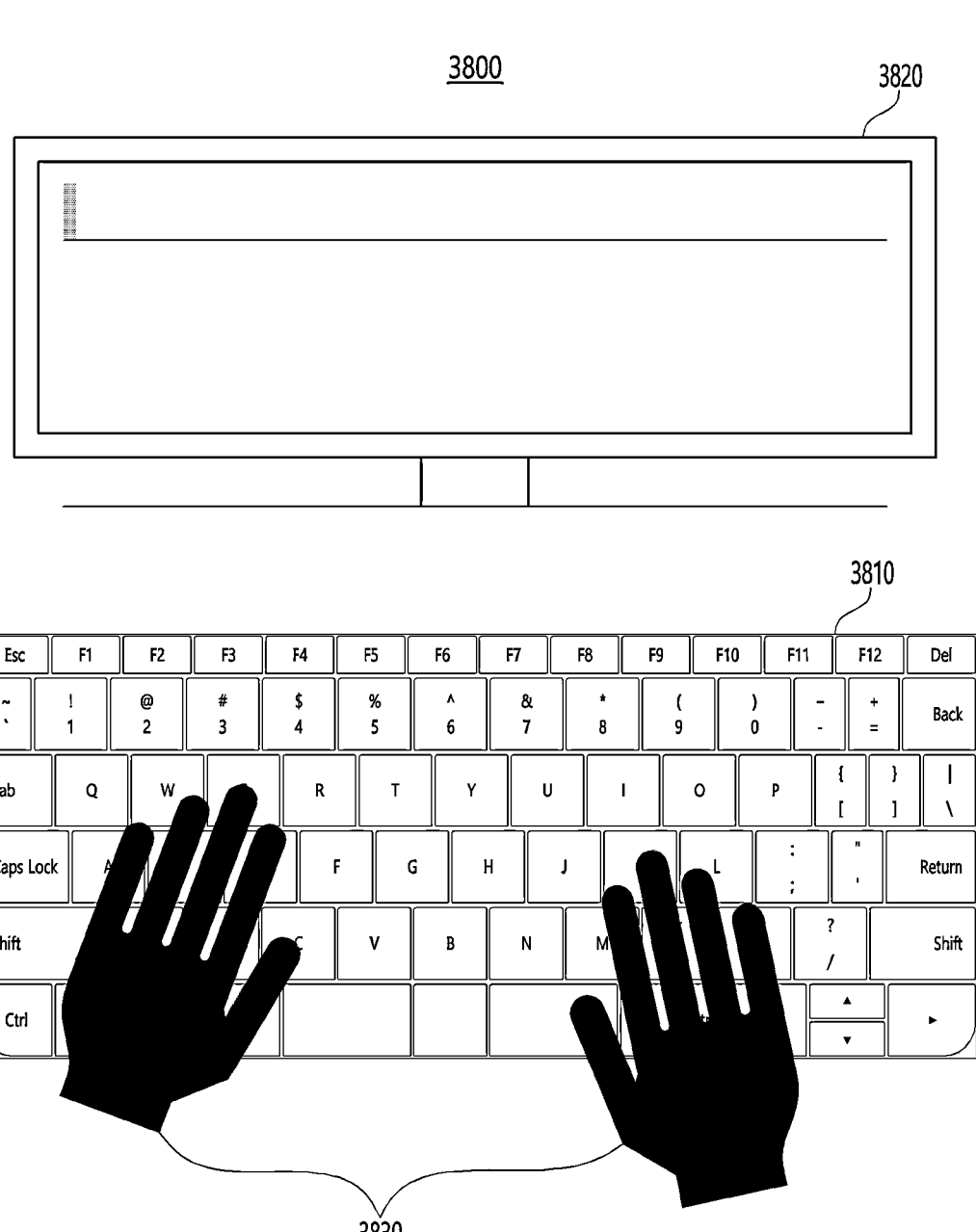
FIGS. 24 to 28 are diagrams illustrating a screen displayed through a virtual reality device according to an operation mode of an electronic device having a multi-function human interface according to an embodiment.

Referring to FIG. 24, a screen 3800 displayed through a virtual reality device according to an embodiment may include at least one of the following images: an image 3810 corresponding to an electronic device having a multi-function human interface, an image 3820 corresponding to a display device, and an image 3830 corresponding to a user's hands.

When an electronic device having a multi-function human interface according to an embodiment operates in a first operation mode, an image 3810 corresponding to the electronic device having the multi-function human interface may be provided as a first-type image.

For example, when an electronic device having a multi-function human interface according to an embodiment operates in a key input mode, an image 3810 corresponding to the electronic device having the multi-function human interface may be provided as an image corresponding to the keyboard layout of the electronic device having the multi-function human interface, but is not limited thereto.

Herein, a first operation mode according to an embodiment may be represented as various modes, such as a key input mode, a text input mode, and a keyboard mode, for obtaining a key input signal for text input, but is not limited thereto.

Figure 25:
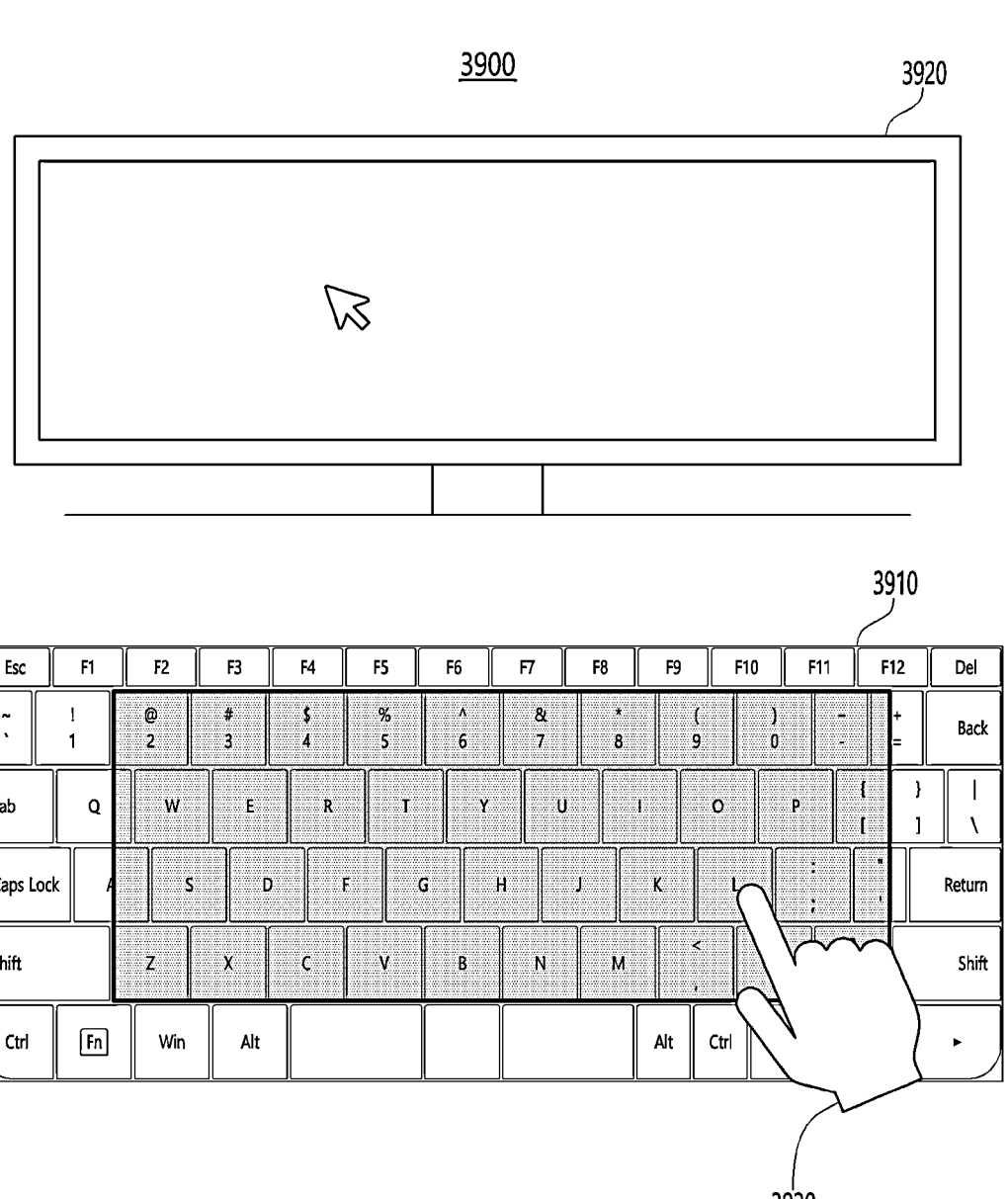

Referring to FIG. 25, a screen 3900 displayed through a virtual reality device according to an embodiment may include at least one of the following images: an image 3910 corresponding to an electronic device having a multi-function human interface, an image 3920 corresponding to a display device, and an image 3930 corresponding to a user's hands.

When an electronic device having a multi-function human interface according to an embodiment operates in a second operation mode, an image 3910 corresponding to the electronic device having the multi-function human interface may be provided as a second-type image.

For example, when an electronic device having a multi-function human interface according to an embodiment operates in a touch input mode, an image 3910 corresponding to the electronic device having the multi-function human interface may be provided as an image showing an area corresponding to a touch area of the electronic device having the multi-function human interface, but is not limited thereto.

Herein, a second operation mode according to an embodiment may be represented as various modes, such as a touch input mode, a pointer position related information acquisition mode, and a touch mode, for obtaining a touch input signal according to touch input from a user, but is not limited thereto.

Figure 26:
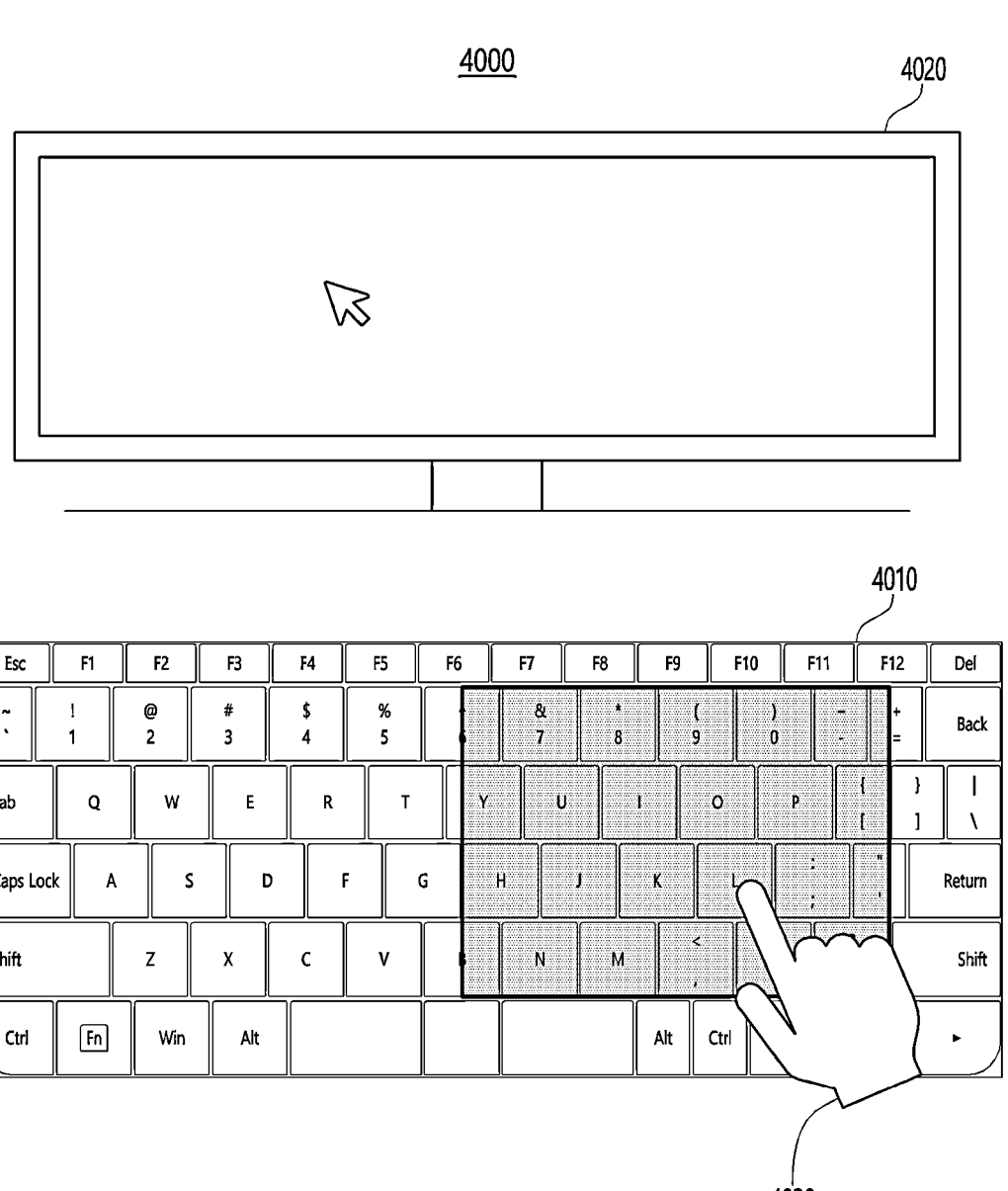

Referring to FIG. 26, a screen 4000 displayed through a virtual reality device according to an embodiment may include at least one of the following images: an image 4010 corresponding to an electronic device having a multi-function human interface, an image 4020 corresponding to a display device, and an image 4030 corresponding to a user's hands.

When an electronic device having a multi-function human interface according to an embodiment operates in a third operation mode, an image 4010 corresponding to the electronic device having the multi-function human interface may be provided as a third-type image.

For example, when an electronic device having a multi-function human interface according to an embodiment operates in a right hand touch input mode, an image 4010 corresponding to the electronic device having the multi-function human interface may be provided as an image showing an area corresponding to a right hand touch area of the electronic device having the multi-function human interface, but is not limited thereto.

Herein, a third operation mode according to an embodiment may be represented as a right hand touch input mode, a right-handed mode, and a right hand mode, but is not limited thereto.

Figure 27:
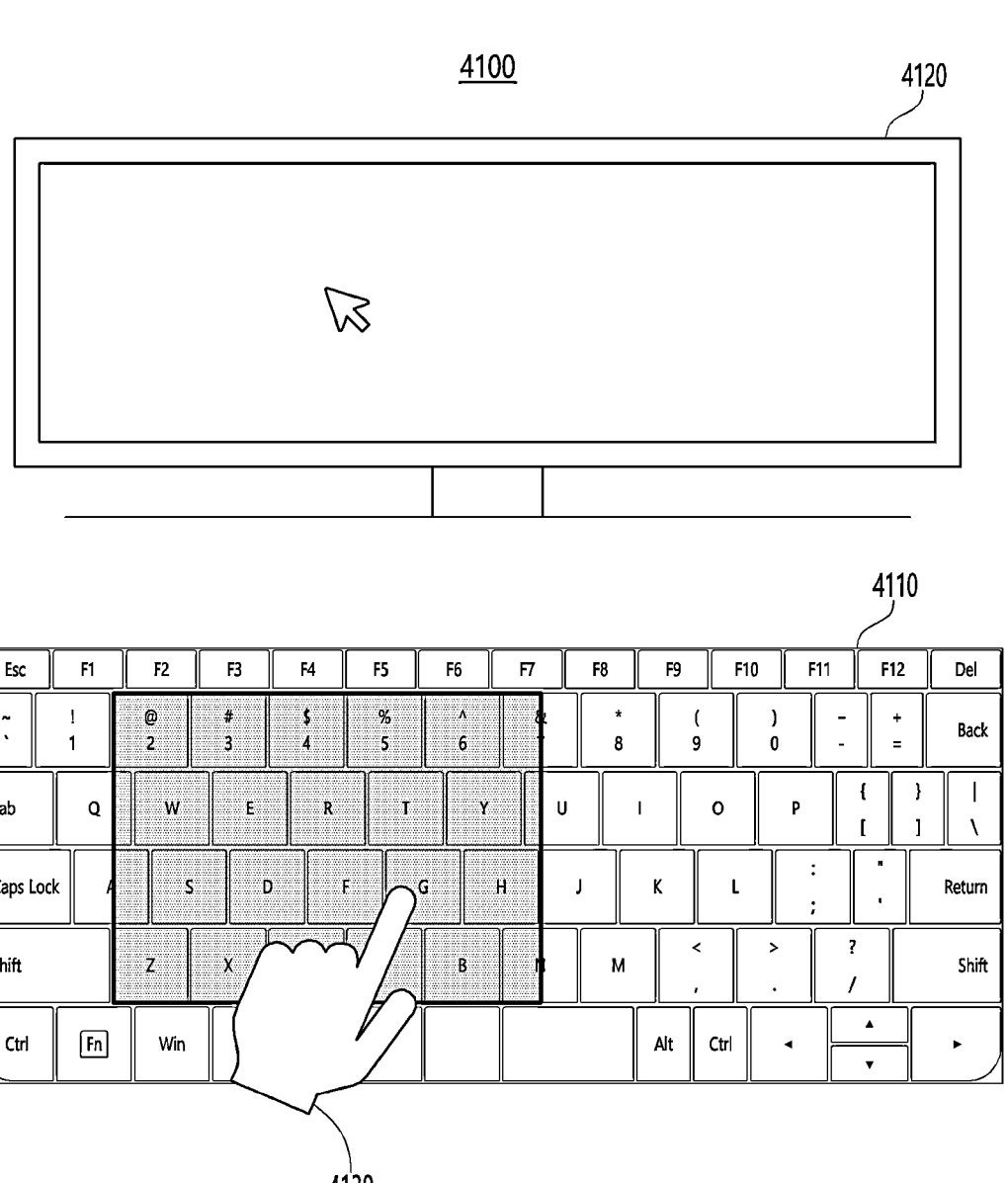

Referring to FIG. 27, a screen 4100 displayed through a virtual reality device according to an embodiment may include at least one of the following images: an image 4110 corresponding to an electronic device having a multi-function human interface, an image 4120 corresponding to a display device, and an image 4130 corresponding to a user's hands.

When an electronic device having a multi-function human interface according to an embodiment operates in a fourth operation mode, an image 4110 corresponding to the electronic device having the multi-function human interface may be provided as a fourth-type image.

For example, when an electronic device having a multi-function human interface according to an embodiment operates in a left hand touch input mode, an image 4110 corresponding to the electronic device having the multi-function human interface may be provided as an image showing an area corresponding to a left hand touch area of the electronic device having the multi-function human interface, but is not limited thereto.

Herein, a fourth operation mode according to an embodiment may be represented as a left hand touch input mode, a left-handed mode, and a left hand mode, but is not limited thereto.

Figure 28:
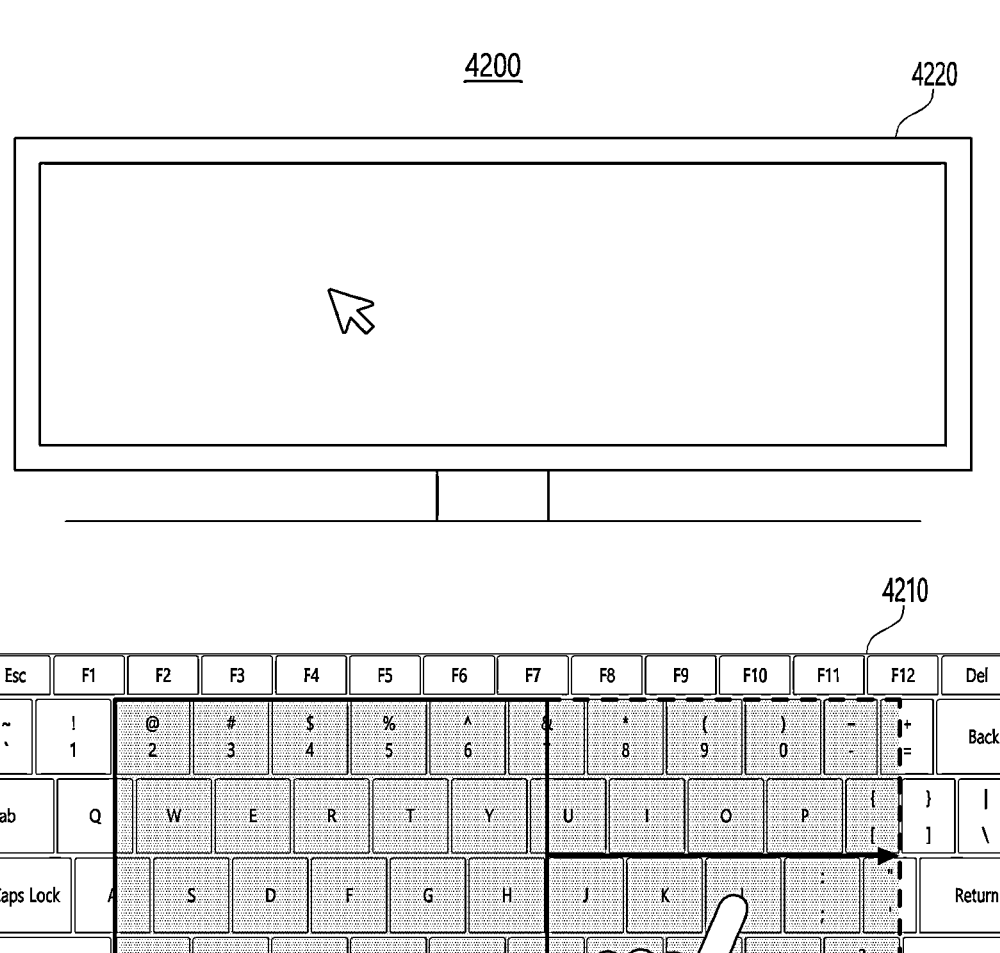

Referring to FIG. 28, a screen 420 displayed through a virtual reality device according to an embodiment may include at least one of the following images: an image 4210 corresponding to an electronic device having a multi-function human interface, an image 4220 corresponding to a display device, and an image 4230 corresponding to a user's hands.

When an electronic device having a multi-function human interface according to an embodiment operates from a fourth operation mode to a second operation mode, an image 4210 corresponding to the electronic device having the multi-function human interface may be at least partially changed.

For example, while operating in a left hand touch input mode, when an operation mode of an electronic device having a multi-function human interface according to an embodiment is changed to a touch input mode, an image 4210 corresponding to the electronic device having the multi-function human interface may be changed from an image showing an area corresponding to a left hand touch area of the electronic device having the multi-function human interface to an image showing an area corresponding to a touch area of the electronic device having the multi-function human interface. However, no limitation thereto is imposed.

In addition, referring to FIGS. 24 to 28, an operation mode of an electronic device having a multi-function human interface may be changed according to a user's input. Accordingly, an image 3810, 3910, 4010, 4110, 4210 corresponding to the electronic device having the multi-function human interface may be changed.

For example, according to an embodiment, while operating in a first operation mode, when an electronic device having a multi-function human interface obtains first input from a user, the operation mode of the electronic device having the multi-function human interface may be changed to a second operation mode. Accordingly, an image 3810, 3910, 4010, 4110, 4210 corresponding to the electronic device having the multi-function human interface may be changed from a first-type image to a second-type image. However, no limitation thereto is imposed.

For a more specific example, according to an embodiment, while operating in a text input mode, when an electronic device having a multi-function human interface obtains touch input from a user, the operation mode of the electronic device having the multi-function human interface may be changed to a touch input mode. Accordingly, an image 3810, 3910, 4010, 4110, 4210 corresponding to the electronic device having the multi-function human interface may be changed from an image corresponding to a keyboard layout to an image showing a touch area. However, no limitation thereto is imposed.

In addition, for example, according to an embodiment, while operating in a second operation mode, when an electronic device having a multi-function human interface obtains second input from a user, the operation mode of the electronic device having the multi-function human interface may be changed to a first operation mode. Accordingly, an image 3810, 3910, 4010, 4110, 4210 corresponding to the electronic device having the multi-function human interface may be changed from a second-type image to a first-type image. However, no limitation thereto is imposed.

For a more specific example, according to an embodiment, while operating in a touch input mode, when an electronic device having a multi-function human interface obtains key input from a user, the operation mode of the electronic device having the multi-function human interface may be changed to a text input mode. Accordingly, an image 3810, 3910, 4010, 4110, 4210 corresponding to the electronic device having the multi-function human interface may be changed from an image showing a touch area to an image corresponding to a keyboard layout. However, no limitation thereto is imposed.

In addition, for example, according to an embodiment, while operating in a second operation mode, when an electronic device having a multi-function human interface obtains third input from a user, the operation mode of the electronic device having the multi-function human interface may be changed to a third operation mode. Accordingly, an image 3810, 3910, 4010, 4110, 4210 corresponding to the electronic device having the multi-function human interface may be changed from a second-type image to a third-type image. However, no limitation thereto is imposed.

For a more specific example, according to an embodiment, while operating in a touch input mode, when an electronic device having a multi-function human interface obtains predetermined combination key input from a user, the operation mode of the electronic device having the multi-function human interface may be changed to a right hand touch input mode. Accordingly, an image 3810, 3910, 4010, 4110, 4210 corresponding to the electronic device having the multi-function human interface may be changed from an image showing a touch area to an image showing a right hand touch area. However, no limitation thereto is imposed.

Figure 29:
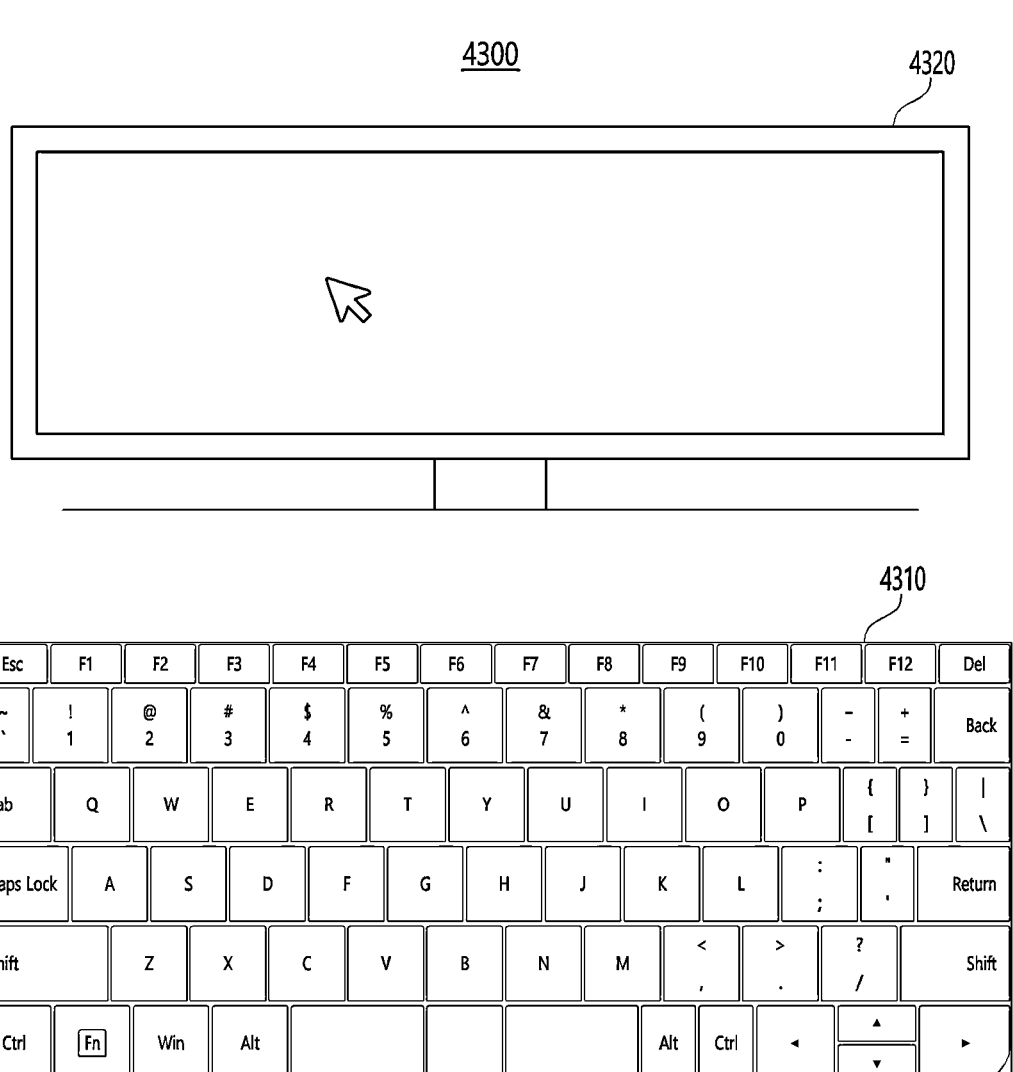
FIGS. 29 and 30 are diagrams illustrating a screen displayed through a virtual reality device according to an environment of an application running on the virtual reality device according to an embodiment.
Figure 30:
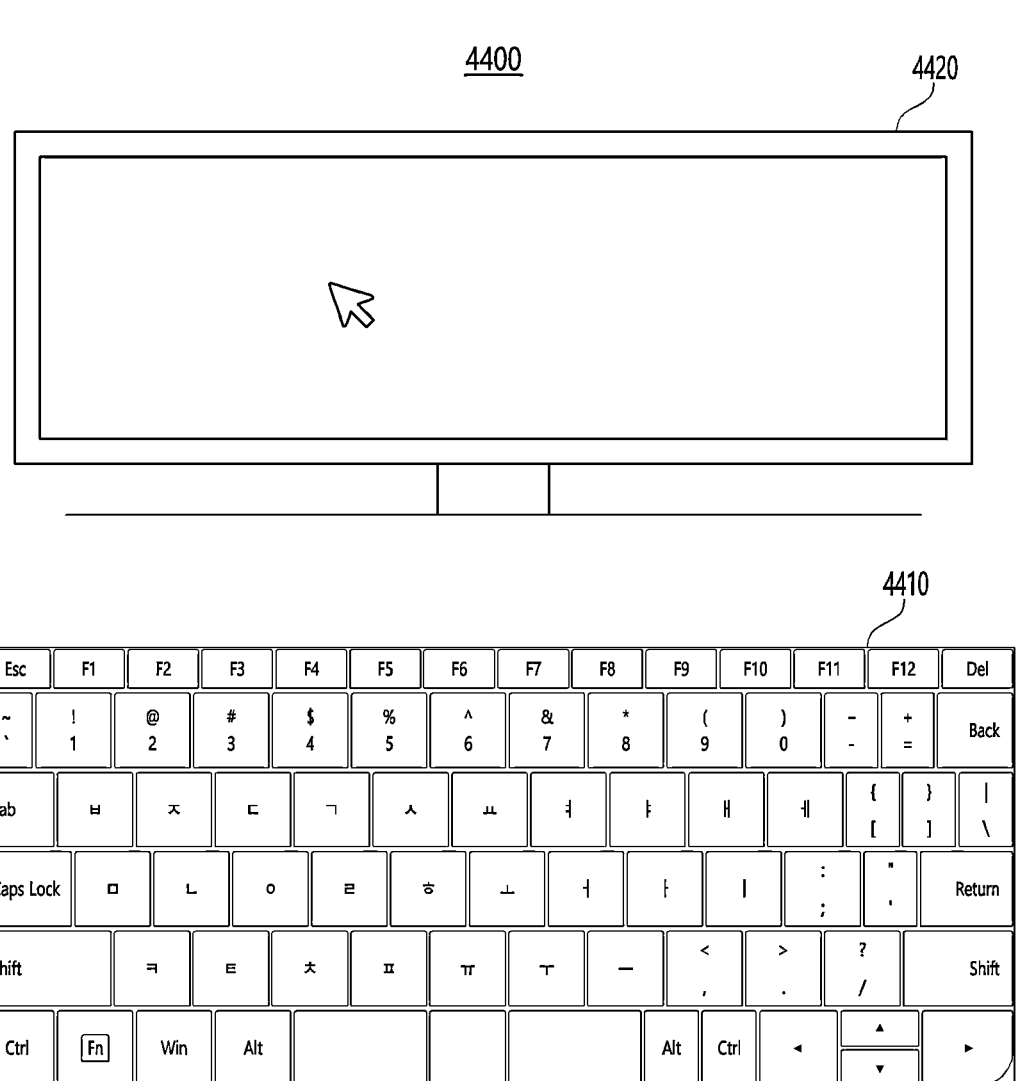

FIGS. 29 and 30 are diagrams illustrating a screen displayed through a virtual reality device according to an environment of an application running on the virtual reality device according to an embodiment.

Before describing FIGS. 29 and 30, an environment of an application running on a virtual reality device may be understood as the concepts that include an environment of an application running on a main processor, and a setting environment of a multi-function human interface device, but will be described as an environment of an application running on a virtual reality device, for convenience of description.

Referring to FIG. 29, a screen 4400 displayed through a virtual reality device according to an embodiment may include at least one of the following images: an image 4410 corresponding to an electronic device having a multi-function human interface, and an image 4420 corresponding to a display device.

When an environment of an application running on a virtual reality device according to an embodiment is a first environment, an image 4410 corresponding to an electronic device having a multi-function human interface may be provided as a first-type image.

For example, when the language environment of an application running on a virtual reality device according to an embodiment is set to English, an image 4410 corresponding to an electronic device having a multi-function human interface may be provided as an image corresponding to a QWERTY keyboard, but is not limited thereto.

Referring to FIG. 30, a screen 4500 displayed through a virtual reality device according to an embodiment may include at least one of the following images: an image 4510 corresponding to an electronic device having a multi-function human interface, and an image 4520 corresponding to a display device.

When an environment of an application running on a virtual reality device according to an embodiment is a second environment, an image 4510 corresponding to an electronic device having a multi-function human interface may be provided as a second-type image.

For example, when the language environment of an application running on a virtual reality device according to an embodiment is set to Korean, an image 4510 corresponding to an electronic device having a multi-function human interface may be provided as an image corresponding to a Korean two-set keyboard, but is not limited thereto.

In addition, in addition to the examples described with reference to FIGS. 29 and 30, according to various embodiments, an image 4310, 4410 corresponding to an electronic device having a multi-function human interface may be changed and provided according to an environment of an application running on a virtual reality device.

Figure 31:
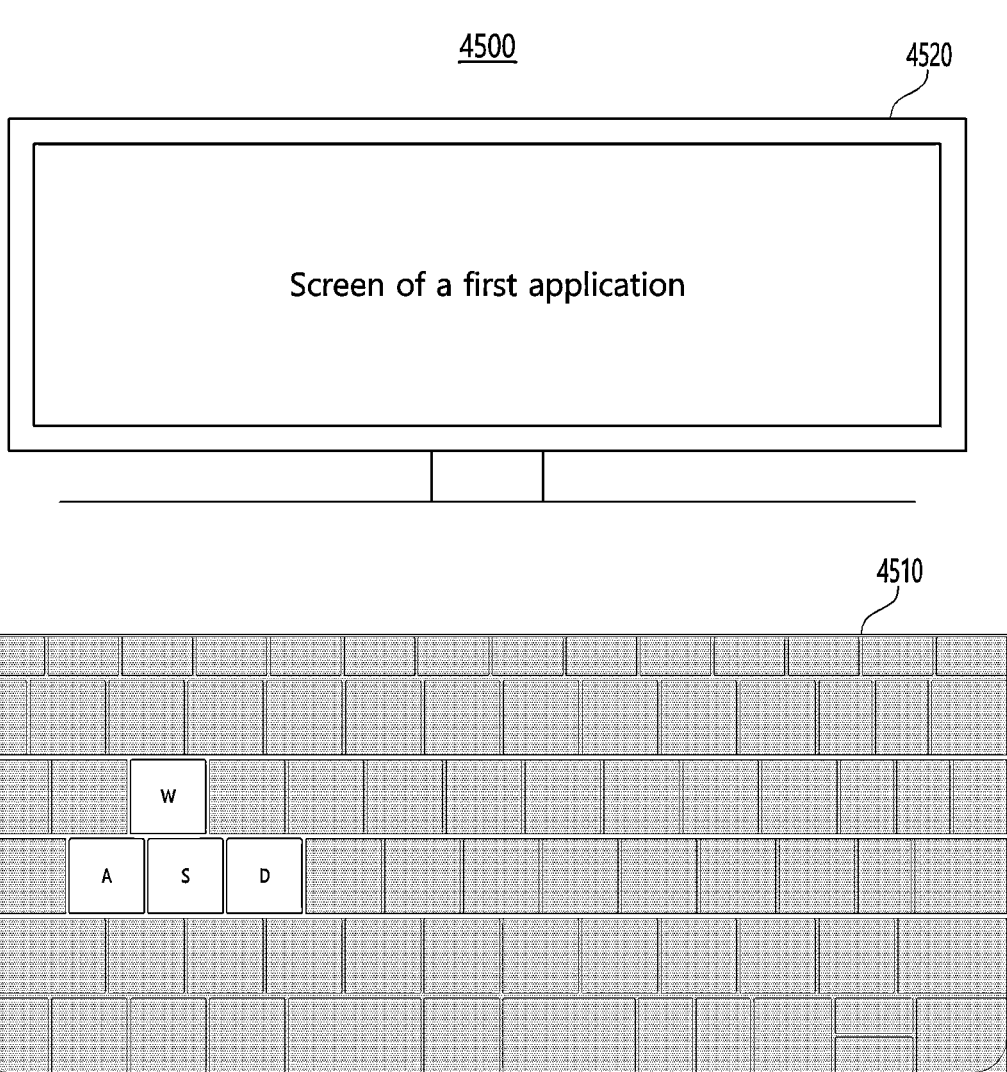
FIGS. 31 and 32 are diagrams illustrating a screen displayed through a virtual reality device according to an application running on the virtual reality device according to an embodiment.
Figure 32:
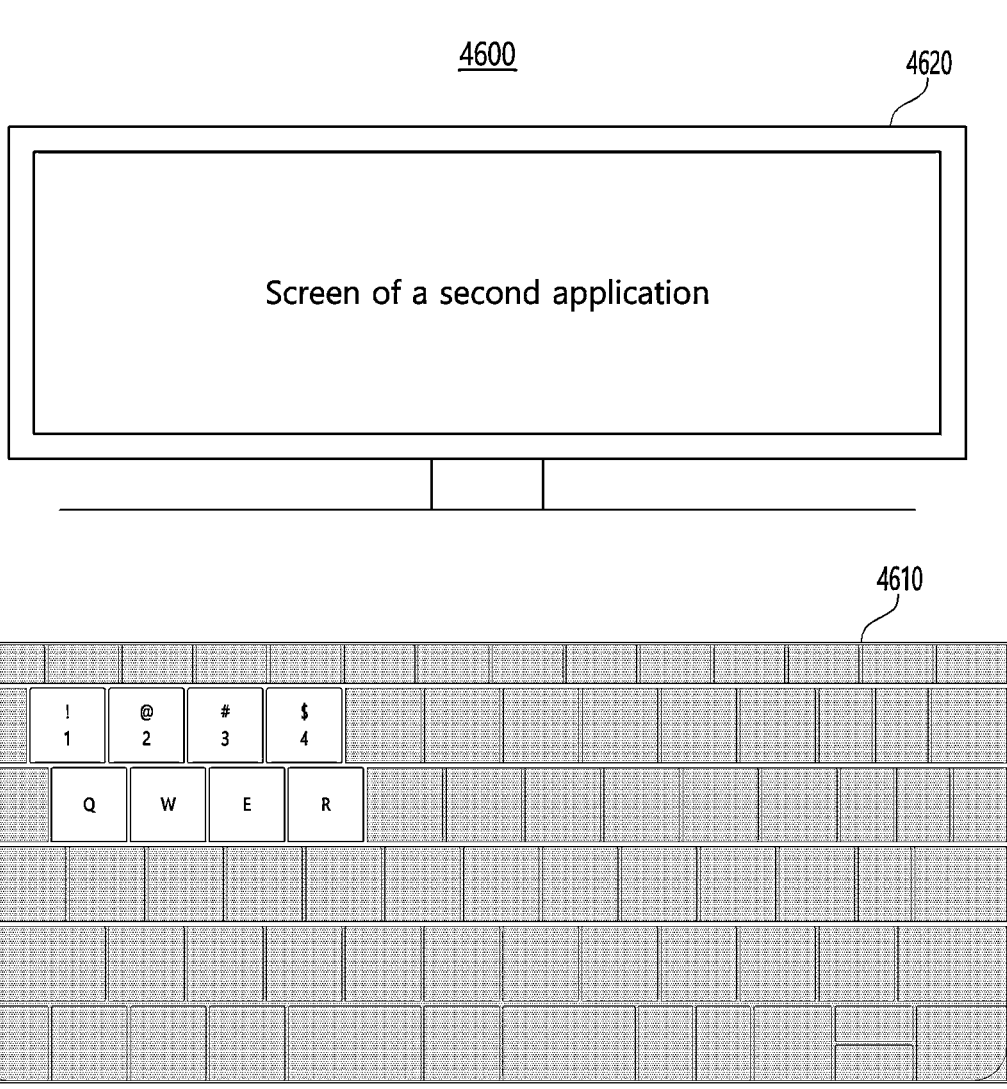

FIGS. 31 and 32 are diagrams illustrating a screen displayed through a virtual reality device according to an application running on the virtual reality device according to an embodiment.

Before describing FIGS. 31 and 32, an application running on a virtual reality device may be understood as the concepts that include an application running on a main processor, but will be described as an application running on a virtual reality device, for convenience of description.

Referring to FIG. 31, a screen 4500 displayed through a virtual reality device according to an embodiment may include at least one of the following images: an image 4510 corresponding to an electronic device having a multi-function human interface, and an image 4520 corresponding to a display device.

When an application running on a virtual reality device according to an embodiment is a first application, an image 4510 corresponding to an electronic device having a multi-function human interface may be provided as a first-type image.

For example, when an application running on a virtual reality device according to an embodiment is game and a button active to move a game character is WASD, an image 4510 corresponding to an electronic device having a multi-function human interface may be provided such that only an image of the button corresponding to the WASD may be output or a highlight may be output in the image of the button corresponding to the WASD. However, no limitation thereto is imposed.

Referring to FIG. 32, a screen 4600 displayed through a virtual reality device according to an embodiment may include at least one of the following images: an image 4610 corresponding to an electronic device having a multi-function human interface, and an image 4620 corresponding to a display device.

When an application running on a virtual reality device according to an embodiment is a second application, an image 4610 corresponding to an electronic device having a multi-function human interface may be provided as a second-type image.

For example, when an application running on a virtual reality device according to an embodiment is a game and a button active to control a game character is 1, 2, 3, 4, Q, W, E, R, an image 4610 corresponding to an electronic device having a multi-function human interface may be provided such that only an image of a button corresponding to 1, 2, 3, 4, Q, W, E, R may be output or a highlight may be output in the image of the button corresponding to 1, 2, 3, 4, Q, W, E, R. However, no limitation thereto is imposed.

In addition, in addition to the examples described with reference to FIGS. 31 and 32, according to various embodiments, an image 4510, 4610 corresponding to an electronic device having a multi-function human interface may be changed and provided according to an application running on a virtual reality device.

Figure 33:
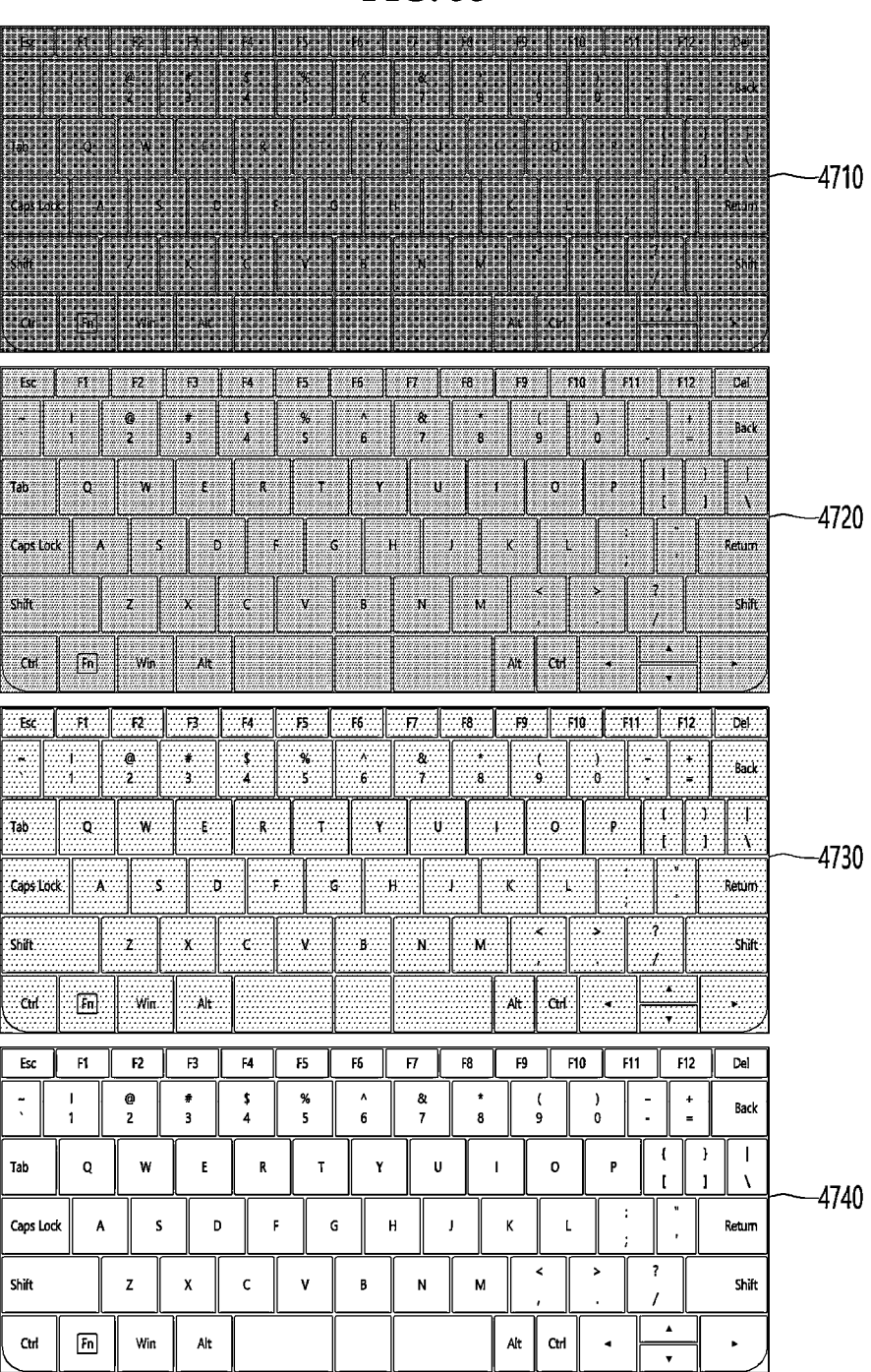
FIG. 33 is a diagram illustrating a screen displayed through a virtual reality device according to a power mode of an electronic device having a multi-function human interface according to an embodiment.

FIG. 33 is a diagram illustrating a screen displayed through a virtual reality device according to a power mode of an electronic device having a multi-function human interface according to an embodiment.

Referring to FIG. 33, a screen displayed through a virtual reality device according to an embodiment may include an image corresponding to an electronic device having a multi-function human interface.

When a power mode of an electronic device having a multi-function human interface according to an embodiment is a first power mode, an image corresponding to an electronic device having a multi-function human interface may be provided as a first-type image 4710. When a power mode of an electronic device having a multi-function human interface according to an embodiment is a second power mode, an image corresponding to an electronic device having a multi-function human interface may be provided as a second-type image 4720. When a power mode of an electronic device having a multi-function human interface according to an embodiment is a third power mode, an image corresponding to an electronic device having a multi-function human interface may be provided as a third-type image 4730. When a power mode of an electronic device having a multi-function human interface according to an embodiment is a fourth power mode, an image corresponding to an electronic device having a multi-function human interface may be provided as a fourth-type image 4740.

Herein, the first power mode may mean a power off mode or a no connection mode, but is not limited thereto.

In addition, herein, the second power mode may mean a power sleep mode or a standby mode, but is not limited thereto.

In addition, herein, the third power mode may mean a semi-active mode and an active standby mode, but is not limited thereto.

In addition, herein, the fourth power mode may mean an active mode, but is not limited thereto.

In addition, the first to fourth-type images 4710 to 4740 may be different from each other.

In addition, FIG. 33 merely shows an embodiment of the first to fourth-type images 4710 to 4740, and embodiments of the present disclosure are not limited to FIG. 33. The scope of the present disclosure also includes various embodiments in which according to a power mode of an electronic device having a multi-function human interface, an image that is included in a screen displayed virtual reality device and corresponds to an electronic device having a multi-function human interface may be provided as different types or images or distinguishable types of images.

In addition, a power mode of an electronic device having a multi-function human interface has been described divided into four power modes with reference to FIG. 33, but embodiments of the present disclosure are not limited to the embodiment of the four power modes described with reference to FIG. 33. An electronic device having a multi-function human interface with various types of power modes, such as two, three, five, and six, may be used, and different types of images may be provided accordingly.

Figure 34:
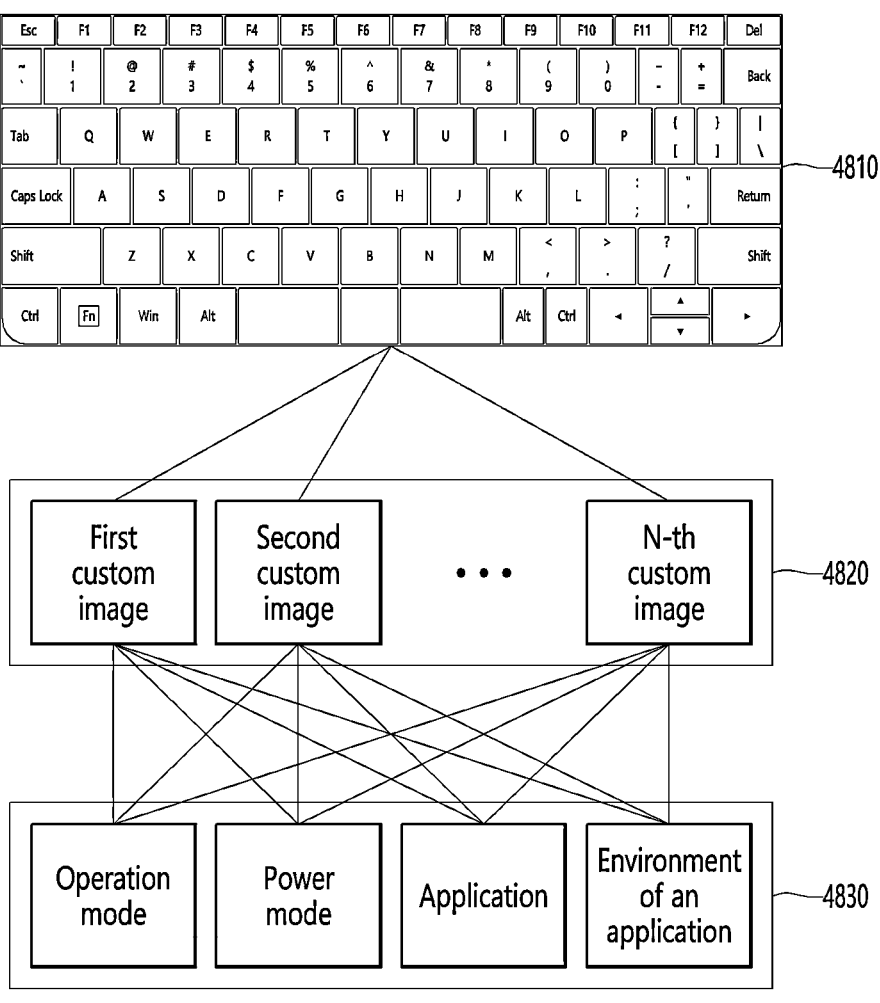
FIG. 34 is a diagram illustrating an image that is included in a screen displayed through a virtual reality device and corresponds to an electronic device having a multi-function human interface according to an embodiment.

FIG. 34 is a diagram illustrating an image that is included in a screen displayed through a virtual reality device and corresponds to an electronic device having a multi-function human interface according to an embodiment.

Referring to FIG. 34, an image 4810 that is included in a screen displayed through a virtual reality device and corresponds to an electronic device having a multi-function human interface according to an embodiment may be provided as different images according to various conditions.

Herein, an image 4810 that is included in a screen displayed through a virtual reality device and corresponds to an electronic device having a multi-function human interface according to an embodiment may be provided as various types of custom images 4820.

In addition, herein, the custom images 4820 may be various images generated or provided by a user, an image provider, a provider of an electronic device having a multi-function human interface, and a provider of a virtual reality device for an image 4810 corresponding to the electronic device having the multi-function human interface.

In addition, herein, various conditions 4830 may be an operation mode, a power mode of an electronic device having a multi-function human interface, or an environment of an application, such as a type of application running on a virtual reality device. However, without being limited thereto, various conditions for changing an image 4810 that is included in a screen displayed through a virtual reality device and corresponds to an electronic device having a multi-function human interface according to an embodiment may be included.

That is, referring to FIG. 34, an image 4810 that is included in a screen displayed through a virtual reality device and corresponds to an electronic device having a multi-function human interface according to an embodiment may be provided as different types of custom images 4820 according to an operation mode of the electronic device having the multi-function human interface.

In addition, referring to FIG. 34, an image 4810 that is included in a screen displayed through a virtual reality device and corresponds to an electronic device having a multi-function human interface according to an embodiment may be provided as different types of custom images 4820 according to a power mode of the electronic device having the multi-function human interface.

In addition, referring to FIG. 34, an image 4810 that is included in a screen displayed through a virtual reality device and corresponds to an electronic device having a multi-function human interface according to an embodiment may be provided as different types of custom images 4820 according to a type of application running on the virtual reality device.

In addition, referring to FIG. 34, an image 4810 that is included in a screen displayed through a virtual reality device and corresponds to an electronic device having a multi-function human interface according to an embodiment may be provided as different types of custom images 4820 according to an environment of an application running on the virtual reality device.

Methods according to the embodiments may be embodied as program instructions executable by various computer means and may be recorded on a computer-readable recording medium. The computer-readable recording medium may include program instructions, data files, data structures, and the like separately or in combinations. The program instructions to be recorded on the computer-readable recording medium may be specially designed and configured for the embodiments may be well-known to and be usable by those skilled in the art of computer software. Examples of the computer-readable recording medium include magnetic recording media such as hard disks, floppy disks and magnetic tapes; optical data storage media such as CD-ROMs or DVD-ROMs; magneto-optical media such as floptical disks; and hardware devices, such as read-only memory (ROM), random-access memory (RAM), and flash memory, which are particularly structured to store and implement the program instructions. Examples of the program instructions include not only a mechanical language code formatted by a compiler but also a high level language code that may be implemented by a computer using an interpreter, and the like. The hardware devices may be configured to be operated by one or more software modules or vice versa to conduct the operation according to the embodiments.

Although the embodiments have been described with reference to the limited embodiments and drawings, it will be understood by those skilled in the art that various modifications and variations may be made from the description. For example, suitable results may be achieved if the described techniques are performed in an order different from the described method, and/or the elements of the above-described system, structure, device, and circuit are coupled or combined in a form different from the described method, or replaced or substituted by other elements or equivalents.

Therefore, other implementations, other embodiments, and equivalents to the claims are also within the scope of the following claims.

MODE FOR INVENTION

As described above, related matters have been described in Best Mode.

The invention claimed is:

1. An electronic device having a multi-function human interface, the electronic device comprising:

a plurality of key caps, wherein the plurality of key caps comprise a first key cap;

a plurality of elastic units, wherein the plurality of elastic units comprise a first elastic unit;

a plurality of conductive materials, wherein the plurality of conductive materials comprise a first conductive material; and an electrode layer configured to generate key input signals and touch input signals;

wherein the electrode layer is comprising:

a first type electrode configured to generate touch input signals; and a second type electrode configured to generate at least key input signals;

wherein a first electrode included in the first type electrode and a second electrode included in the second type electrode are arranged to overlap with the first key cap at least partially, wherein the second electrode is arranged to overlap with the first conductive material at least partially, wherein the first electrode is arranged not to overlap with the first conductive material, wherein the electrode layer further includes a third electrode included in the first type electrode and a fourth electrode included in the second type electrode, wherein the third electrode and the fourth electrode are arranged to overlap with the first key cap at least partially, wherein the fourth electrode is arranged to overlap with the first conductive material at least partially, and wherein the third electrode is arranged not to overlap with the first conductive material at least partially.

2. The electronic device of claim 1, wherein the electrode layer comprises a first type lines consisting of electrodes electrically connected in a longitudinal direction of a keyboard layout and a second type lines consisting of electrodes electrically connected in a width direction of the keyboard layout, wherein the first type lines are configured to function as one of a transmitter or a receiver, and the second type lines are configured to function as the other of the transmitter or the receiver.

3. The electronic device of claim 2, wherein the first electrode and the second electrode are included in the first type lines.

4. The electronic device of claim 2, wherein the first electrode and the second electrode are included in the second type lines.

5. The electronic device of claim 2, wherein the first electrode is included in either the first type lines or the second type lines, wherein the second electrode is included in the other of the first type lines or the second type lines.

6. The electronic device of claim 1, wherein the second electrode and the fourth electrode are arranged adjacent to each other.

7. The electronic device of claim 1, wherein the second type electrode comprises a protrusion.

8. The electronic device of claim 1, wherein the second type electrode comprises a protrusion, wherein a shape of a protrusion of the second electrode is the same as a shape of a protrusion of the fourth electrode.

9. The electronic device of claim 1, wherein the second type electrode comprises a protrusion, wherein a shape of a protrusion of the second electrode is different from a shape of a protrusion of the fourth electrode.

10. The electronic device of claim 1, wherein the second type electrode comprises a protrusion, wherein a protrusion of the second electrode and a protrusion of the fourth electrode are arranged to overlap with the first conductive material.

11. The electronic device of claim 10, wherein a size of an area where the protrusion of the second electrode overlaps with the first conductive material is the same as a size of an area where the protrusion of the fourth electrode overlaps with the first conductive material.

12. The electronic device of claim 1, wherein the first conductive material is arranged to move in accordance with a movement of the first key cap.

13. The electronic device of claim 12, wherein the first conductive material is formed to be included in the first key cap.

14. The electronic device of claim 1, wherein the first conductive material is formed to be included in the first key cap.

15. The electronic device of claim 1, wherein the first conductive material is formed to be included in the first elastic unit.

* * * * *